(12) United States Patent
Hannuksela et al.

(10) Patent No.: US 11,818,371 B2
(45) Date of Patent: Nov. 14, 2023

(54) CODED PICTURE WITH MIXED VCL NAL UNIT TYPE

(71) Applicant: Nokia Technologies Oy, Espoo (FI)

(72) Inventors: Miska Matias Hannuksela, Tampere (FI); Kashyap Kammachi Sreedhar, Tampere (FI); Emre Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 162 days.

(21) Appl. No.: 17/496,161

(22) Filed: Oct. 7, 2021

(65) Prior Publication Data

US 2022/0109861 A1  Apr. 7, 2022

Related U.S. Application Data

(60) Provisional application No. 63/133,582, filed on Jan. 4, 2021, provisional application No. 63/088,676, filed on Oct. 7, 2020.

(51) Int. Cl.
*H04N 19/30* (2014.01)
*H04N 19/70* (2014.01)
(Continued)

(52) U.S. Cl.
CPC .......... *H04N 19/30* (2014.11); *H04N 19/132* (2014.11); *H04N 19/167* (2014.11);
(Continued)

(58) Field of Classification Search
CPC .... H04N 19/30; H04N 19/132; H04N 19/167; H04N 19/172; H04N 19/184; H04N 19/188; H04N 19/70
See application file for complete search history.

(56) References Cited

U.S. PATENT DOCUMENTS

2021/0377581 A1* 12/2021 Denoual .............. H04N 21/816

FOREIGN PATENT DOCUMENTS

| WO | WO-2020/053477 A2 | 3/2020 | |
|---|---|---|---|
| WO | WO-2020/185922 A1 | 9/2020 | |
| WO | WO-2022074295 A1 * | 4/2022 | ........... H04N 19/132 |

OTHER PUBLICATIONS

"Information tehnology—Coding of audio-visual objects—Part 15: Carriage of network abstraction layer (NAL) unit structured video in the ISO base media file format", N18856, ISO/IEC JTC1/SC29/WG11, 198 pages, Oct. 2019.

* cited by examiner

*Primary Examiner* — Jae N Noh
(74) *Attorney, Agent, or Firm* — Joseph C. Drish; Harrington & Smith

(57) ABSTRACT

An apparatus includes at least one processor; and at least one memory including computer program code; wherein the at least one memory and the computer program code are configured to, with the at least one processor, cause the apparatus at least to: indicate an extraction reference map entry used to assign a group identifier to at least one extraction reference, the extraction reference map entry indicating a subpicture layout; wherein the at least one extraction reference causes extraction of a network abstraction layer unit data by reference from another track; wherein the at least one extraction reference comprises an index of a track reference having a subpicture type within a subpicture order sample group description entry; and indicate, using the at least one extraction reference, subpictures or slices of a coded picture in decoding order.

10 Claims, 19 Drawing Sheets

(51) Int. Cl.
*H04N 19/172* (2014.01)
*H04N 19/167* (2014.01)
*H04N 19/184* (2014.01)
*H04N 19/169* (2014.01)
*H04N 19/132* (2014.01)

(52) U.S. Cl.
CPC ......... *H04N 19/172* (2014.11); *H04N 19/184* (2014.11); *H04N 19/188* (2014.11); *H04N 19/70* (2014.11)

Syntax of subpicture order sample group

```
aligned(8) class VvcSubpicOrderEntry() extends
VisualSampleGroupEntry('spor')
{
    unsigned int(1) subpic_id_info_flag;
    unsigned int(15) num_subpic_ref_idx;
    for (i = 0; i < num_subpic_ref_idx; i++)
        unsigned int(16) subp_track_ref_idx;
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_sps_subpic_id_flag;
        if (pps_sps_subpic_id_flag)
            unsigned int(6) pps_id;
        else {
            unsigned int(4) sps_id;
            bit(2) reserved = 0;
        }
    }
}
```

FIG. 1

Syntax of subpicture common group box

```
aligned(8) class SubpicCommonGroupBox extends
EntityToGroupBox('acgl',0,0)
{
    unsigned int(8) level_idc;
    bit(8) reserved = 0;
    unsigned int(16) num_active_tracks;
}
```

FIG. 2

Syntax of subpicture multiple groups box

```
aligned(8) class SubpicMultipleGroupsBox extends
EntityToGroupBox('amgl',0,0)
{
    unsigned int(8) level_idc;
    bit(8) reserved = 0;
    unsigned int(16) num_subgroup_ids;
    subgroupIdLen = (num_subgroup_ids >= (1 << 8)) ? 16 : 8;
    for (i = 0; i < num_entities_in_group; i++)
        unsigned int(subgroupIdLen) track_subgroup_id[i];
    for (i = 0; i < num_subgroup_ids; i++)
        unsigned int(16) num_active_tracks[i];
}
```

FIG. 3

Table 1 – Mapping of sync sample status and SAP types to NAL unit type

| NAL Unit Type | ISOBMFF sync sample status | DASH SAP type |
|---|---|---|
| IDR_N_LP | true | 1 |
| IDR_W_RADL | true | 2 (if the IRAP has associated RADL pictures)<br>1 (if the IRAP has no associated RADL pictures) |
| CRA | false | 3 (if the IRAP has associated RASL pictures) |
| | true | 2 (if the IRAP has no associated RASL pictures but has associated RADL pictures) |
| | true | 1 (if the IRAP has no associated leading pictures) |
| GDR | false | 4 (if the GDR has ph_recovery_poc_cnt greater than 0) |
| | false | 3 (if the GDR has ph_recovery_poc_cnt equal to 0 and the GDR has AUs following in decoding order that precede it in presentation order) |
| | true | 1 (if the GDR has ph_recovery_poc_cnt equal to 0 and the GDR does not have AUs following in decoding order that precede it in presentation order) |
| STSA | false | 3 (if the first AU of each further sublayer present in the track that follows the STSA AU in presentation order is also an STSA AU. There might be AUs in each further sublayer present in the track that follow the STSA AU in decoding order but precede it in presentation order that are not STSA AUs) |
| | true, if Tid is equal to the smallest Tid in the track and the first following sample of each further sublayer in decoding order is of type STSA | 2 (if the first AU of each further sublayer present in the track that follows the STSA in decoding order is also an STSA AU. There might be AUs following the STSA AU in decoding order that precede it in presentation order)<br><br>1 (if the first AU of each further sublayer present in the track that follows the STSA is also an STSA AU. There are no AUs preceding the STSA in presentation order) |

FIG. 4

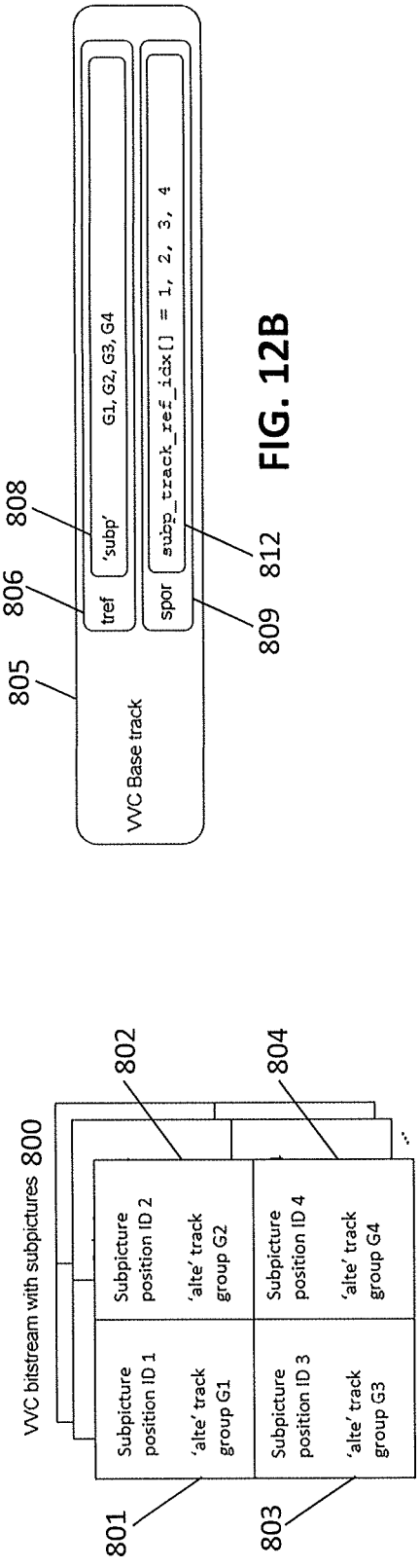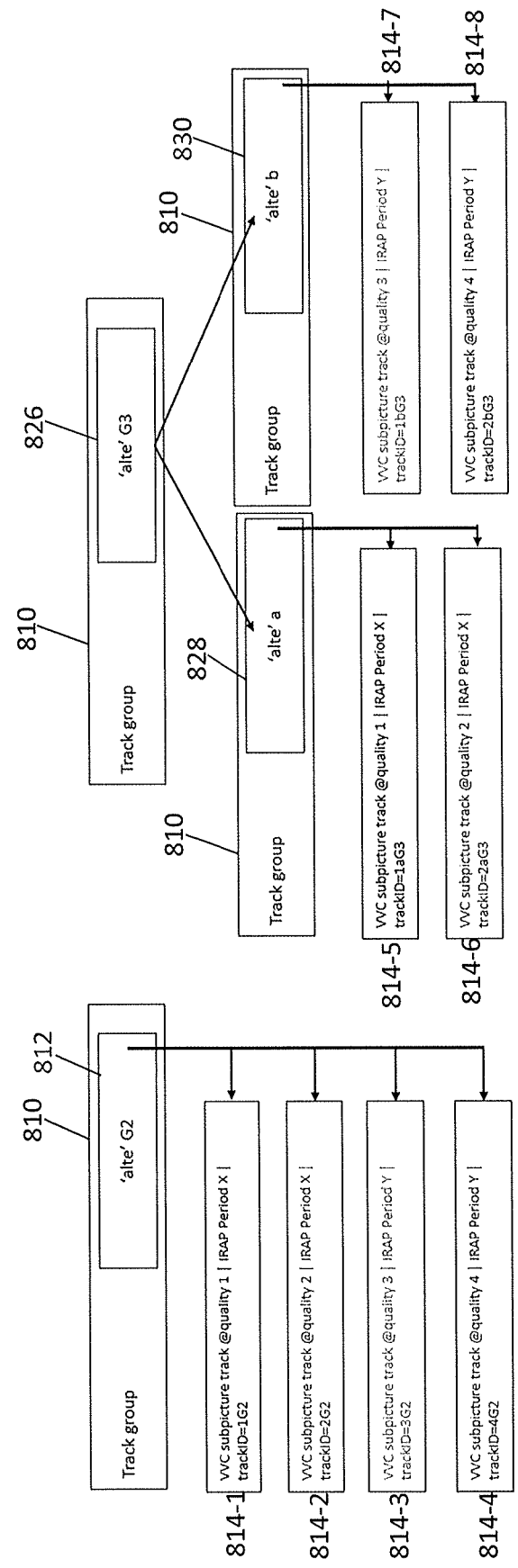
FIG. 12A
FIG. 12B
FIG. 12C
FIG. 12D

|  | TRAIL_NUT | STSA_NUT | RADL_NUT | RASL_NUT | RSV_VCL_4.. | RSV_VCL_6 | IDR_W_RADL | IDR_N_LP | CRA_NUT |
|---|---|---|---|---|---|---|---|---|---|
| TRAIL_NUT | allowed/no mixing | allowed/mixed NAL unit | allowed/mixed NAL unit | allowed/mixed NAL unit |  |  | allowed/mixed NAL unit | allowed/mixed NAL unit | allowed/mixed NAL unit |
| STSA_NUT | allowed/mixed NAL unit | allowed/no mixing | allowed/mixed NAL unit | allowed/mixed NAL unit |  |  | not allowed | not allowed | not allowed |
| RADL_NUT | allowed/mixed NAL unit | allowed/mixed NAL unit | allowed/no mixing | allowed/mixed NAL unit |  |  | not allowed | not allowed | not allowed |
| RASL_NUT | allowed/mixed NAL unit | allowed/mixed NAL unit | allowed/mixed NAL unit | allowed/no mixing |  |  | not allowed | not allowed | not allowed |
| RSV_VCL_4.. |  |  |  |  |  |  |  |  |  |
| RSV_VCL_6 |  |  |  |  |  |  |  |  |  |
| IDR_W_RADL | allowed/mixed NAL unit | not allowed | not allowed | not allowed |  |  | allowed/no mixing | not allowed | not allowed |
| IDR_N_LP | allowed/mixed NAL unit | not allowed | not allowed | not allowed |  |  | not allowed | allowed/no mixing | not allowed |
| CRA_NUT | allowed/mixed NAL unit | not allowed | not allowed | not allowed |  |  | not allowed | not allowed | allowed/no mixing |

FIG. 13

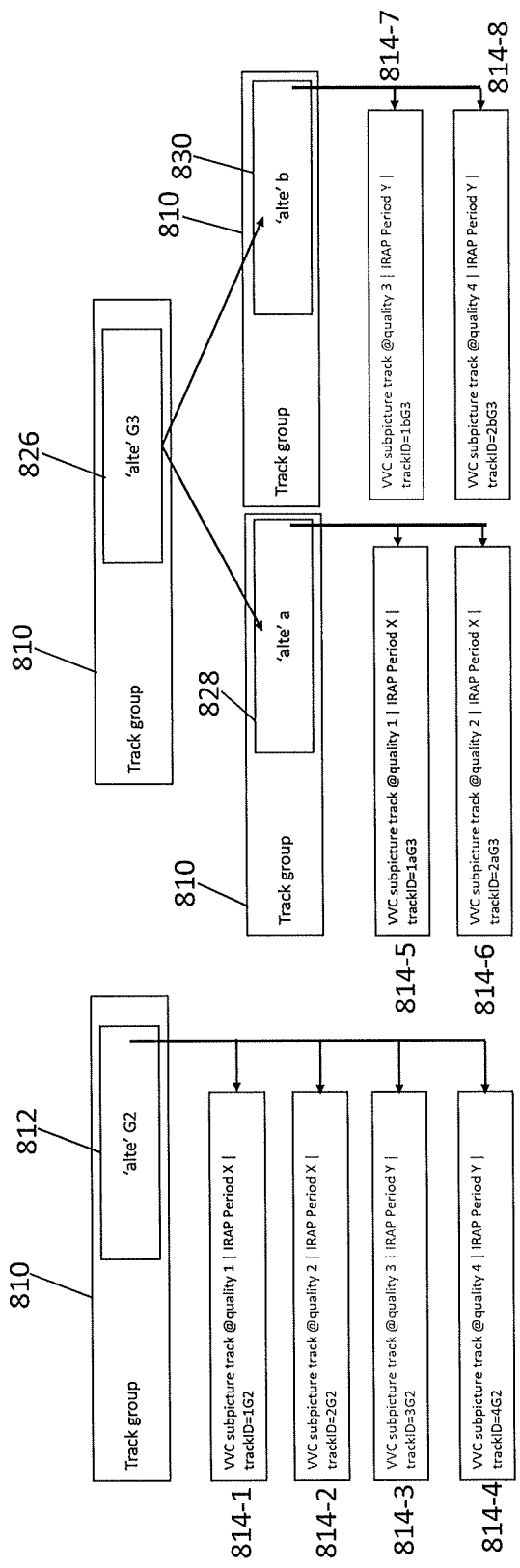
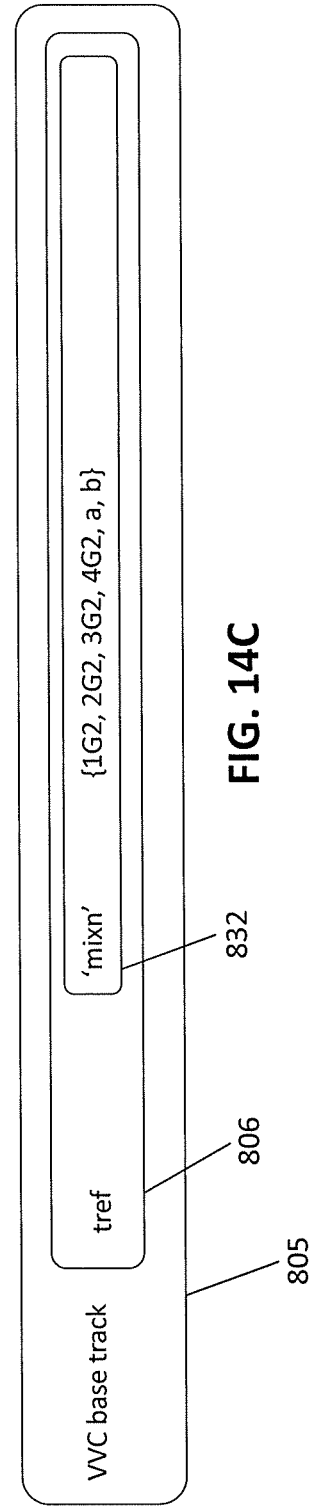
FIG. 14A
FIG. 14B
FIG. 14C

```
aligned(8) class SubpicCommonGroupBox extends
EntityToGroupBox('acgl',0,0)
{
    unsigned int(8) level_idc;
    bit(8) reserved = 0;                                    902
    unsigned int(16) num_active_tracks;
    for (i = 0; i < num_entities_in_group; i++){
        unsigned int(16) image_segment_top[i];
        unsigned int(16) image_segment_left[i];
        unsigned int(16) image_segment_width[i];
        unsigned int(16) image_segment_height[i];
    }
}
```

FIG. 18

CODED PICTURE WITH MIXED VCL NAL UNIT TYPE

RELATED APPLICATION

This application claims priority to U.S. Provisional Application No. 63/088,676, filed Oct. 7, 2020, which is hereby incorporated by reference in its entirety. This application further claims priority to U.S. Provisional Application No. 63/133,582, filed Jan. 4, 2021, which is hereby incorporated by reference in its entirety.

TECHNICAL FIELD

The examples and non-limiting embodiments relate generally to versatile video coding, and more particularly, to a coded picture with mixed VCL NAL unit type.

BACKGROUND

It is known to perform video coding and decoding.

SUMMARY

In accordance with an aspect, an apparatus includes at least one processor; and at least one memory including computer program code; wherein the at least one memory and the computer program code are configured to, with the at least one processor, cause the apparatus at least to: indicate an extraction reference map entry used to assign a group identifier to at least one extraction reference, the extraction reference map entry indicating a subpicture layout; wherein the at least one extraction reference causes extraction of a network abstraction layer unit data by reference from another track; wherein the at least one extraction reference comprises an index of a track reference having a subpicture type within a subpicture order sample group description entry; and indicate, using the at least one extraction reference, subpictures or slices of a coded picture in decoding order.

In accordance with an aspect, an apparatus includes at least one processor; and at least one memory including computer program code; wherein the at least one memory and the computer program code are configured to, with the at least one processor, cause the apparatus at least to: indicate a mixed network abstraction layer unit type pictures sample group used to merge video base tracks having a subpicture track; indicate a sample group description entry of the mixed network abstraction layer unit type pictures sample group, the sample group description entry indicating a group of pairs of mixed network abstraction layer unit type track reference indices, which reference video subpicture tracks or track groups; and wherein when a video bitstream is resolved from a video base track containing a mixed network abstraction layer unit type sample group with merging pairs of video subpicture tracks signaled in a mixed network abstraction layer unit type pictures sample group entry, then there is mixing of different network abstraction layer unit types.

In accordance with an aspect, an apparatus includes at least one processor; and at least one memory including computer program code; wherein the at least one memory and the computer program code are configured to, with the at least one processor, cause the apparatus at least to: parse a sample group description entry of a mixed network abstraction layer unit type pictures sample group is mapped to a sample of a video base track; determine a value of a picture parameter set mixed network abstraction layer unit types in picture flag; determine whether a pair of track identifier values of subpicture tracks selected to reconstruct a picture unit map to at least one index that specifies a mixed network abstraction layer unit type track reference index value in the sample group description entry; determine whether a track identifier value maps to the at least one index that specifies a mixed network abstraction layer unit type track reference index value; determine that the track identifier value maps to the at least one index that specifies a mixed network abstraction layer unit type track reference index value in response to a track reference pointing to a track identifier directly; determine that the track identifier value maps to the at least one index that specifies a mixed network abstraction layer unit type track reference index value in response to the track reference pointing to an alternative for extraction track group or a sequence of network abstraction layer unit types track group, and the alternative for extraction track group or the sequence of network abstraction layer unit types track group, respectively, contain a track having the track identifier value; and determine the value of a picture parameter set mixed network abstraction layer unit types in picture flag to be equal to one, in response to any pair of subpicture tracks selected to reconstruct a picture unit having track identifier values that map to the at least one index that specifies a mixed network abstraction layer unit type track reference index value in the sample group description entry with a shared dereferencing index value, otherwise determine the value of the picture parameter set mixed network abstraction layer unit types in picture flag to be equal to zero.

In accordance with an aspect, an apparatus includes at least one processor; and at least one memory including computer program code; wherein the at least one memory and the computer program code are configured to, with the at least one processor, cause the apparatus at least to: write, in a container file, two or more subpicture tracks; write, in the container file, a base track, which is intended to be resolved into a video bitstream; indicate, in the base track, two groups of subpictures; write, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; and indicate, in the container file, samples of the base track for which the sample group description entry is intended to be used for reconstructing the video bitstream.

In accordance with an aspect, an apparatus includes at least one processor; and at least one memory including computer program code; wherein the at least one memory and the computer program code are configured to, with the at least one processor, cause the apparatus at least to: parse, from a base track of a container file, two groups of subpictures; parse, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; parse, from the container file, which set of samples of the base track the sample group description entry is intended to be used for reconstructing the video bitstream; and reconstruct, from the container file, coded pictures of a video bitstream corresponding to the set of samples by including time-aligned samples of the subpicture tracks belonging to one of the groups or belonging to different groups.

In accordance with an aspect, an apparatus includes at least one processor; and at least one memory including computer program code; wherein the at least one memory and the computer program code are configured to, with the at least one processor, cause the apparatus at least to: generate an instance of a track reference in a container file that contains two or more subpicture tracks; wherein the track reference is used within a video base track that references the two or more subpicture tracks; wherein the track reference comprises either at least one track identifier value corresponding to the two or more subpicture tracks, or a track group identifier of a track group of the two or more subpicture tracks; encode the video base track into a video destination bitstream; and generate a sample group description entry with at least one list of track reference index pairs, wherein the at least one list indicates pairs of subpicture tracks resulting in: mixed video coding layer network abstraction layer unit types within a picture reconstructed from the video base track, or uniform video coding layer network abstraction layer unit types within the picture, or non-conforming video coding layer network abstraction layer unit types within the picture.

In accordance with an aspect, an apparatus includes at least one processor; and at least one memory including computer program code; wherein the at least one memory and the computer program code are configured to, with the at least one processor, cause the apparatus at least to: parse an instance of a track reference from a container file that contains two or more subpicture tracks; wherein the track reference is used within a video base track that references the two or more subpicture tracks; wherein the track reference comprises either a track identifier value of the two or more subpicture tracks, or a track group identifier value of a track group of the two or more subpicture tracks; resolve the video base track into a video destination bitstream; decode a sample group description entry with at least one list of track reference index pairs, wherein the at least one list indicates pairs of subpicture tracks resulting in: mixed video coding layer network abstraction layer unit types within a picture reconstructed from the video base track, or uniform video coding layer network abstraction layer unit types within the picture, or non-conforming video coding layer network abstraction layer unit types within the picture; conclude from the sample group description entry whether a picture in the destination bitstream contains mixed video coding layer network abstraction layer unit types; and in response to concluding from the sample group description entry that a picture in the destination bitstream contains mixed video coding layer network abstraction layer unit types, modify a picture parameter set to indicate mixed video coding layer network abstraction layer unit types for the picture.

In accordance with an aspect, an apparatus includes at least one processor; and at least one memory including computer program code; wherein the at least one memory and the computer program code are configured to, with the at least one processor, cause the apparatus at least to: parse an extraction reference map entry used to assign a group identifier to at least one extraction reference, the extraction reference map entry indicating a subpicture layout; wherein the at least one extraction reference extracts a network abstraction layer unit data by reference from another track; wherein the at least one extraction reference comprises an index of a track reference having a subpicture type within a subpicture order sample group description entry; and parse, using the at least one extraction reference, subpictures or slices of a coded picture in decoding order.

In accordance with an aspect, an apparatus includes at least one processor; and at least one memory including computer program code; wherein the at least one memory and the computer program code are configured to, with the at least one processor, cause the apparatus at least to: parse a mixed network abstraction layer unit type pictures sample group used to merge video base tracks having a subpicture track; parse a sample group description entry of the mixed network abstraction layer unit type pictures sample group, the sample group description entry indicating a group of pairs of mixed network abstraction layer unit type track reference indices, which reference video subpicture tracks or track groups; and wherein when a video bitstream is resolved from a video base track containing a mixed network abstraction layer unit type sample group with merging pairs of video subpicture tracks signaled in a mixed network abstraction layer unit type pictures sample group entry, then there is mixing of different network abstraction layer unit types.

BRIEF DESCRIPTION OF THE DRAWINGS

The foregoing aspects and other features are explained in the following description, taken in connection with the accompanying drawings, wherein:

FIG. 1 is an example syntax of a subpicture order sample group.

FIG. 2 is an example syntax of a subpicture common group box.

FIG. 3 is an example syntax of a subpicture multiple groups box.

FIG. 4 is a table showing a mapping of sync sample status and SAP types to NAL unit types.

FIG. 12A shows a VVC bitstream with four VVC subpictures in a 2×2 layout.

FIG. 12B shows a VVC base track which refers to the VVC subpicture tracks using the 'subp' track reference.

FIG. 12C shows a track group G2 (for VVC subpicture position 2) which lists only VVC subpicture tracks which are alternate for each other.

FIG. 12D shows a track group G3 (for VVC subpicture position 3) which lists other VVC subpicture track groups which are alternate for each other.

FIG. 13 is an example table/mapping showing permissible mixing of NAL unit types within a picture.

FIG. 14A shows an 'alte' track group of VVC subpicture tracks referred by the VVC base track grouping VVC subpicture tracks with different IRAP periods.

FIG. 14B shows a track group with VVC subpicture tracks.

FIG. 14C shows a 'mixn' track reference.

FIG. 18 shows a structure, namely SubpicCommonGroupBox, that provides extensions to the subpicture entity groups, to carry information related to subpicture layout.

DETAILED DESCRIPTION OF EXAMPLE EMBODIMENTS

Figure 5:
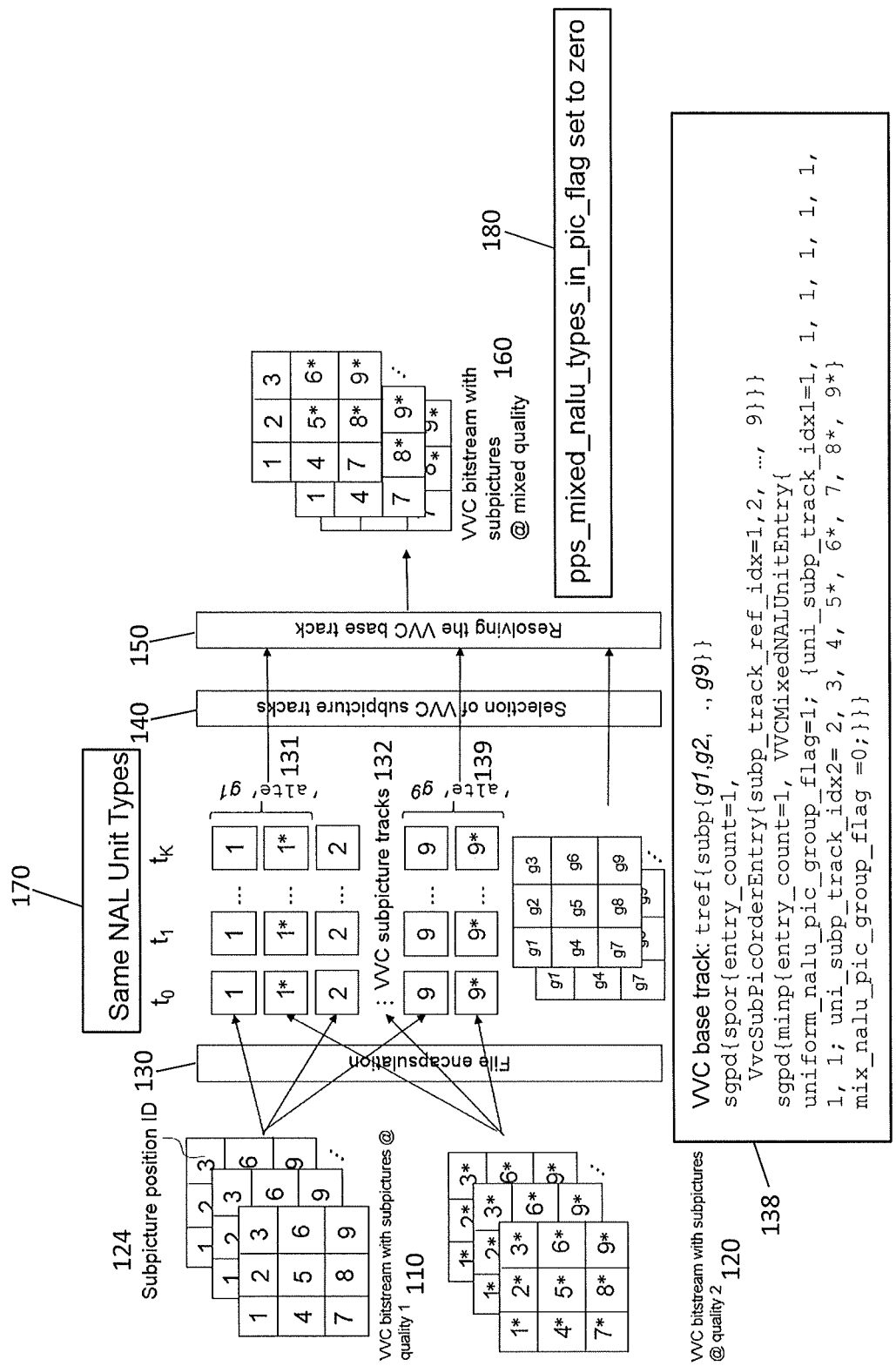
FIG. 5 shows VVC bitstream(s) composed of 9 subpictures, together with a file encapsulation and VVC selection and resolve process with homogenous NAL unit types.

In the following, several embodiments are described in the context of one video coding arrangement. It is to be noted, however, that the present embodiments are not necessarily limited to this particular arrangement.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available previously, unless otherwise indicated.

The Versatile Video Coding standard (VVC, H.266, or H.266/VVC) was developed by the Joint Video Experts Team (JVET), which is a collaboration between the ISO/IEC MPEG and ITU-T VCEG. The standard is or is expected to be published by both parent standardization organizations, and it is referred to as ITU-T Recommendation H.266 and ISO/IEC International Standard 23090-3, also known as MPEG-I Part 3.

Some definitions, bitstream and coding structures, and concepts of H.264/AVC, HEVC, and/or VVC, as well as some of their extensions are described in this section as an example of a video encoder, decoder, encoding method, decoding method, and a bitstream structure, wherein the embodiments may be implemented. Some of the definitions, bitstream and coding structures, and concepts of the video coding standards are common—hence, they are described below jointly. The aspects of various embodiments are not limited to H.264/AVC, HEVC, VVC, or their extensions, but rather the description is given for one possible basis on top of which the present embodiments may be partly or fully realized.

A video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, the encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, wherein both the encoder and the decoder modify the context state of a coding parameter based on previously coded/decoded coding parameters. Context-based coding may for example be context adaptive binary arithmetic coding (CABAC) or context-adaptive variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, in most cases is a picture. A picture given as an input to an encoder may also be referred to as a source picture, and a picture decoded by a decoder may be referred to as a decoded picture or a reconstructed picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that composes a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as a pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In a draft international standard version of H.266/VVC, the following partitioning applies. It is noted that what is described here might still evolve in later draft versions of H.266/VVC until the standard is finalized. Pictures are partitioned into coding tree units (CTUs) with a maximum size of 128×128, although encoders may choose to use a smaller size, such as 64×64. A coding tree unit (CTU) is first partitioned by a quaternary tree (a.k.a. quadtree) structure. Then the quaternary tree leaf nodes can be further partitioned by a multi-type tree structure. There are four splitting types in the multi-type tree structure, namely vertical binary splitting, horizontal binary splitting, vertical ternary splitting, and horizontal ternary splitting. The multi-type tree leaf nodes are called coding units (CUs). The CU, PU and TU have the same block size, unless the CU is too large for the maximum transform length. A segmentation structure for a CTU is a quadtree with nested multi-type tree(s) using binary and ternary splits, i.e. no separate CU, PU and TU concepts are in use except when needed for CUs that have a size too large for the maximum transform length. A CU can have either a square or rectangular shape.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as a prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of the previously coded/decoded picture can be predicted. The reference index may be predicted from adjacent blocks and/or co-located blocks in the temporal reference picture. Moreover, high efficiency video codecs may employ an additional motion information coding/decoding mechanism, often called merging/merge mode, where all the motion field information, which includes a motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, a similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor A to tie together the (exact or estimated) image distortion due to lossy coding methods and the (exact or estimated) amount of information that is required to represent the pixel values in an image area:

$$C = D + \lambda R \quad \text{(Eq. 1)}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

HRD models may include instantaneous decoding, while the input bitrate to the coded picture buffer (CPB) of HRD may be regarded as a constraint for the encoder and the bitstream on the decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, including for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process may be a part of video coding standards, e.g. as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as a reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

In some coding formats, a reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

In VVC, reference picture lists are indicated directly in a reference picture list syntax structure. When a picture is present in any reference picture list of the current picture (within active or inactive entries of any reference picture list), it is marked as "used for long-term reference" or "used for short-term reference". When a picture is present in no reference picture list of the current picture, it is marked as "unused for reference". The abbreviation RPL may be used to refer to the reference picture list syntax structure and/or to one or more reference picture lists. The number of active entries in a reference picture list may be indicated by an encoder and/or decoded by a decoder, and may indicate the number of pictures starting from the first list entry that may be used as reference for prediction of the current picture. The entries in a reference picture list that are not among the active entries may be defined to be inactive entries, are not used as reference for prediction of the current picture, and may be used as a reference for prediction of subsequent pictures in decoding order.

As mentioned previously, a Decoded Picture Buffer (DPB) may be used in the encoder and/or in the decoder. There may be two reasons to buffer decoded pictures, including for references in inter prediction and for reordering decoded pictures into output order. Since some codecs, such as VVC, provide flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers.

E.g. the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as the inter prediction reference and indicate its use e.g. with a reference picture index in the coded bitstream. The decoder decodes from the bitstream, for example from a reference picture index, that a base-layer picture is used as the inter prediction reference for the enhancement layer. When a decoded base-layer picture is used as the prediction reference for an enhancement layer, it is referred to as an inter-layer reference picture.

Scalability modes or scalability dimensions may include but are not limited to the following (A.-I.):

A. Quality scalability: base layer pictures are coded at a lower quality than enhancement layer pictures, which may be achieved for example using a greater quantization parameter value (i.e., a greater quantization step size for transform coefficient quantization) in the base layer than in the enhancement layer.

B. Spatial scalability: base layer pictures are coded at a lower resolution (i.e. have fewer samples) than enhancement layer pictures. Spatial scalability and quality scalability may sometimes be considered the same type of scalability.

C. Bit-depth scalability: base layer pictures are coded at lower bit-depth (e.g. 8 bits) than enhancement layer pictures (e.g. 10 or 12 bits).

D. Dynamic range scalability: scalable layers represent a different dynamic range and/or images obtained using a different tone mapping function and/or a different optical transfer function.

E. Chroma format scalability: base layer pictures provide lower spatial resolution in chroma sample arrays (e.g. coded in 4:2:0 chroma format) than enhancement layer pictures (e.g. 4:4:4 format).

F. Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

G. Region-of-interest (ROI) scalability: an enhancement layer representation of a spatial subset of the base layer. ROI scalability may be used together with other types of scalability, e.g. quality or spatial scalability so that the enhancement layer provides higher subjective quality for the spatial subset.

H. View scalability, which may also be referred to as multiview coding. The base layer represents a first view, whereas an enhancement layer represents a second view.

I. Depth scalability, which may also be referred to as depth-enhanced coding. A layer or some layers of a bitstream may represent texture view(s), while other layer or layers may represent depth view(s).

In all of the above scalability cases, base layer information could be used to code the enhancement layer to minimize the additional bitrate overhead.

Scalability can be enabled in two basic ways. Scalability can be enabled either by introducing new coding modes for performing prediction of pixel values or syntax from lower layers of the scalable representation, or by placing the lower layer pictures to the reference picture buffer (decoded picture buffer, DPB) of the higher layer.

The first approach is more flexible and thus can provide better coding efficiency in most cases. However, the second, reference frame-based scalability, approach can be implemented very efficiently with minimal changes to single layer codecs while still achieving the majority of the coding efficiency gains available. Essentially a reference frame based scalability codec can be implemented by utilizing the same hardware or software implementation for all the layers, just taking care of the DPB management.

An elementary unit for the output of encoders of some coding formats, such as HEVC and VVC, and the input of decoders of some coding formats, such as HEVC and VVC, is a Network Abstraction Layer (NAL) unit. For transport over packet-oriented networks or storage into structured files, NAL units may be encapsulated into packets or similar structures. The abbreviation NAL may also appear in lower case, i.e., nal.

A byte stream format may be specified for NAL unit streams for transmission or storage environments that do not provide framing structures. The byte stream format separates NAL units from each other by attaching a start code in front of each NAL unit. To avoid false detection of NAL unit boundaries, encoders may run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the byte stream format is in use or not.

A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In VVC, a two-byte NAL unit header is used for all specified NAL unit types, while in other codecs the NAL unit header may be similar to that in VVC.

In VVC, the NAL unit header comprises a five-bit NAL unit type indication (nal_unit_type), a three-bit nuh_temporal_id_plus1 indication for temporal level or sub-layer (may be required to be greater than or equal to 1) and a six-bit nuh_layer_id syntax element. The nuh_temporal_id_plus1 syntax element may be regarded as a temporal identifier for the NAL unit, and a zero-based TemporalId variable may be derived as follows: TemporalId=nuh_temporal_id_plus1−1. The abbreviation TID may be used interchangeably with the TemporalId variable. TemporalId equal to 0 corresponds to the lowest temporal level. The value of nuh_temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units may be coded slice NAL units. In HEVC and VVC, VCL NAL units contain syntax elements representing one or more CUs. In HEVC and VVC, the NAL unit type value within a certain range indicates a VCL NAL unit, and the VCL NAL unit type may indicate a picture type.

Images can be split into independently codable and decodable image segments (e.g. slices or tiles or tile groups). Such image segments may enable parallel processing. "Slices" in this description may refer to image segments constructed of a certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in HEVC and VVC. Coded image segments may comprise a header and a payload, wherein the header contains parameter values needed for decoding the payload.

In the HEVC standard, a picture can be partitioned into tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a draft international standard version of VVC, the partitioning of pictures into tiles is defined as follows. A picture is divided into one or more tile rows and one or more tile columns. The partitioning of a picture to tiles forms a tile grid that may be characterized by a list of tile column widths (in CTUs) and a list of tile row heights (in CTUs). A tile is a sequence of coding tree units (CTUs) that covers one "cell" in the tile grid, i.e., a rectangular region of a picture.

In a draft international standard version of VVC, the partitioning of pictures into slices is defined as follows. Two modes of slices are supported, namely the raster-scan slice mode and the rectangular slice mode. In the raster-scan slice mode, a slice contains a sequence of tiles in a tile raster scan of a picture. In the rectangular slice mode, a slice either contains an integer number of complete tiles that collectively form a rectangular region of the picture or an integer number of complete CTU rows of a tile. A slice is a VCL NAL unit.

In a draft international standard version of VVC, a slice (a.k.a. a coded slice) may comprise a slice header and slice data. A slice header may be defined as a part of a coded slice containing the data elements pertaining to all tiles or CTU rows within a tile represented in the slice.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

VVC Subpictures

VVC supports subpictures (a.k.a. sub-pictures). A subpicture may be defined as a rectangular region of one or more slices within a picture, wherein the one or more slices are complete. Consequently, a subpicture consists of one or more slices that collectively cover a rectangular region of a picture. The slices of a subpicture may be required to be rectangular slices. Consequently, each subpicture boundary is also always a slice boundary, and each vertical subpicture boundary is always also a vertical tile boundary.

One or both of the following conditions shall be fulfilled for each subpicture and tile: condition 1—all CTUs in a subpicture belong to the same tile; condition 2—all CTUs in a tile belong to the same subpicture.

Partitioning of a picture to subpictures (a.k.a. subpicture layout) may be indicated in and/or decoded from an SPS. In VVC, the SPS syntax indicates the partitioning of a picture to subpictures by providing for each subpicture syntax elements indicative of: the x and y coordinates of the top-left corner of the subpicture, the width of the subpicture, and the height of the subpicture, in CTU units.

In addition to the subpicture layout, one or more of the following properties may be indicated (e.g. by an encoder) or decoded (e.g. by a decoder) or inferred (e.g. by an encoder and/or a decoder) for the subpictures collectively or per each subpicture individually: i) whether or not a subpicture is treated as a picture in the decoding process; in some cases, this property excludes in-loop filtering operations, which may be separately indicated/decoded/inferred; and ii) whether or not in-loop filtering operations are performed across the subpicture boundaries.

In VVC, a subpicture identifier (or more precisely the sh_subpic_id syntax element) is indicated (e.g. by an encoder) in and/or decoded (e.g. by a decoder) from a slice header. sh_subpic_id specifies the subpicture identifier of the subpicture that contains the slice. sh_subpic_id is coded as a fixed-length unsigned integer, u(v), whose length is indicated in the referenced SPS, PPS or PH; when the length is not indicated, the length is derived based on the number of subpictures indicated in the referenced SPS.

When rectangular slices are in use in VVC, slice headers include the sh_slice_address syntax element, which is the slice index of the slice within the subpicture identified by sh_subpic_id.

In VVC, a sequence parameter set (SPS), a picture parameter set (PPS) or a picture header (PH) contains a list of subpicture identifier values, i.e. sps_subpic_id[i], pps_subpic_id[i] or ph_subpic_id[i], respectively, for i in the range of 0 to the number of subpictures in the subpicture layout minus 1, inclusive. It may be indicated in the SPS that the list of subpicture identifier values is unchanged for the entire coded video sequence. If the SPS allows changes to the list of subpicture identifier values within a coded video sequence, pps_subpic_id[i] or ph_subpic_id[i], whichever is present and applies to the picture, specifies the subpicture ID of the i-th subpicture. When both the PPS applying to a picture and the picture header of the picture contain a list of subpicture identifier values, the list in the picture header has precedence. Decoders may use the list of subpicture identifier values to locate decoded subpictures in a correct position according to the subpicture layout.

It is envisioned that extraction of subpicture sequences from one or more "source" VVC bitstreams and merging the extracted subpicture sequences to a "destination" VVC bitstream can be performed as follows (1 to 5):

1) When encoding the source VVC bitstreams, the sh_subpic_id value of each subpicture sequence is selected to differ from all other sh_subpic_id values among all the source VVC bitstreams, and the length of the sh_subpic_id syntax element is selected to be the same in all the source VVC bitstreams.

2) The SPS(s) of the destination VVC bitstream is authored or rewritten based on the SPS(s) of the source VVC bitstreams. The SPS authoring may include one or more of the following: the subpicture layout indicated in each SPS is created based on the subpictures that are merged into the destination VVC bitstream; and/or picture width and height are indicated in each SPS based on the subpictures that are merged into the destination VVC bitstream.

3) The PPS(s) of the destination VVC bitstream is authored or rewritten based on the PPS(s) of the source VVC bitstreams. The PPS authoring may include one or more of the following: picture width and height are indicated in each PPS based on the subpictures that are merged into the destination VVC bitstream; and/or authoring a list of subpicture identifier values, i.e. pps_subpic_id[i], for i in the range of 0 to the number of subpictures in the subpicture layout minus 1, inclusive, according to the subpictures that are merged into the destination VVC bitstream.

4) Picture headers of the destination VVC bitstream are authored or rewritten based on the respective picture headers of the source VVC bitstreams. The picture header authoring may include the following: authoring a list of subpicture identifier values, i.e. ph_subpic_id[i], for i in the range of 0 to the number of subpictures in the subpicture layout minus 1, inclusive, according to the subpictures that are merged into the destination VVC bitstream.

5) For each coded picture in the destination VVC bitstream, the subpictures from the respective coded picture in the source VVC bitstream(s) are included e.g. in the order indicated by the list of subpicture identifier values.

As described above, the VVC subpicture feature enables extraction and merging of subpictures without modifications of VCL NAL units (i.e. slices). Thus, a fundamental difference in VVC subpicture extraction and merging compared to HEVC motion-constrained tile set extraction and merging is that slice headers need not be rewritten.

Mixed NAL Unit Types in VVC

The VVC standard allows mixed NAL unit types within the same picture. The information about the presence of mixed NAL unit types in a picture is signaled in the bitstream as part of the Picture Parameter Set (PPS) using the pps_mixed_nalu_types_in_pic_flag flag.

When pps_mixed_nalu_types_in_pic_flag is equal to 1, it specifies that each picture referring to the PPS has more than one VCL NAL unit and the VCL NAL units do not have the same value of nal_unit_type. In other terms it means that pictures referring to the PPS contain slices with different NAL unit types.

The VVC standard specifies certain constraints on the presence of mixed NAL unit types within the same picture.

For VCL NAL units of any particular picture, the following applies (i.-ii.): i.) if pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU; ii.) otherwise (pps_mixed_nalu_types_in_pic_flag is equal to 1), all of the following constraints apply (1-4): 1) the picture shall have at least two subpictures; 2) VCL NAL units of the picture shall have two or more different nal_unit_type values; 3) there shall be no VCL NAL unit of the picture that has nal_unit_type equal to GDR_NUT; 4) when a VCL NAL unit of the picture has nal_unit_type equal to nalUnitTypeA that is equal to IDR_W_RADL, IDR_N_LP, or CRA_NUT, other VCL NAL units of the picture shall all have nal_unit_type equal to nalUnitTypeA or TRAIL_NUT. The value of nal_unit_type shall be the same for all pictures in an IRAP or GDR AU.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

In VVC, a picture header (PH) may be defined as a syntax structure containing syntax elements that apply to all slices of a coded picture. In other words, the PH contains information that is common for all slices of the coded picture associated with the PH. A picture header syntax structure is specified as an RBSP and is contained in a NAL unit.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

An access unit may comprise coded video data for a single time instance and associated other data. In VVC, an access unit (AU) may be defined as a set picture units (PUs) that belong to different layers and contain coded pictures associated with the same time for output from the decoded picture buffer (DPB). In VVC, a picture unit (PU) may be defined as a set of NAL units that are associated with each other according to a specified classification rule, are consecutive in decoding order, and contain exactly one coded picture. In addition to containing the VCL NAL units of the coded picture, a picture unit may also contain non-VCL NAL units.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream.

A coded layer video sequence (CLVS) may be defined as a sequence of picture units (PUs) with the same scalable layer (e.g. with the same value of nuh_layer_id in VVC) that consists, in decoding order, of a CLVS Start Picture Unit (CLVSS PU), followed by zero or more PUs that are not CLVSS PUs, including all subsequent PUs up to but not including any subsequent PU that is a CLVSS PU. A picture unit (PU) may be defined as a coded picture and all non-VCL NAL units associated with the coded picture. A CLVSS PU may be defined as a PU that is allowed to start a CLVS, i.e. that can start a decoding process of the layer. A CLVSS PU may for example comprise an IRAP picture or a gradual decoding refresh (GDR) picture.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder or a VVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. An open GOP coding structure is potentially more efficient in the compression compared to a closed GOP coding structure, due to a larger flexibility in selection of reference pictures.

A structure of pictures (SOP) may be defined as follows: A SOP is one of more coded pictures consecutive in decoding order. A SOP may further be constrained so that the first coded picture in decoding order is at the lowest temporal sub-layer (e.g. has TemporalId equal to 0 in HEVC or VVC). A SOP may be characterized by a list of VCL NAL unit types of the pictures belonging to it. Sometimes, the term group of pictures (GOP) may be used to mean a structure of pictures.

When describing video codecs and example embodiments, the following description may be used to specify the writing and/or parsing processes of each syntax element:

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exponential-Golomb-coded (a.k.a. exp-Golomb coded) syntax element with the left bit first.

An Exponential-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the examples described herein are not limited to ISOBMFF, but rather the description is given for one possible basis on top of which the examples described herein may be partly or fully realized.

A basic building block in the ISO base media file format is called a box. Each box has a header and a payload. The box header indicates the type of the box and the size of the box in terms of bytes. The type of the box may be indicated with a 32-bit unsigned integer or equivalently with a four-character code (4CC), which may be written out in single quotes, e.g. 'mdat'. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. According to ISOBMFF, a file includes metadata encapsulated into boxes and may also include media data encapsulated into boxes. Media data may alternatively be present in other file(s) that a referenced by a file conforming to ISOBMFF. A FullBox is a box that additionally contains an 8-bit version field and a 24-bit flags field in its box header. The syntax of boxes may be specified using the syntax description language (SDL) defined in ISO/IEC 14496-1.

In files conforming to the ISO base media file format, the media data may be provided in a media data 'mdat' box (a.k.a. MediaDataBox). A file conforming to ISOBMFF may contain zero or more 'mdat' boxes.

An identified media data box (a.k.a. IdentifiedMediaDataBox, 'imda') may have the same semantics as a MediaDataBox has but it additionally contains an identifier that is used in setting up data references to the contained media data. The identifier may for example be the first element contained by the identified media data box. The syntax of an identified media data box may be specified as follows, where imda_identifier is the identifier of the box. It is noted that while imda_identifier of type 32-bit unsigned integer is used in the syntax, other field lengths and other basic data types (e.g., string) could be possible in similar identified media data box structures. Syntax of an identified meta data box is provided below:

```
aligned(8) class IdentifiedMediaDataBox extends
Box('imda') {
    unsigned int(32) imda_identifier;
    bit(8) data[ ]; // until the end of the box
}
```

Wherever a media data box, an 'mdat' box, or a MediaDataBox is referred, the description equally applies to an IdentifiedMediaDataBox.

In files conforming to the ISO base media file format, the movie 'moov' box (a.k.a. MovieBox) may be used to enclose the metadata. In some cases, for a file to be operable, both of the media data and movie boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel. TrackBox contains a TrackHeaderBox, which comprises a track identifier, i.e. track_ID syntax element, which is an integer that uniquely identifies the track over the entire life-time of this presentation.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box, if they are in the same file as the moov box. For the metadata of the movie fragments, however, a 'moof' box may be provided. The 'moof' box may include the information for a certain duration of playback time that would previously have been in the 'moov' box. The moov box may still represent a valid movie on its own, but in addition, it may include an 'mvex' box indicating that movie fragments are to follow in the same file. The movie fragments may extend the presentation that is associated to the 'moov' box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the 'moof' box may be limited to a subset of the metadata that may be included in a moov box and may be coded differently in some cases. Details regarding the boxes that can be included in a 'moof' box may be found from the ISO base media file format specification. A self-contained movie fragment may be defined to consist of a 'moof' box and an mdat box that are consecutive in the file order and where the mdat box contains the samples of the movie fragment (for which the 'moof' box provides the metadata) and does not contain samples of any other movie fragment (i.e. any other 'moof' box).

TrackBoxes and track fragments (in TrackFragmentBox) comprise decoding and composition timing information for the samples in the scope of the TrackBox and the track fragment, respectively. A decoding time indicates the time when the sample is intended to be decoded, and a composition time indicates the time when the sample is intended to be played. Two samples in different tracks may be regarded as time-aligned when their decoding times or composition times are identical. The term time-aligned may refer to either or both alignment in decoding times and/or composition times. Sometimes, the term time-aligned may refer to alignment in decoding times only.

The track reference mechanism can be used to associate tracks with each other. The TrackReferenceBox includes box(es), each of which provides a reference from the containing track to a set of other tracks identified by their track_ID value(s) or, as explained below, by their track_group_id value(s). These references are labeled through the box type (i.e. the four-character code of the box) of the contained box(es). A track reference index of a particular type may be defined as an index that identifies an entry within a box that is contained in TrackReferenceBox and has that particular type as the box type. The entries within the box are indexed e.g. starting from 1 and incremented by 1 per each entry.

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes are of type TrackGroupTypeBox or are derived from TrackGroupTypeBox. TrackGroupTypeBox is like a FullBox but also includes an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox ('sbgp' box) represents the assignment of samples to groups described by a sample group entry; and (2) a SampleGroupDescriptionBox ('sgpd' box) contains a sample group entry (a.k.a. sample group description entry) for each group of samples describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

Mapping a sample to a sample group description index equal to 0 indicates that the sample is a member of no group of this type. If the sum of the sample count in a SampleToGroupBox is less than the total sample count, or there is no SampleToGroupBox that applies to some samples (e.g. it is absent from a track fragment), then those samples are associated with the group identified by the default_group_description_index in the SampleGroupDescriptionBox, if any, or else with no group. Thus, the default sample group description index, i.e. default_group_description_index in SampleGroupDescriptionBox, specifies the index of the sample group description entry which applies to all samples in the track for which no sample to group mapping is provided through a SampleToGroupBox. When default_group_description_index is not present in SampleGroupDescriptionBox, it is inferred to be equal to zero (indicating that the samples are mapped to no group description of this type).

Several types of stream access points (SAPs) have been specified in ISOBMFF, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

Stream access points (which may also or alternatively be referred to as layer access point) for layered coding may be defined similarly in a layer-wise manner. A SAP for layer may be defined as a position in a layer (or alike) that enables playback of the layer to be started using only the information from that position onwards assuming that the reference layers of the layer have already been decoded earlier.

A stream access point (SAP) sample group as specified in ISOBMFF identifies samples as being of the indicated SAP type. The grouping_type_parameter for the SAP sample group comprises the fields target_layers and layer_id_method_idc. target_layers specifies the target layers for the indicated SAPs. The semantics of target_layers may depend on the value of layer_id_method_idc. layer_id_method_idc specifies the semantics of target_layers. layer_id_method_idc equal to 0 specifies that the target layers consist of all the layers represented by the track. The sample group description entry for the SAP sample group comprises the fields dependent_flag and SAP_type. dependent_flag may be required to be 0 for non-layered media. dependent_flag equal to 1 specifies that the reference layers, if any, for predicting the target layers may have to be decoded for accessing a sample of this sample group. dependent_flag equal to 0 specifies that the reference layers, if any, for predicting the target layers need not be decoded for accessing any SAP of this sample group. sap_type (or SAP_type) values in the range of 1 to 6, inclusive, specify the SAP type, of the associated samples.

A sync sample may be defined as a sample corresponding to SAP type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags (more specifically the sample_is_non_sync_sample flag) indicated or inferred for track fragment runs.

A draft amendment of ISO/IEC 14496-15 includes a specification of an alternative for extraction ('alte') track group. Members of an 'alte' track group are alternatives to be used as a source for extraction. For HEVC, members of the track group with track_group_type equal to 'alte' may be defined to be alternatives to be used as a source for 'scal' or 'sabt' track reference. A file writer may indicate in a file that an 'alte' track group contains tracks that are alternatives to be used as a source for extraction.

The identifier for the 'alte' track group may be taken from the same numbering space as the identifier for tracks. In other words, the identifier for the 'alte' track group may be required to differ from all the track identifier values. Consequently, the 'alte' track group identifier may be used in places where track identifier is conventionally used. Specifically, the 'alte' track group identifier may be used as a track reference indicating the source for extraction. The value of (flags & 1) may be set equal to 1 in a TrackGroupTypeBox of type 'alte' to indicate the uniqueness of track_group_id as specified in ISO/IEC 14496-12.

A TrackReferenceTypeBox of reference_type equal to track_ref_4cc may list the track_group_id value(s) of an 'alte' track group(s) of containing the same alte_track_ref_4cc value in addition to or instead of track ID values. For example, an extractor track may, through a 'scal' track reference, point to an 'alte' track group in addition to or instead of individual tracks. Any single track of the 'alte' track group is a suitable source for extraction. A player or a file reader or alike may change the source track for extraction at a position where the track switched to has a sync sample or a SAP sample of type 1 or 2.

ISO/IEC 14496-15 specifies a sample group description entry format known as the rectangular region group entry (also known as tile region group entry or RectangularRegionGroupEntry or TileRegionGroupEntry), which has a grouping type four-character code 'trif'. The RectangularRegionGroupEntry may be used to describe a rectangular region. The definition of a rectangular region may depend on a coding format or sample entry type.

The syntax of RectangularRegionGroupEntry may be specified as follows. However, it needs to be understood that embodiments related to the 'trif' sample group description entry may likewise use different syntax for describing a rectangular region.

```
class RectangularRegionGroupEntry( ) extends
VisualSampleGroupEntry ('trif')
{
    unsigned int(16) groupID;
    unsigned int(1) rect_region_flag;
    if (!rect_region_flag)
        bit(7) reserved = 0;
    else {
        unsigned int(2) independent_idc;
        unsigned int(1) full_picture;
        unsigned int(1) filtering_disabled;
        unsigned int(1) has_dependency_list;
        bit(2) reserved = 0;
        if (!full_picture) {
            unsigned int(16) horizontal_offset;
            unsigned int(16) vertical_offset;
        }
        unsigned int(16) region_width;
        unsigned int(16) region_height;
        if (has_dependency_list) {
            unsigned int(16)
dependency_rect_region_count;
            for (i=1; i<= dependency_rect_region_count; i++)
                unsigned int(16)
dependencyRectRegionGroupID;
        }
}
```

The semantics of RectangularRegionGroupEntry may be specified as follows. However, it needs to be understood that embodiments related to the 'trif' sample group description entry may likewise use different semantics for describing a rectangular region.

groupID is a unique identifier for the rectangular region group described by this sample group entry. The value of groupID in a rectangular region group entry shall be greater than 0. The value 0 is reserved for a special use.

There can be multiple rectangular region group entries with the same values of horizontal_offset, vertical_offset, region_width and region_height, respectively, but with different groupID values, for describing varying dependencies.

rect_region_flag equal to 1 specifies that the region covered by the NAL units within a picture and associated with this rectangular region group entry is a rectangular region, and further information of the rectangular region is provided by subsequent fields in this rectangular region group entry. The value 0 specifies that the region covered by the NAL units within a picture and associated with this rectangular region group entry is not a rectangular region, and no further information of the region is provided in this rectangular region group entry.

independent_idc specifies the coding dependencies between each rectangular region associated with this rectangular region group entry and other rectangular regions in the same picture or in reference pictures of the same layer. Inter-layer dependencies, if any, are indicated by a list of dependencyRectRegionGroupID (when has_dependency_list is equal to 1). This field may take the following values:

If independent_idc equals 0, the coding dependencies between this rectangular region and other rectangular regions in the same picture or in reference pictures of the same layer is either described by a list of dependencyRectRegionGroupID (when has_dependency_list is equal to 1) or unknown (when has_dependency_list is equal to 0).

If independent_idc equals 1, there are no temporal dependencies between this rectangular region and the rectangular regions with different groupID in any reference pictures of the same layer but there can be coding dependencies between this rectangular region and a rectangular region with the same groupID in a reference picture of the same layer.

If independent_idc equals 2, there are no coding dependencies between this rectangular region and any rectangular region in a reference picture of the same layer.

full_picture, when set, indicates that each rectangular region associated with this rectangular region group entry is a complete picture, in which case region_width and region_height shall be set to the width and height, respectively, of the complete picture, and independent_idc shall be set to 1 or 2.

filtering_disabled, when set, indicates that for each rectangular region associated with this rectangular region group entry the in-loop filtering operation does not require access to pixels adjacent to this rectangular region, i.e., bit-exact reconstruction of the rectangular region is possible without decoding the adjacent rectangular regions.

has_dependency_list, when set to 1, indicates that dependency_rect_region_count and, when dependency_rect_region_count is greater than 0, a list of dependencyRectRegionGroupID are present. When set to 0, dependency_rect_region_count is not present and no dependencyRectRegionGroupID is present.

horizontal_offset and vertical_offset give respectively the horizontal and vertical offsets of the top-left pixel of the rectangular region that is covered by the NAL units in each rectangular region associated with this rectangular region group entry, relative to the top-left pixel of the base region, in luma samples. The base region used in the RectangularRegionGroupEntry is the picture to which the NAL units in a rectangular region associated with this rectangular region group entry belongs.

The definition of the base region may be overridden by definitions in the clause for a specific coding system.

region_width and region_height give respectively the width and height of the rectangular region that is covered by the NAL units in each rectangular region associated with this rectangular region group entry, in luma samples.

For coded streams using spatial scalability and rectangular regions on both the base and enhancement layers, when each layer is carried in its own track, the RectangularRegionGroupEntry sample descriptions of the base layer gives coordinates expressed in luma samples of the base layer, while the RectangularRegionGroupEntry sample descriptions of an enhancement layer gives coordinates expressed in luma samples of the enhancement layer.

dependency_rect_region_count indicates the number of rectangular regions each rectangular region associated with this rectangular region group entry depends on.

dependencyRectRegionGroupID gives the groupID of a rectangular region (as defined by a RectangularRegionGroupEntry) that this rectangular region depends on. For a particular rectangular region associated with this rectangular region group entry, the rectangular regions it depends on may be from the same layer or the reference layers.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef (or file) by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

An Entity grouping is similar to track grouping but enables grouping of both tracks and items (e.g. image items) in the same group. The syntax of an entity grouping may be specified as follows:

```
aligned(8) class EntityToGroupBox(grouping_type,
    version, flags)
    extends FullBox(grouping_type, version, flags) {
        unsigned int(32) group_id;
        unsigned int(32) num_entities_in_group;
        for(i=0; i<num_entities_in_group; i++)
            unsigned int(32) entity_id;
    }
``` group_id is a non-negative integer assigned to the particular grouping that may not be equal to any group_id value of any other EntityToGroupBox, any item_ID value of the hierarchy level (file, movie. or track) that contains the GroupsListBox (containing the EntityToGroupBox), or any track_ID value (when the GroupsListBox is contained in the file level). num_entities_in_group specifies the number of entity_id values mapped to this entity group. entity_id is resolved to an item, when an item with item_ID equal to entity_id is present in the hierarchy level (file, movie or track) that contains the GroupsListBox (containing the EntityToGroupBox), or to a track, when a track with track_ID equal to entity_id is present and the GroupsListBox is contained in the file level.

High Efficiency Image File Format (HEIF) is a standard developed by the Moving Picture Experts Group (MPEG) for storage of images and image sequences. HEIF includes features building on top of the used ISO Base Media File Format (ISOBMFF). The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

HEIF supports derived image items. An item is a derived image item, when it includes a 'dimg' item reference to another item. A derived image is obtained by performing a specified operation (a.k.a image operation), such as rotation, to specified input images. The operation performed to obtain the derived image is identified by the item_type of the item. The image items used as input to a derived image may be coded images or they may be other derived image items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

HEIF supports predictively coded image items. Predictively coded image items have a decoding dependency to one or more other coded image items. An example for such an image item could be a P frame stored as an image item in a burst entity group that has IPPP . . . structure, with the P frames dependent only on the preceding I frames.

Capability to have predictively coded image items has certain benefits especially in content re-editing and cover image selection:

Image sequences can be converted to image items with no transcoding.

Any sample of an image sequence track can be selected as a cover image. The cover image does not need to be intra-coded.

Devices that do not have a video or image encoder are capable of updating the cover image of a file containing an image sequence track.

Storage efficiency is further achieved by re-using the predictively coded picture rather than re-encoding it as I frame and storing as an additional image item. Moreover, image quality degradation is also avoided.

Re-encoding might not be allowed or preferred by the copyright owner. Predictively coded image items avoid the need of re-encoding of any image from an image sequence track.

Predictively coded image items are linked to the coded image items they directly and indirectly depend on by item references of type 'pred'. The list of referenced items in item references of type 'pred' shall indicate the decoding order. When concatenated, the encoded media data of items with item_ID equal to to_item_ID for all values of j from 0 to reference_count−1, inclusive, in increasing order of j, followed by the item with item_ID equal to from_item_ID shall form a bitstream that conforms to the decoder configuration item property of the predictively coded image item.

In order to decode the predictively coded image item, there shall be no other decoding dependencies other than the image items referenced by item references of type 'pred'.

The predictively coded image item shall be associated with exactly one RequiredReferenceTypesProperty containing one reference type with the value 'pred'.

Image Grid Derivation

An item with an item_type value of 'grid' defines a derived image item whose reconstructed image is formed from one or more input images in a given grid order within a larger canvas.

The input images are inserted in row-major order, top-row first, left to right, in the order of SingleItemTypeReferenceBox of type 'dimg' for this derived image item within the ItemReferenceBox.

In the SingleItemTypeReferenceBox of type 'dimg', the value of from_item_ID identifies the derived image item of type 'grid', the value of reference_count shall be equal to rows*columns, and the values of to_item_ID identify the input images. All input images shall have exactly the same width and height; call those tile_width and tile_height. The tiled input images shall completely "cover" the reconstructed image grid canvas, where tile_width*columns is greater than or equal to output_width and tile_height*rows is greater than or equal to output_height.

The reconstructed image is formed by tiling the input images into a grid with a column width (potentially excluding the right-most column) equal to tile_width and a row height (potentially excluding the bottom-most row) equal to tile_height, without gap or overlap, and then trimming on the right and the bottom to the indicated output_width and output_height.

Syntax

```
aligned(8) class ImageGrid {
    unsigned int(8) version = 0;
    unsigned int(8) flags;
    FieldLength = ((flags & 1) + 1) * 16;
    unsigned int(8) rows_minus_one;
    unsigned int(8) columns_minus_one;
    unsigned int(FieldLength) output_width;
    unsigned int(FieldLength) output_height;
}
```

Semantics version shall be equal to 0. Readers shall not process an ImageGrid with an unrecognized version number.

(flags & 1) equal to 0 specifies that the length of the fields output_width, output_height, is 16 bits. (flags & 1) equal to 1 specifies that the length of the fields output_width, output_height, is 32 bits. The values of flags greater than 1 are reserved.

output_width, output_height: Specify the width and height, respectively, of the reconstructed image on which the input images are placed. The image area of the reconstructed image is referred to as the canvas.

rows_minus one, columns_minus one: Specify the number of rows of input images, and the number of input images per row. The value is one less than the number of rows or columns respectively. Input images populate the top row first, followed by the second and following, in the order of item references.

Selected Features of ISO/IEC 14496-15

Potential improvements on carriage of VVC and EVC in ISOBMFF are provided in MPEG document MDS19715/ISO/IEC JTC1/SC29/WG3 document N0035. A VVC track represents a VVC bitstream by including NAL units in its samples and sample entries and possibly by referencing other VVC tracks containing other sublayers of the VVC bitstream and possibly by referencing VVC subpicture tracks. When a VVC track references VVC subpicture tracks, it is referred to as a VVC base track.

A VVC base track represents the bitstream by implicitly combining sample data from the referenced VVC subpicture tracks. In VVC, the 'subp' track reference is used to refer to VVC subpicture tracks from a VVC base track.

A VVC track may contain a 'subp' track reference, with entries containing either a track_ID value of a VVC subpicture track or a track_group_id value of an 'alte' track group of VVC subpicture tracks.

When a VVC track contains a 'subp' track reference, it is referred to as a VVC base track and the following applies: the samples of the VVC track shall not contain VCL NAL units; and a sample group of type 'spor' shall be present.

When the VVC subpicture track is referenced by a VVC base track containing a 'spor' sample group description entry having subpic_id_info_flag equal to 1, the VVC subpicture track shall contain a subpicture ID sample group description, potentially using a default sample grouping mechanism.

A VVC subpicture track contains either of the following: a sequence of one or more VVC subpictures; or a sequence of one or more complete slices forming a rectangular area. A sample of a VVC subpicture track contains either of the following: one or more complete subpictures as specified in ISO/IEC 23090-3 that are contiguous in decoding order; or one or more complete slices as specified in ISO/IEC 23090-3 that form a rectangular area and are contiguous in decoding order.

The VVC subpictures or slices included in any sample of a VVC subpicture track are contiguous in decoding order. VVC non-VCL tracks and VVC subpicture tracks enable an optimal delivery of VVC video in streaming applications as follows. These tracks can each be carried in DASH representations of their own, and for decoding and rendering of a subset of the tracks, the DASH representations containing the subset of the VVC subpicture tracks as well as the DASH representation containing the non-VCL tracks can be requested by the client, segment by segment. This way, redundant transmission of APSs and other non-VCL NAL units can be avoided.

Subpicture Order Sample Group

A subpicture order sample group is used in VVC base tracks, i.e., in VVC tracks with 'subp' track referencing to VVC subpicture tracks. Each sample group description entry indicates the subpictures or slices of a coded picture in decoding order, where each index of the track reference of type 'subp' indicates one or more subpictures or slices that are contiguous in decoding order.

To ease PPS or SPS rewriting in response to subpicture selection, each sample group description entry may contain (1-5): 1) an indication if selected subpicture IDs should be changed in PPS or SPS NAL units; 2) the length (in bits) of subpicture ID syntax elements; 3) the bit position of subpicture ID syntax elements in the containing RBSP; 4) a flag indicating if start code emulation prevention bytes are present before or within subpicture IDs; and/or 5) the parameter set ID of the parameter set containing the subpicture IDs.

FIG. 1 is an example syntax of a subpicture order sample group, which is also shown below:

```
aligned(8) class VvcSubpicOrderEntry( ) extends
VisualSampleGroupEntry('spor')
{
    unsigned int(1) subpic_id_info_flag;
    unsigned int (15) num_subpic_ref_idx;
    for (i = 0; i < num_subpic_ref_idx; i++)
        unsigned int(16) subp_track_ref_idx;
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_sps_subpic_id_flag;
        if (pps_sps_subpic_id_flag)
            unsigned int(6) pps_id;
        else {
            unsigned int(4) sps_id;
            bit(2) reserved = 0;
        }
    }
}
```

The semantics of the subpicture order sample group are as follows:

subpic_id_info_flag equal to 0 specifies that the subpicture ID values provided in the SPSs and/or PPSs are correct for the indicated set of subp_track_ref_idx values and thus no rewriting of SPSs or PPSs is required. subpic_id_info_flag equal to 1 specifies that SPSs and/or PPSs may need rewriting to indicate the subpictures corresponding to the set of subp_track_ref_idx values.

num_subpic_ref_idx specifies the number of reference indices of subpicture tracks or track groups of subpicture tracks referenced by the VVC track.

subp_track_ref_idx, for each value of i, specifies a 'subp' track reference index of the i-th list of one or more subpictures or slices to be included in the VVC bitstream reconstructed from the VVC track.

subpic_id_len_minus1 plus 1 specifies the number of bits in subpicture identifier syntax elements in PPS or SPS, whichever is referenced by this structure.

subpic_id_bit_pos specifies the bit position starting from 0 of the first bit of the first subpicture ID syntax element in the referenced PPS or SPS RBSP.

start_code_emul_flag equal to 0 specifies that start code emulation prevention bytes are not present before or within subpicture IDs in the referenced PPS or SPS NAL unit. start_code_emul_flag equal to 1 specifies that start code emulation prevention bytes may be present before or within subpicture IDs in the referenced PPS or SPS NAL unit.

pps_sps_subpic_id_flag, when equal to 1, specifies that the PPS NAL units applying to the samples mapped to this sample group description entry contain subpicture ID syntax elements. pps_sps_subpic_id_flag, when equal to 0, specifies that the SPS NAL units applying to the samples mapped to this sample group description entry do not contain subpicture ID syntax elements.

pps_id, when present, specifies the PPS ID of the PPS applying to the samples mapped to this sample group description entry.

sps_id, when present, specifies the SPS ID of the SPS applying to the samples mapped to this sample group description entry.

Subpicture Entity Groups

Subpicture entity groups are defined providing level information indicating conformance of a merged bitstream out of several VVC subpicture tracks. VVC base tracks provide another mechanism for merging VVC subpicture tracks. An implicit reconstruction process requires modification of parameter sets. The subpicture entity groups give guidance to ease parameter set generation for the reconstructed bitstreams.

When the coded subpictures within the group that are to be jointly decoded are interchangeable, i.e. the player selects a number of active tracks from a group of sample-wise subpictures with the same level contribution, the SubpicCommonGroupBox indicates the combinatorial rules and the level_idc of a resulting combination when decoded jointly.

When there are coded subpictures with different properties, e.g. different resolution, which are selected to be jointly decoded, and the SubpicMultipleGroupsBox indicates the combinatorial rules and the level_idc of a resulting combination when decoded jointly.

All the entity_id values included in the subpicture entity groups shall identify VVC subpicture tracks. When present, SubpicCommonGroupBox and SubpicMultipleGroupsBox shall be contained in the GroupsListBox in the movie-level MetaBox and shall not be contained in file-level or track-level MetaBoxes.

FIG. 2 is an example syntax of a subpicture common group box, which is also shown below:

```
aligned(8) class SubpicCommonGroupBox extends
EntityToGroupBox('acgl',0,0)
{
    unsigned int(8) level_idc;
    bit(8) reserved = 0;
    unsigned int(16) num_active_tracks;
}
```

The semantics of the subpicture common group box are as follows:

level_idc specifies the level to which any selection of num_active_tracks entities among the entity group conforms.

num_active_tracks specifies the number of tracks for which the value of level_idc is provided.

FIG. 3 is an example syntax of a subpicture multiple groups box, which is also shown below:

```
aligned(8) class SubpicMultipleGroupsBox extends
EntityToGroupBox('amgl',0,0)
{
    unsigned int(8) level_idc;
    bit(8) reserved = 0;
    unsigned int(16) num_subgroup_ids;
```

-continued

```
    subgroupIdLen = (num_subgroup_ids >= (1 << 8)) ? 16 :
8;
    for (i = 0; i < num_entities_in_group; i++)
        unsigned int(subgroupIdLen) track_subgroup_id[i];
    for (i = 0; i < num_subgroup_ids; i++)
        unsigned int(16) num_active_tracks[i];
}
```

The semantics of the subpicture multiple groups box are as follows:

level_idc specifies the level to which the combination of selecting any num_active_tracks[i] tracks among the subgroup with ID equal to i for all values of i in the range of 0 to num_subgroup_ids−1, inclusive, conforms.

num_subgroup_ids specifies the number of separate subgroups, each identified by the same value of track subgroup_id[i]. Different subgroups are identified by different values of track subgroup_id[i].

track_subgroup_id[i] specifies the subgroup ID for the i-th track in this entity group. subgroup ID values shall range from 0 to num_subgroup_ids−1, inclusive.

num_active_tracks[i] specifies the number of tracks among the subgroup with ID equal to i that is documented in level_idc.

VVC Sync Samples

A sync sample in 'vvc1' and 'vvi1' tracks shall contain VCL NAL units indicating that the coded picture in the sample is an Instantaneous Decoding Refresh (IDR) picture, a Clean Random Access (CRA) picture, a Gradual Decoding Refresh (GDR) picture, or a Step-wise Temporal Sublayer Access (STSA) picture.

When the coded picture in a sync sample is a CRA picture, there shall be no RASL pictures associated with that CRA picture. When the coded picture in a sync sample is a GDR picture, it shall have ph_recovery_poc_cnt equal to 0 and there shall be no pictures following it in decoding order that precede it in presentation order. When the coded picture in a sync sample is a STSA picture, it shall have TemporalId equal to the lowest TemporalId in the track and there shall be no pictures following in decoding order that precede it in presentation order and the first following sample of each further sublayer in decoding order shall be of type STSA.

When there is no sync sample in a stream, the sync sample box is present and has entry_count equal to 0. A VVC stream is not required to contain IDR or CRA pictures but could start with a GDR picture. It is also possible that a VVC stream contains some CRA pictures but each of them has at least one associated RASL picture. When a track has a layer or sublayer dependency to another track containing VCL NAL units, the sync sample on the referenced track might not be at the same position and a sync sample at an earlier position in the referenced track might be needed to random access the dependent track.

Table 1, shown in FIG. 4 and below, indicates the mapping between VVC VCL NAL unit types, ISOBMFF sync sample status and SAP types as documented in ISOBMFF.

TABLE 1

Mapping of sync sample status and SAP types to NAL unit type

| NAL Unit Type | ISOBMFF sync sample status | DASH SAP type |
|---|---|---|
| IDR_N_LP | true | 1 |
| IDR_W_RADL | true | 2 (if the IRAP has associated RADL pictures) |
| | | 1 (if the IRAP has no associated RADL pictures) |

TABLE 1-continued

Mapping of sync sample status and SAP types to NAL unit type

| NAL Unit Type | ISOBMFF sync sample status | DASH SAP type |
|---|---|---|
| CRA | false | 3 (if the IRAP has associated RASL pictures) |
| | true | 2 (if the IRAP has no associated RASL pictures but has associated RADL pictures) |
| | true | 1 (if the IRAP has no associated leading pictures) |
| GDR | false | 4 (if the GDR has ph_recovery_poc_cnt greater than 0) |
| | false | 3 (if the GDR has ph_recovery_poc_cnt equal to 0 and the GDR has AUs following in decoding order that precede it in presentation order) |
| | true | 1 (if the GDR has ph_recovery_poc_cnt equal to 0 and the GDR does not have AUs following in decoding order that precede it in presentation order) |
| STSA | false | 3 (if the first AU of each further sublayer present in the track that follows the STSA AU in presentation order is also an STSA AU. There might be AUs in each further sublayer present in the track that follow the STSA AU in decoding order but precede it in presentation order that are not STSA AUs) |
| | true, if Tid is equal to the smallest Tid in the track and the first following sample of each further sublayer in decoding order is of type STSA | 2 (if the first AU of each further sublayer present in the track that follows the STSA in decoding order is also an STSA AU. There might be AUs following the STSA AU in decoding order that precede it in presentation order) 1 (if the first AU of each further sublayer present in the track that follows the STSA is also an STSA AU. There are no AUs preceding the STSA in presentation order) |

When the sample entry name is 'vvc1' and the track does not have a track reference of type 'vvcN', the following applies: if the sample is a sync sample, all parameter sets needed for decoding that sample shall be included either in the sample entry or in the sample itself. Otherwise (the sample is not a sync sample), all parameter sets needed for decoding the sample shall be included either in the sample entry or in any of the samples since the previous sync sample to the sample itself, inclusive.

For signaling of various types of random access points, the following guidelines are recommended: the sync sample table (and the equivalent flag in movie fragments) shall be used in a VVC track unless all samples are sync samples. The track fragment random access box refers to the presence of signaled sync samples in a movie fragment; the 'roll' sample group is recommended to be used only for GDR based random access points; the use of the Alternative Startup Sequences sample group is recommended to be used only with random access points consisting of CRA pictures.

In the context of this clause, the leading samples, defined as part of the definition of the 'rap' sample group in ISO/IEC 14496-12, contain Random Access Skipped Leading (RASL) access units as defined in ISO/IEC 23090-3.

Sync Sample Sample Grouping

Sync samples in HEVC may be of various types. These sample groups may be used to identify the sync samples of a specific type. If a sample group is given for a specific type of sync sample, then all samples (if any) containing that type of sync sample are marked by the group. If the group is absent (there is no sample to group mapping for that type), it is unknown which samples contain a sync sample of that type.

Sync Sample Sample Group Entry

A sync sample sample group entry identifies samples containing a sync sample of a specific type. The grouping_type_parameter is not defined for the SampleToGroupBox with grouping type 'sync'.

Syntax

```
class SyncSampleEntry( ) extends VisualSampleGroupEntry ('sync')
{
    bit(2) reserved = 0;
    unsigned int(6) NAL_unit_type;
}
```

Semantics

NAL_unit_type must be a type that identifies a valid sync sample (e.g. IDR).

Merging of VVC subpicture tracks may be based on sync sample information in the ISOBMFF-compliant container file. As discussed previously, the ISOBMFF specifies certain constraints on the setting of a sample as a sync sample. Even though the picture in the sample may be coded as any of a-d below, the sample is not set as a sync sample: a) an Instantaneous Decoding Refresh (IDR) picture, or b) a Clean Random Access (CRA) picture, or c) a Gradual Decoding Refresh (GDR) picture, or d) a Step-wise Temporal Sublayer Access (STSA) picture. Hence, the client/reader cannot determine the setting of the mixed NAL unit type picture flag with the sync sample information alone.

To enable the merging of VVC subpicture tracks and to determine the setting of mixed NAL unit type picture(s), the client/reader needs to wait until all VVC subpicture tracks and the corresponding VVC bitstream(s) are downloaded, and requires the client/reader to parse the VVC bitstream(s) and decode parts of it/them (parameter sets, PH). The parsing and decoding can be a relatively complex operation involving e.g. removal of start code emulation prevention bytes from NAL units to obtain RBSPs, or keeping track of implicit referencing from each slice header to a picture header and of explicit referencing from each slice header to PPS, SPS, and VPS and between parameter sets of different types. Additionally, parsing and decoding may be based on the syntax element values of the referenced syntax structures.

Enabling the merging of VVC subpicture tracks and determining the setting of mixed NAL unit type picture(s) also requires clients/readers to "compose" the destination VVC bitstream and encode parts of it (parameter sets, PH). The "composing" and encoding can be a relatively complex operation involving e.g. 1-3: 1) rewriting parameter sets and picture headers based on the source subpicture tracks selected for merging; 2) keeping track of implicit referencing from each slice header to a picture header and of explicit referencing from each slice header to PPS, SPS, and VPS and between parameter sets of different types. Encoding based on the syntax element values of the referenced syntax structures may also be involved; and/or 3) insertion of start code emulation prevention bytes to obtain NAL units from created RBSPs.

Therefore, an improved solution for merging of VVC subpictures resulting in mixed NAL unit type picture(s) in an ISOBMFF-compliant file, is desirable.

In the described embodiments, the terms base track and VVC base track are used interchangeably. Likewise, in the described embodiments, the terms subpicture track and VVC subpicture track are used interchangeably. Even if an embodiment is described with reference to a VVC base track and/or a VVC subpicture track, the embodiment is not limited to VVC but applies to any video coding scheme with a concept equivalent or similar to VVC subpictures.

A sample group of a new type is specified as described in the subsequent paragraphs. In an embodiment, a file writer or a similar entity generates an instance of the sample group in a container file that contains two or more subpicture tracks (or alike). In an embodiment, a file reader or a similar entity parses an instance of the sample group from a container file that contains two or more subpicture tracks (or alike).

Hereafter the sample group of the new type has the four-character code 'minp' (standing for "mixed NAL Unit Type pictures"), but it needs to be understood that any other four-character code could likewise be used.

The 'minp' sample group is intended to be used in a VVC base track, which a file reader or a similar entity resolves into a VVC destination bitstream. A VVC base track references VVC subpicture tracks from which the VVC destination bitstream can be derived, as described subsequently.

In an embodiment, each sample group description entry of the 'minp' sample group indicates two groups of VVC subpicture tracks or alternatively, each sample group description entry of the 'minp' sample group, may list pairs of groups of VVC subpicture tracks. If a VVC bitstream is composed by the merging of VVC subpicture(s) from one group only then there is no mixing of different NAL unit types. Alternatively, if a VVC bitstream is composed by the merging of VVC subpicture(s) from different groups then there is mixing of different NAL unit types.

In an alternate embodiment each sample group description entry of the 'minp' sample group indicates two groups of pairs of VVC subpicture tracks. When a VVC bitstream is resolved from the VVC base track containing the 'minp' sample group by merging the pairs of VVC subpicture tracks in first group then there is no mixing of different NAL unit types. Alternatively, when a VVC bitstream is resolved from the VVC base track containing the 'minp' sample group by merging the pairs of VVC subpicture tracks in second group then there is mixing of different NAL unit types.

In various embodiments, indicating a group of VVC subpicture tracks, a VVC subpicture track group, or a VVC subpicture track in a sample group description entry may be performed by including one or more of a track group ID, track ID or an entity group ID in the sample group description entry.

In an embodiment, to ease PPS rewriting in response to subpicture selection, each sample group description entry may contain:
- an indication if the two groups of pairs of VVC subpictures are present
- the bit position of mixed nal unit type in picture flag syntax element in the containing RBSP;
- the parameter set ID of the parameter set containing the mixed nal unit type in picture flag.

In an example embodiment, the 'minp' sample group syntax and semantics are given below:

Syntax

```
aligned(8) class VvcMixedNALUnitTypePicEntry( ) extends
VisualSampleGroupEntry('minp')
{
    unsigned int(1) unitorm_nalu_pic_group_flag;
    unsigned int(1) mix_nalu_pic_group_flag;
    bit(6) reserved=0;
    if(uniform_nalu_pic_group_flag){
        unsigned int(16) num_uniform_nalu_pic_idx;
        for (i = 0; i < num_uniform_nalu_pic_idx; i++){
            unsigned int(16) uni_subp_track_idx1;
            unsigned int(16) uni_subp_track_idx2;
        }
    }
    if(mix_nalu_pic_group_flag){
        unsigned int(16) num_mix_nalu_pic_idx;
        for (i = 0; i < num_mix_nalu_pic_idx; i++){
            unsigned int(16) mix_subp_track_idx1;
            unsigned int(16) mix_subp_track_idx2;
        }
        unsigned int(12) pps_mix_nalu_types_in_pic_bit_pos;
        unsigned int(6) pps_id;
    }
}
```

Semantics uniform_nalu_pic_group_flag, when equal to 0, specifies that the below information is not present. When equal to 1, the information below is present The group of pair of VVC subpicture tracks, the merging of which do not lead to mixing of NAL unit type pictures called as the uniform NAL unit type picture group.

mix_nalu_pic_group_flag, when equal to 0, specifies that the below information is not present. When equal to 1, the information below is present The group of pair of VVC subpicture tracks, the merging of which leads to mixing of NAL unit type pictures called the Mixed NAL unit type picture group.

num_uniform_nalu_pic_idx specifies the number of pair of reference indices of subpicture tracks or track groups of subpicture tracks referenced by the VVC track in the uniform NAL unit type picture group.

num_mix_nalu_pic_idx specifies the number of pair of reference indices of subpicture tracks or track groups of subpicture tracks referenced by the VVC track in the mixed NAL unit type picture group.

uni_subp_track_idx1 and uni_subp_track_idx2, for each value of i, specifies a track_ID value of a VVC subpicture track or a track_group_id value of an 'alte' track group of VVC subpicture tracks. The values of track_ID or a track_group_id carried by uni_subp_track_idx1 and uni_subp_track_idx2 are bounded by the respective values carried in the 'subp' track reference of the containing VVC base track.

Note: uni_subp_track_idx1 shall not be equal to uni_subp_track_idx2 mix_subp_track_idx1 and mix_subp_track_idx2, for each value of i, specifies a track_ID value of a VVC subpicture track or a track_group_id value of an 'alte' track group of VVC subpicture tracks. The values of track_ID or a track_group_id carried by mix_subp_track_idx1 and mix_ subp_track_idx2 are bounded by the respective values carried in the 'subp' track reference of the containing VVC base track.

Note: mix_subp_track_idx1 shall not be equal to mix_subp_track_idx2 pps_mix_nalu_types_in_pic_bit_pos specifies the bit position starting from 0 of the mixed NAL unit type in picture flag syntax element in the referenced PPS RBSP.

pps_id, when present, specifies the PPS ID of the PPS applying to the samples mapped to this sample group description entry.

In an embodiment, any other pair of VVC subpicture tracks which is not indicated in the 'minp' sample group description entry may lead to erroneous picture type not supported by the VVC specification.

In another embodiment, a VVC subpicture track may contain a 'uinu' (uniform NAL unit type pictures) track reference, with entries containing either a track_ID value of a VVC subpicture track or a track_group_id value of an 'alte' track group of VVC subpicture tracks.

When a VVC track contains a 'uinu' track reference the following applies. The embodiments below are described using examples A VVC base track (VB) contains a 'subp' track reference with entries containing track_ID values of SA and SB for two VVC subpicture tracks, respectively.

The VVC subpicture track SA contains a 'uinu' track reference with entries containing track_ID value of SB of the second VVC subpicture track.

If a VVC bitstream is resolved by the VVC base track VB and the client/reader chooses the two VVC subpicture tracks SA and SB for merging into the VVC bitstream. The client/reader parses the 'uinu' track reference contained in the VVC subpicture track SA to find the second VVC subpicture track SB as one of the entries; the client/reader declares that there is no mixed NAL unit type pictures present in the resolved VVC bitstream and set the corresponding mixed NAL unit type in picture flag in the PPS to zero.

In another embodiment, a VVC subpicture track may contain a 'minu' (mixed NAL unit type pictures) track reference, with entries containing either a track_ID value of a VVC subpicture track or a track_group_id value of an 'alte' track group of VVC subpicture tracks.

When a VVC track contains a 'minu' track reference the following applies. The embodiments below are described using examples A VVC base track (VB) contains a 'subp' track reference with entries containing track_ID values of SA and SB for two VVC subpicture tracks, respectively.

The VVC subpicture track SA contains a 'minu' track reference with entries containing track_ID value of SB of the second VVC subpicture track.

If a VVC bitstream is resolved by the VVC base track VB and the client/reader chooses the two VVC subpicture tracks SA and SB for merging into the VVC bitstream. The client/reader parses the 'minu' track reference contained in the VVC subpicture track SA to find the second VVC subpicture track SB as one of the entries; the client/reader declares that there is mixed NAL unit type pictures present in the resolved VVC bitstream and set the corresponding mixed NAL unit type in picture flag in the PPS to one.

Setting of Mixed NAL Unit Type in Pictures Based on Sync Samples

In an embodiment, a sync sample sample group is defined for VVC like the sync sample sample group of the HEVC.

In another embodiment, a sync sample time aligned sample group is defined for VVC. The samples of a VVC subpicture track time aligned with the Sync samples of other VVC subpicture tracks in VVC may be of various types. These sample groups may be used to identify the samples which are time aligned to sync samples of other subpicture tracks of a specific type. If a sample group is given for a specific type of time aligned sample, then all samples (if any) containing that type of time aligned sample are marked by the group. If the group is absent (there is no sample to group mapping for that type), it is unknown which samples contain a time aligned sample of that type.

Sync sample time aligned sample group entry

Definition

Group Types: 'syta'

Container: Sample Group Description Box ('sgpd')

Mandatory: No

Quantity: Zero or more

A sync sample time aligned sample group entry identifies samples of a VVC subpicture track which have a time aligned sync samples in other VVC subpicture tracks of a specific type. The grouping_type_parameter is not defined for the SampleToGroupBox with grouping type 'syta'.

Syntax

```
class SyncSampleEntry( ) extends VisualSampleGroupEntry
('syta')
{
    bit(2) reserved = 0;
    unsigned int(6) NAL_unit_type;
}
```

Semantics

NAL_unit_type must be a type that identifies a valid a sample time aligned with a sync sample (e.g. TRAIL_NUT).

Figure 8:
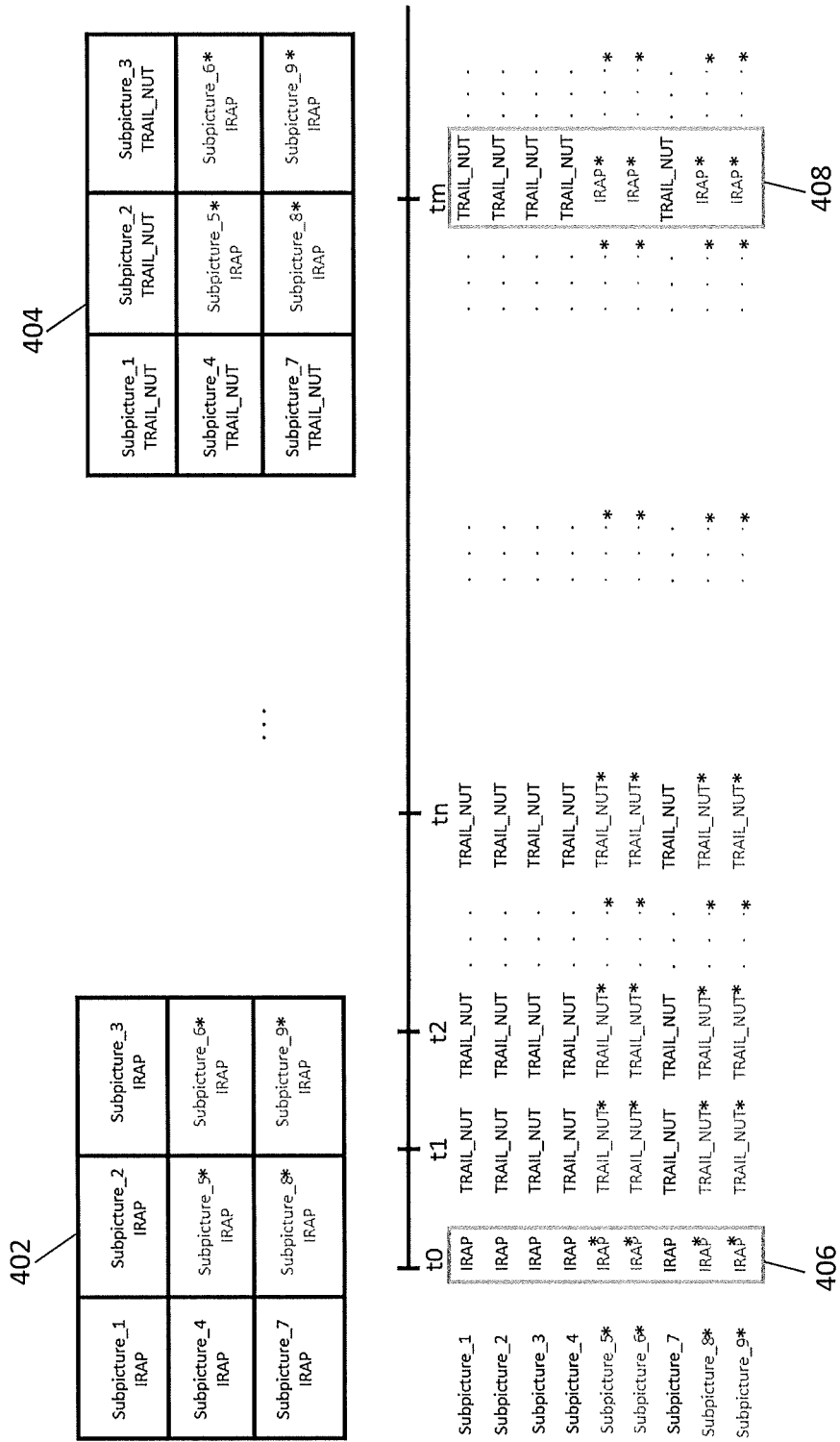
FIG. 8 shows a video sequence in which pictures are composed of 9 subpictures in a 3×3 grid, and mixed NAL unit types of slices in the composed picture.

The following embodiments are described using the example in FIG. 8. As shown in FIG. 8, VVC subpictures 5*, 6*, 8* and 9* have sync samples at time tm. Whereas VVC subpictures 1, 2, 3, 4 and 7 have a TRAIL NAL unit type.

In an example embodiment a VVC bitstream is formed by the merging of nine subpicture tracks as shown in FIG. 8. The VVC bitstream is formed after resolving the 'subp' track reference and 'spor' sample group description of the respective VVC base track. At a time tm the client/reader additionally parses the NAL unit type of the sync samples from the sync sample sample group information for the VVC subpictures tracks of 5*, 6*, 8* and 9* together with NAL unit type of the samples of other VVC subpicture tracks which are time aligned with these sync samples from the sync sample time aligned sample group information. Based on the parsed NAL unit type information the client/reader declares whether the mixed NAL unit type in picture flag is to be set in the corresponding PPS of the VVC bitstream.

Indicating a structure of VCL NAL unit types: In an embodiment, a VCL NAL unit structure sample group is specified. The sample group description entry includes a structure identifier, which may e.g. be called nalu_struct_id. Samples of VVC subpicture tracks may be mapped to the VCL NAL unit structure sample group. When time-aligned samples of two VVC subpicture tracks referenced by the same VVC base track are mapped to the same nalu_struct_id value, they have the same VCL NAL unit type. When time-aligned samples of two VVC subpicture tracks referenced by the same VVC base track are mapped to a different nalu_struct_id value, they have a different VCL NAL unit type. In an embodiment, a file writer maps a VCL NAL unit type value into a nalu_struct_id value (e.g. by directly using the VCL NAL unit type value as the nalu_struct_id value), creates a sample group description entry per VCL NAL unit type value, and maps, by using SampleToGroupBox(es), samples of VVC subpicture tracks separately into the VCL NAL unit structure sample group. In an embodiment, a file writer maps a group of pictures (a.k.a. a structure of pictures) into a nalu_struct_id value. For example, encoders may use hierarchical structures of pictures (a SOP or a GOP) repetitively, in which case file writers may map a run of pictures to the same nalu_struct_id value.

In an embodiment, a file reader concludes according to the nalu_struct_id values of the referenced VVC subpicture tracks when the composition of subpicture tracks leads to a mixture of NAL unit types. Consequently, the VVC bitstream reconstruction is done via the following process (a-b): a) at every instance when the composition of subpicture tracks leads to a mixture of NAL unit types where the pps_mixed_nalu_type_flag needs to be set to 1, then the reader inserts a new copy of the PPS into the resolved VVC bitstream with pps_mixed_nalu_type_flag equal to 1; b) after the time instance when the mixed-NAL unit type of slices is not applicable, a new copy of the PPS is inserted into the resolved VVC bitstream with pps_mixed_nalu_type_flag equal to 0.

Benefits and technical effects of the type specification and other examples described herein includes that usage of a sample group provides the possibility of merging only those VVC subpicture tracks that resolve into a conformant VVC bitstream. The type specification and other examples described herein also reduce the complexity of parsing/decoding the entire VVC subpicture bitstream(s) for merging.

Accordingly, based on the examples described herein, a method may be provided (from the perspective of a file writer) including: writing, in a container file, two or more subpicture tracks; writing, in the container file, a base track, which is intended to be resolved into a video bitstream; indicating, in the base track, two groups of subpictures; writing, in the container file, a sample group description entry indicative of a list of subpicture tracks belonging to each group of subpictures, wherein the subpictures belonging to only a specific group when combined there is no mixing of different NAL unit types, wherein the subpictures belonging to different groups when combined there is mixing of different NAL unit types; and indicating, in the container file, samples of the base track for which the sample group description entry is intended to be used for reconstructing the video bitstream.

Also based on the examples described herein, a method may be provided (from the perspective of a file reader) including: parsing, from a base track of a container file, two groups of subpictures; parsing, from the container file, a sample group description entry indicative of a list of subpicture tracks belonging to each group of subpictures, wherein the subpictures belonging to only a specific group when combined there is no mixing of different NAL unit types, wherein the subpictures belonging to different groups when combined there is mixing of different NAL unit types; parsing, from the container file, which set of samples of the base track the sample group description entry is intended to be used for reconstructing the video bitstream; and reconstructing, from the container file, coded pictures of a video bitstream corresponding to the set of samples by including time-aligned samples of the subpicture tracks belonging to only one of the group or belonging to different groups.

In an embodiment, subpicture tracks in the same 'alte' track group may have additional commonalities such as the NAL unit type of the slices are the same in the alternate subpictures corresponding to the same coding time. While a track group with the 'alte' four-character code is referred to by embodiments, the embodiments generally apply to any four-character code for a track group. For example, a four-character code of 'simn' referring to similar NAL unit type slices can be used to group subpicture tracks which have the same NAL unit type of slices corresponding to the same coding time.

In an embodiment, subpicture tracks in the same 'alte' track group may have the NAL unit type of the slices different in the alternate subpictures corresponding to the same coding time. While a track group with the 'alte' four-character code is referred to by embodiments, the embodiments generally apply to any four-character code for a track group. In an example embodiment, an 'mixn' track group collects the VVC subpicture tracks out of which any one can interchangeably be selected for resolving a VVC base track and have different NAL unit type of slices corresponding to the same coding time.

Figure 7:
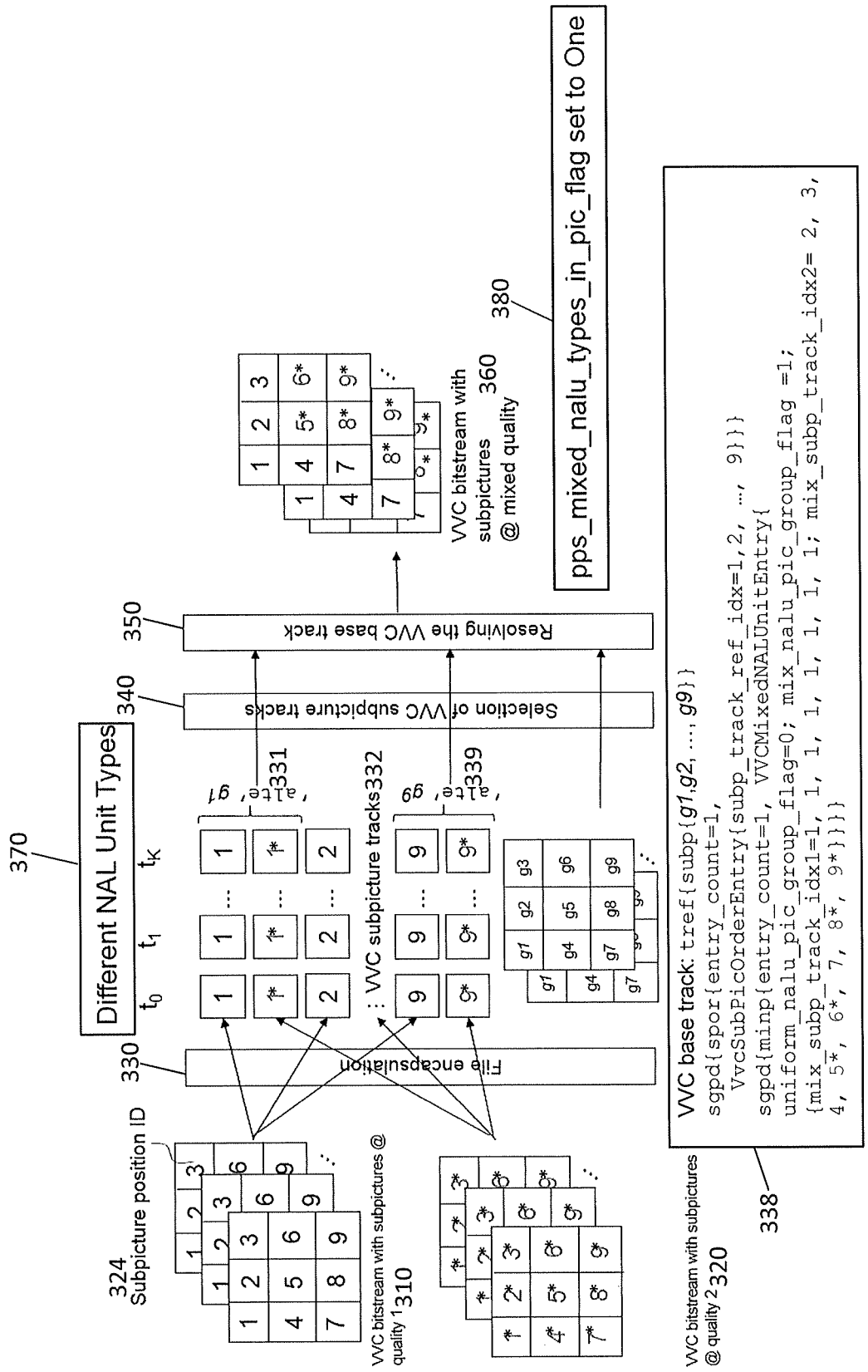
FIG. 7 shows VVC bitstream(s) composed of 9 subpictures, together with a file encapsulation and VVC selection and resolve process with non-homogenous NAL unit types.

The embodiments herein are described using the following examples. VVC bitstream(s) composed of 9 subpictures are shown in FIG. 5 and FIG. 7.

Encoding: A 3×3 grid has been used in forming of the pictures with subpictures. Two VVC bitstreams originating from the same source content are encoded at different picture qualities and bitrates.

Thus, FIG. 5 shows two VVC bitstreams 110 and 120, where each picture is a 3×3 grid comprised of subpictures 1-9. VVC bitstream 110 has subpictures with a quality of 1, and VVC bitstream 120 has subpictures with a quality of 2. In FIG. 5, the subpictures at quality 2 are given by an asterisk (*), though in FIG. 5, "1" and "1*", "2" and "2*", etc. have the same subpicture position ID of "1", and "2", etc., respectively.

Creation of VVC subpicture tracks: Each subpicture sequence is included in one VVC subpicture track. Each pair of VVC subpicture tracks that represent the same content, i.e. have the same position within the ERP picture, are indicated to be members of the same 'alte' track group. The track_group_id values g1, . . . , g9 are uniquely selected and are not equal to any track_ID value (e.g. a track_ID value for any of the VVC subpicture tracks 132).

Thus, in the example shown by FIG. 5, the VVC subpicture tracks are shown collectively as item 132. The subpictures having a subpicture position ID (denoted as 124) of "1" of VVC bitstream 110 and VVC bitstream 120 are members of the 'alte' g1 track group 131, and the subpictures having a subpicture position ID of "9" of VVC bitstream 110 and of VVC bitstream 120 are members of the 'alte' g9 track group 139. This is an example result of file encapsulation 130 from times $t_0$ through $t_K$, K corresponding to a coding time, an iteration time, or a sequence number time.

Creation of a VVC base track: With reference to FIG. 5, the VVC base track (syntax of which is shown by reference number 138) contains a track reference of type 'subp' listing all the track_group_id values g1, . . . , g9. The VVC base track 138 contains a 'spor' sample group with a single sample group description entry that contains a list of indices to the 'subp' track reference, i.e. values 1, . . . , 9, and is indicated to be the default that applies to all samples of the track. Additionally, the VVC base track 138 also contains a 'minp' sample group with a single sample group description entry that contains two lists of indices to the 'subp' track reference, i.e. values 1, . . . , 9, and is indicated to be the default that applies to all samples of the track. The two lists indicate whether the subpicture tracks have a similar or different NAL unit type of slices in the corresponding coding times. As shown in FIG. 5, the two lists are indicated by uni_subp_track_idx1 and uni_subp_track_idx2.

Player operation: A player chooses the quality at which each VVC subpicture track 132 among the same 'alte' track group is received based on certain conditions (e.g., the viewing orientation, network bandwidth). Refer to selection of VVC subpicture tracks 140. In this example the player receives VVC subpicture tracks 1, 2, 3, 4, and 7 at a particular quality (e.g. from VCC bitstream 110) and VVC subpicture tracks 5, 6, 8 and 9 at another quality (e.g. from VCC bitstream 120 as shown by the asterisks (*)). The VVC base track 138 is used to reconstruct a VVC bitstream that could be decoded with a single VVC decoder.

Each subpicture may have an alternate subpicture with the same width, height, and subpicture boundary properties; the corresponding subpicture tracks may be part of the same 'alte' track group. An 'alte' track group collects the VVC subpicture tracks 132 out of which any one can interchangeably be selected for resolving a VVC base track 150.

FIG. 5 shows such alternate track groups, for example subpicture with position ID 1 forms the 'alte' track group g1 131, similarly there are nine 'alte' track groups from g1 131 to g9 139 for the nine corresponding subpicture position IDs (collectively 124).

A VVC bitstream 160 which is a result of resolving the VVC base track 150 is composed of 9 subpictures. The subpictures in the resulting VVC bitstream 160 are chosen from either of the two subpicture tracks 132 in the corresponding track group (such as the subpicture tracks of groups g1 131 and g9 139). As indicated in FIG. 5, the resultant VVC bitstream 160 has subpictures of mixed quality.

Figure 6:
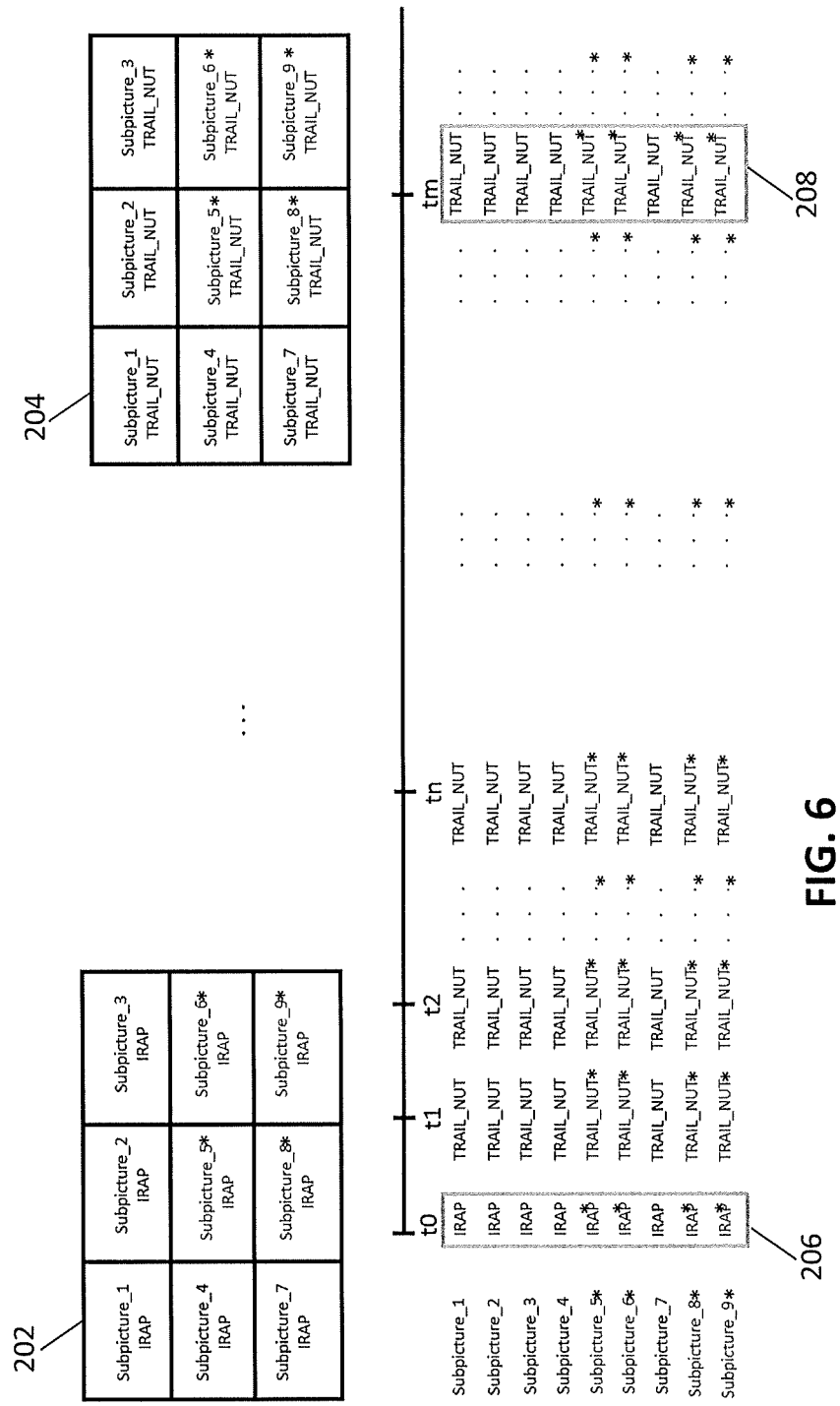
FIG. 6 shows a video sequence in which pictures are composed of 9 subpictures in a 3×3 grid, and homogenous NAL unit types of slices in the composed picture.

FIG. 6 shows a video sequence in which pictures (e.g. 202 and 204) are composed of 9 subpictures in a 3×3 grid. Each subpicture contains only one slice. The NAL unit type of the slices in the composed picture is the same/homogeneous (for example, IRAP(s) (collectively 206) in the picture 202 corresponding to time t0 and TRAIL_NUT(s) (collectively 208) in the picture corresponding to time tm 208). A video sequence with pictures composed of slices with homogeneous NAL unit types (refer also to 170 of FIG. 5) have the pps_mixed_nalu_types_in_pic_flag set to zero in the corresponding PPS (refer to 180 of FIG. 5). Refer also to 138 of FIG. 5, where mix_nalu_pic_group_flag=0.

In FIG. 6, a NAL unit type of IRAP is the same/homogenous as a NAL unit type of IRAP*. The asterisk (*) is used throughout FIG. 6 (and in the other figures) to indicate that a subpicture has a different quality than subpictures without the asterisk, including cases where " . . . " is used to represent a sequence continuation. In FIG. 6, the variables m and n correspond to a sequence number, and t time.

In an example embodiment, FIG. 7 shows VVC bitstream (s) 310 and 320 composed of 9 subpictures. Each subpicture may have an alternate subpicture with the same width, height, and subpicture boundary properties; the corresponding subpicture tracks (collectively 332) may be part of the same 'alte' track group, such as g1 331 or g9 339.

Similar to FIG. 5, in FIG. 7, the subpictures at quality 2 are given by an asterisk (*), though in FIG. 7, "1" and "1*", "2" and "2*", etc. have the same subpicture position ID of "1", and "2", etc., respectively.

In FIG. 7, the subpictures having a subpicture position ID (denoted as 324) of "1" of VVC bitstream 310 and VVC bitstream 320 are members of the 'alte' g1 track group 331, and the subpictures having a subpicture position ID of "9" of VVC bitstream 310 and of VVC bitstream 320 are members of the 'alte' g9 track group 339. This is an example result of file encapsulation 330, from times to through $t_K$, K corresponding to a coding time, an iteration time, or a sequence number time.

With further reference to FIG. 7, the VVC base track (syntax of which is shown by reference number 338) is similar to the VVC base track shown in FIG. 5. However in FIG. 7, the indices of the 'minp' sample group are mix_subp_track_idx1 and mix_subp_track_idx2, rather than uni_subp_track_idx1 and uni_subp_track_idx2 as shown in FIG. 5, respectively, which further indicate that the subpicture tracks have a different NAL unit type of slices in the corresponding coding times instead of a homogenous NAL unit type of slices.

Like in FIG. 5, in FIG. 7 a player chooses the quality at which each VVC subpicture track 332 among the same 'alte' track group is received based on certain conditions (e.g., the viewing orientation, network bandwidth). Refer to selection of VVC subpicture tracks 340. In this example the player receives VVC subpicture tracks 1, 2, 3, 4, and 7 at a particular quality (e.g. from VCC bitstream 310) and VVC subpicture tracks 5, 6, 8 and 9 at another quality (e.g. from VCC bitstream 320 as shown by the asterisks (*)).

A VVC bitstream 360 which is a result of resolving the VVC base track 350 is composed of 9 subpictures. The subpictures in the resulting VVC bitstream 360 are chosen from either of the two subpicture tracks 332 in the corresponding track group (such as the subpicture tracks of groups g1 331 and g9 339). As indicated in FIG. 7, the resultant VVC bitstream 360 has subpictures of mixed quality.

FIG. 8 shows a video sequence in which pictures (e.g. 402 and 404) are composed of 9 subpictures in a 3×3 grid. Each subpicture contains only one slice. The NAL unit type of the slices in the composed pictures may be the same or different (for example, IRAP slices (collectively 406) in the picture 402 corresponding to time t0 and IRAP & TRAIL_NUT slices (collectively 408) in the picture 404 corresponding to time tm. The combination of slices 408 in the picture 404 corresponding to time tm is bounded by the VVC standard as discussed previously). A video sequence where at least one picture is composed of at least two subpictures having slices with non-homogeneous NAL unit types as bounded by the VVC standard (refer also to 370 of FIG. 7) has the pps_mixed_nalu_types_in_pic_flag set to one (refer to 380 of FIG. 7) in the corresponding PPS. Refer also to 338 of FIG. 7, where mix_nalu_pic_group_flag=1. In FIG. 8, the variables m and n correspond to a sequence number, and t time.

In an embodiment, the sample group description entry of the 'minp' sample group is mapped to the first picture where the mixing of NAL unit types is allowed, and "no change" is indicated for other pictures.

In an embodiment, if there is only a subset of pictures where mixing of NAL unit types happen, then a bit mask is signaled/written indicating the pictures where mixing happens. E.g., when a CRA subpicture is followed by RADL and RASL subpictures and mixed with a TRAIL subpicture, the RADL and RASL subpictures are indicated by the bit mask.

In an embodiment, the sample group description entry is mapped to all pictures. Mapping a picture to no entry means that all subpicture tracks have the same picture type. In an embodiment, mixing of NAL unit types at an arbitrary position is not allowed but only at any SAP position. In an embodiment, sub-sample information may be defined for the case when a track contains multiple subpictures.

Reconstructing a destination VVC bitstream. In an embodiment, a file reader or a similar entity reconstructs a VVC bitstream by resolving a VVC base track. The VVC base track may be resolved in the decoding order of samples of the VVC base track. A sample of a VVC base track is resolved to an access unit in the destination VVC bitstream. The access unit is resolved to contain the NAL units carried in the sample of the VVC base track and at least the VCL NAL units of the VVC subpicture tracks that are selected among the referenced VVC subpicture tracks.

The NAL units included in the access unit are arranged in an order that complies with the constraints in the VVC specification. In an embodiment, a file reader or a similar entity arranges the NAL units as per the constraints in the VVC specification including the following.

In an embodiment, the ph_gdr_or_irap_pic_flag is set equal to 0 in the Picture Headers of the resolved VVC base track/bitstream, when the respective pictures may contain mixed VCL NAL unit types.

In an embodiment, the VVC bitstream reconstruction is done via the following process (a-b): a) at every instance when the composition of subpicture tracks leads to a mixture of NAL unit types where the pps_mixed_nalu_type_flag needs to be set to 1, then the reader inserts a new copy of a PPS into the resolved VVC bitstream with pps_mixed_nalu_type_flag equal to 1; b) after the time instance when the mixed-NAL unit type of slices is not applicable, a new copy of the PPS is inserted into the resolved VVC bitstream with pps_mixed_nalu_type_flag equal to 0.

The track reference indices listed as part of a 'minp' sample group description entry are resolved as follows (a-b): a) if the track reference points to a track ID of a VVC subpicture track, the track reference is resolved to the VVC subpicture track; b) otherwise (the track reference points to an 'alte' track group), the track reference is resolved to any of the tracks of the 'alte' track group. It may be required that if a particular track reference index value was resolved to a particular track in the previous sample, it may be resolved in the current sample to either of the following: the same particular track, or any other track in the same 'alte' track group that contains a sync sample or, in an embodiment, a SAP sample of type 3, that is time-aligned with the current sample.

Indicating a subpicture layout. Embodiments are described below with reference to the extraction reference sample group, but embodiments likewise apply to similar sample groups named otherwise. In an embodiment, a file writer or alike includes an extraction sample group in a track. Likewise, in an embodiment, a file reader or alike parses an extraction reference sample group from a track. In both embodiments, the extraction reference sample group may be specified essentially as follows. A sample group description entry of the extraction reference sample group may be called an extraction reference map entry or ExtractionReferenceMapEntry. The ExtractionReferenceMapEntry may be used to assign an identifier, which may be called groupID, to each extraction reference that may extract NAL unit data by reference from another track.

The definition of an extraction reference may be specific to the sample entry type and may also depend on the track references present in the track. In an embodiment, in an HEVC track with extractors (i.e. with 'scal' track references), an extraction reference is an extractor NAL-unit-like structure. In an embodiment, in a VVC base track, an extraction reference is an index of the track reference of type 'subp' within a 'spor' sample group description entry that indicates the subpictures or slices of a coded picture in decoding order.

The ExtractionReferenceMapEntry, when present, may be linked to a sample group description providing the semantics of that groupID. This link may be provided by setting a syntax element within the ExtractionReferenceMapEntry, e.g. called groupID_info_4cc, to the four-character code of the associated sample grouping type. In an embodiment for an HEVC track with extractors, the i-th extractor in a sample is mapped to the i-th loop entry in the ExtractionReferenceMapEntry and the groupID_info_4cc may be equal to 'trif'. In an embodiment for VVC base track, the i-th loop entry in a 'spor' sample group description entry is mapped to the i-th loop entry in the ExtractionReferenceMapEntry (where both sample group description entries are mapped to the same sample) and the groupID_info_4cc may be equal to 'trif'.

The syntax of ExtractionReferenceMapEntry may be specified as follows:

```
class ExtractionReferenceMapEntry( ) extends
VisualSampleGroupEntry ('exrm') {
    unsigned int(32) groupID_info_4cc;
    unsigned int(16) entry_count_minus1;
    for(i=0; i <= entry_count_minus1; i++)
        unsigned int(16) groupID;
}
```

The semantics of ExtractionReferenceMapEntry may be specified as follows: groupID_info_4cc specifies that further information of the groupID values specified in this entry are provide in a SampleGroupDescriptionBox with grouping_type equal to groupID_info_4cc. entry_count_minus1 plus 1 specifies the number of entries in the map and shall be equal to the number of extraction references that extract NAL unit data by reference from another track. groupID specifies the unique identifier of the group. More information about the group is provided by the sample group description entry with this groupID and grouping_type equal to the groupID_info_4cc.

Coded Picture Derivation from a Grid Image Item

In an embodiment, a grid derived image item is formed from coded image items, which may be coded e.g. with VVC. A file writer indicates, e.g. by using an item property, that a coded picture can be formed by merging the coded pictures used as input for the grid derived image item. The item property may e.g. be called a grid base item property.

In an embodiment, a file writer includes the parameter sets that can be used for decoding the merged picture in the grid base item property. A file writer may additionally include other NAL units, such as Supplemental Enhancement Information NAL units, that can be used for decoding the merged picture in the grid base item property or otherwise apply to the merged picture.

In an embodiment, a file reader interprets from an indication associated with a grid derived image item that a coded picture can be formed by merging the coded pictures used as input for the grid derived image item. The indication may for example be concluded from the presence of a particular item property, e.g. called a grid base item property, that is associated with the grid derived image item, or from particular value(s) of one or more syntax elements in a particular item property. As a consequence of interpreting that coded picture can be formed by merging the coded pictures used as input for the grid derived image item, a file reader creates a coded picture by merging the coded pictures used as input for the grid derived image item. A file reader may subsequently decode the merged coded picture or pass the merged coded picture to a decoder or player or alike for decoding. In an embodiment, a file reader extracts the parameter sets for decoding the merged picture from the grid base item property. A file reader includes the parameter sets obtained from the grid base item property into the merged picture. A file reader may omit including parameter sets from the coded pictures use as input for the grid derived image item to the merged picture. A file reader may additionally include other NAL units, such as Supplemental Enhancement Information NAL units, contained in the grid base item property into the merged picture.

Mixed NAL Unit in Picture in HEIF

In an embodiment, a grid derived image item is formed by image items as input, where an image item used as input could be a VVC image item and/or a VVC subpicture item. In an embodiment the input image item to the image grid could be a predictively coded image item.

In an embodiment, when an image grid is formed by mixing of VVC image items/VVC subpicture items and predictively coded VVC image item/VVC subpicture item then the resulting composed image may result in a mixed NAL unit type picture. A file writer includes a PPS into the grid base item property and sets pps_mixed_nalu_types_in_pic_flag equal to 1 in that PPS.

Figure 9:
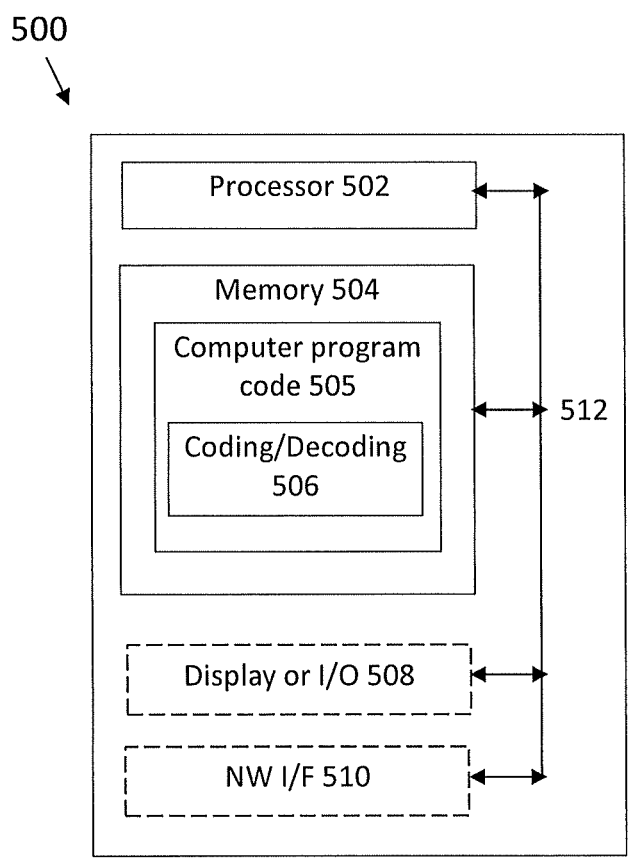
FIG. 9 is an example apparatus to implement or support mixed VCL NAL unit types within a coded picture, based on the examples described herein.

FIG. 9 is an apparatus 500 which may be implemented in hardware, configured to implement or support mixed VCL NAL unit types within a coded picture, based on any of the examples described herein. The apparatus comprises a processor 502, at least one memory 504 including computer program code 505, wherein the at least one memory 504 and the computer program code 505 are configured to, with the at least one processor 502, cause the apparatus to implement circuitry, a process, component, module, or function (collectively 506) to implement or support mixed VCL NAL unit types within a coded picture, based on the examples described herein. The apparatus 500 optionally includes a display and/or I/O interface 508 that may be used to display an output (e.g., an image) of a result of the component 506. The display and/or I/O interface 508 may also be configured to receive input such as user input (e.g. with a keypad). The apparatus 500 also optionally includes one or more network (NW) interfaces (I/F(s)) 510. The NW I/F(s) 510 may be wired and/or wireless and communicate over the Internet/other network(s) via any communication technique. The NW I/F(s) 510 may comprise one or more transmitters and one or more receivers. The N/W I/F(s) 510 may comprise standard well-known components such as an amplifier, filter, frequency-converter, (de)modulator, and encoder/decoder circuitry(ies) and one or more antennas.

The apparatus 500 may be a remote, virtual or cloud apparatus. The apparatus 500 may be either a writer or a reader (e.g. parser), or both a writer and a reader (e.g. parser). The apparatus 500 may be either a coder or a decoder, or both a coder and a decoder. The apparatus 500 may be a user equipment (UE), a head mounted display (HMD), or any other fixed or mobile device.

The memory 504 may be implemented using any suitable data storage technology, such as semiconductor based memory devices, flash memory, magnetic memory devices and systems, optical memory devices and systems, fixed memory and removable memory. The memory 504 may comprise a database for storing data. The memory 504 may be transitory, non-transitory, volatile, or non-volatile. Interface 512 enables data communication between the various items of apparatus 500, as shown in FIG. 9. Interface 512 may be one or more buses, such as address, data, or control buses, and may include any interconnection mechanism, such as a series of lines on a motherboard or integrated circuit, fiber optics or other optical communication equipment, and the like. The apparatus 500 need not comprise each of the features mentioned, or may comprise other features as well. The apparatus 500 may be an embodiment of any of the apparatuses shown in FIGS. 1 through 8 (inclusive), and FIGS. 12A-12D (inclusive), FIGS. 14A-15B (inclusive), and FIG. 17, including any combination of those. The apparatus 500 may be an encoder or decoder, or a codec. The apparatus 500 need not comprise each of the features mentioned, or may comprise other features as well.

Figure 10:
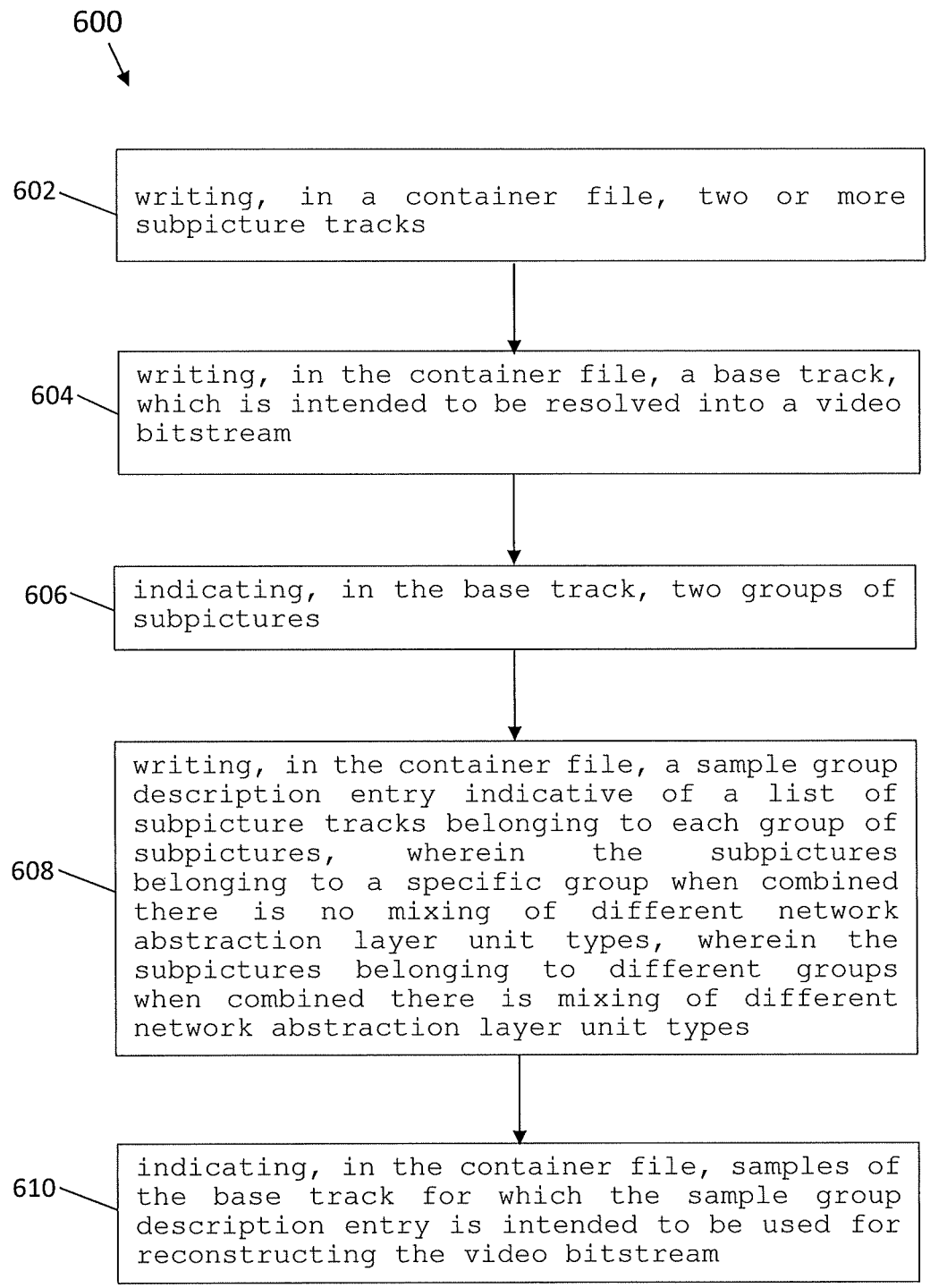
FIG. 10 is an example method to implement or support mixed VCL NAL unit types within a coded picture, based on the examples described herein.

FIG. 10 is an example method 600 to implement or support mixed VCL NAL unit types within a coded picture, based on the examples described herein. At 602, the method includes writing, in a container file, two or more subpicture tracks. At 604, the method includes writing, in the container file, a base track, which is intended to be resolved into a video bitstream. At 606, the method includes indicating, in the base track, two groups of subpictures. At 608, the method includes writing, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types. At 610, the method includes indicating, in the container file, samples of the base track for which the sample group description entry is intended to be used for reconstructing the video bitstream. Method 600 may be performed by a writer or an encoder (and in some examples, a decoder).

Figure 11:
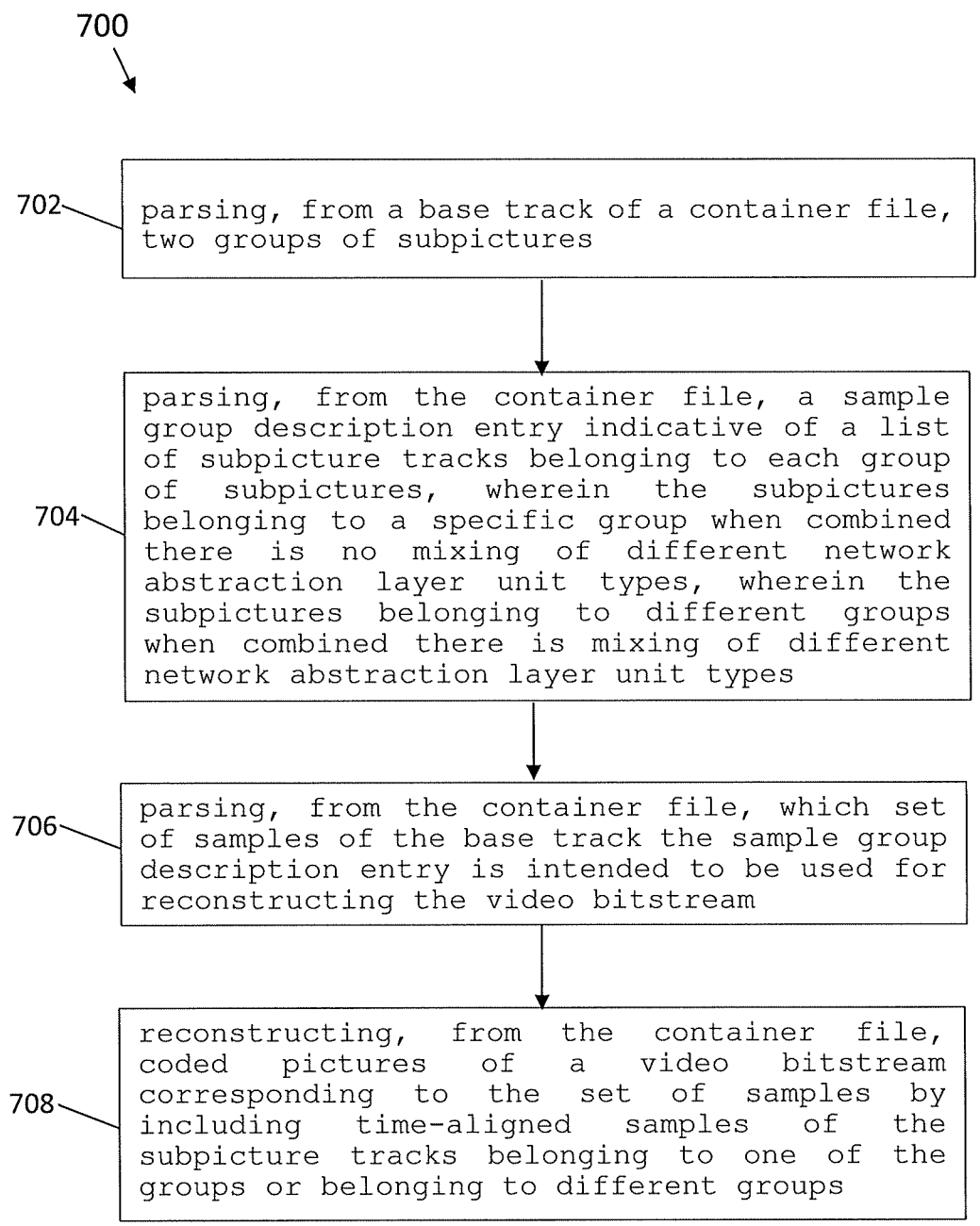
FIG. 11 is another example method to implement or support mixed VCL NAL unit types within a coded picture, based on the examples described herein.

FIG. 11 is another example method 700 to implement or support mixed VCL NAL unit types within a coded picture, based on the examples described herein. At 702, the method includes parsing, from a base track of a container file, two groups of subpictures. At 704, the method includes parsing, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types. At 706, the method includes parsing, from the container file, which set of samples of the base track the sample group description entry is intended to be used for reconstructing the video bitstream. At 708, the method includes reconstructing, from the container file, coded pictures of a video bitstream corresponding to the set of samples by including time-aligned samples of the subpicture tracks belonging to one of the groups or belonging to different groups.

An example apparatus includes at least one processor; and at least one non-transitory memory including computer program code; wherein the at least one memory and the computer program code are configured to, with the at least one processor, cause the apparatus at least to perform: write, in a container file, two or more subpicture tracks; write, in the container file, a base track, which is intended to be resolved into a video bitstream; indicate, in the base track, two groups of subpictures; write, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; and indicate, in the container file, samples of the base track for which the sample group description entry is intended to be used for reconstructing the video bitstream.

Other aspects of the apparatus may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. A track reference index of the sample group description entry may be resolved to a versatile video coding track in response to the track reference index pointing to a track identifier of the versatile video coding track, otherwise the track reference index of the second sample group description entry is resolved to a track of an alternate track group. Subpictures within an alternate track group may be comprised of a first set of subpictures having a first quality, and a second set of subpictures having a second quality. The reconstructed video bitstream may comprise subpictures from the first set and the second set. The at least one memory and the computer program code may be further configured to, with the at least one processor, cause the apparatus at least to perform: signal a bit mask in response to a subset of pictures having a mixing of network abstraction layer unit types. The reconstructing of the video bitstream may be performed such that: a new copy of a picture parameter set is inserted into the video bitstream with a variable flag set to one at every instance when a composition of subpicture tracks leads to a mixture of network abstraction layer unit types; and a new copy of the picture parameter set is inserted into the video bitstream with the variable flag set to zero at every instance when the composition of subpicture tracks does not lead to a mixture of network abstraction layer unit types.

An example apparatus includes at least one processor; and at least one non-transitory memory including computer program code; wherein the at least one memory and the computer program code are configured to, with the at least one processor, cause the apparatus at least to perform: parse, from a base track of a container file, two groups of subpictures; parse, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; parse, from the container file, which set of samples of the base track the sample group description entry is intended to be used for reconstructing the video bitstream; and reconstruct, from the container file, coded pictures of a video bitstream corresponding to the set of samples by including time-aligned samples of the subpicture tracks belonging to one of the groups or belonging to different groups.

Other aspects of the apparatus may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. The at least one memory and the computer program code may be further configured to, with the at least one processor, cause the apparatus at least to perform: resolve a track reference index of the sample group description entry to a versatile video coding track in response to the track reference index pointing to a track identifier of the versatile video coding track, otherwise resolving the track reference index of the sample group description entry to a track of an alternate track group. Subpictures within an alternate track group may be comprised of a first set of subpictures having a first quality, and a second set of subpictures having a second quality. The reconstructed video bitstream may comprise subpictures from the first set and the second set. A bit mask may be signaled in response to a subset of pictures having a mixing of network abstraction layer unit types. The at least one memory and the computer program code may be further configured to, with the at least one processor, cause the apparatus at least to perform, to reconstruct, from the container file, the coded pictures of the video bitstream: insert a new copy of a picture parameter set into the video bitstream with a variable flag set to one at every instance when a composition of subpicture tracks leads to a mixture of network abstraction layer unit types; and insert a new copy of the picture parameter set into the video bitstream with the variable flag set to zero at every instance when the composition of subpicture tracks does not lead to a mixture of network abstraction layer unit types.

An example apparatus includes means for writing, in a container file, two or more subpicture tracks; means for writing, in the container file, a base track, which is intended to be resolved into a video bitstream; means for indicating, in the base track, two groups of subpictures; means for writing, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; and means for indicating, in the container file, samples of the base track for which the sample group description entry is intended to be used for reconstructing the video bitstream.

Other aspects of the apparatus may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. A track reference index of the sample group description entry may be resolved to a versatile video coding track in response to the track reference index pointing to a track identifier of the versatile video coding track, otherwise the track reference index of the second sample group description entry is resolved to a track of an alternate track group. Subpictures within an alternate track group may be comprised of a first set of subpictures having a first quality, and a second set of subpictures having a second quality. The reconstructed video bitstream may comprise subpictures from the first set and the second set. The at least one memory and the computer program code may be further configured to, with the at least one processor, cause the apparatus at least to perform: signal a bit mask in response to a subset of pictures having a mixing of network abstraction layer unit types. The reconstructing of the video bitstream may be performed such that: a new copy of a picture parameter set is inserted into the video bitstream with a variable flag set to one at every instance when a composition of subpicture tracks leads to a mixture of network abstraction layer unit types; and a new copy of the picture parameter set is inserted into the video bitstream with the variable flag set to zero at every instance when the composition of subpicture tracks does not lead to a mixture of network abstraction layer unit types.

An example apparatus includes means for parsing, from a base track of a container file, two groups of subpictures; means for parsing, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; means for parsing, from the container file, which set of samples of the base track the sample group description entry is intended to be used for reconstructing the video bitstream; and means for reconstructing, from the container file, coded pictures of a video bitstream corresponding to the set of samples by including time-aligned samples of the subpicture tracks belonging to one of the groups or belonging to different groups.

Other aspects of the apparatus may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. The apparatus may further include means for resolving a track reference index of the sample group description entry to a versatile video coding track in response to the track reference index pointing to a track identifier of the versatile video coding track, otherwise resolving the track reference index of the sample group description entry to a track of an alternate track group. Subpictures within an alternate track group may be comprised of a first set of subpictures having a first quality, and a second set of subpictures having a second quality. The reconstructed video bitstream may comprise subpictures from the first set and the second set. A bit mask may be signaled in response to a subset of pictures having a mixing of network abstraction layer unit types. The apparatus may further comprise, to reconstruct, from the container file, the coded pictures of the video bitstream: means for inserting a new copy of a picture parameter set into the video bitstream with a variable flag set to one at every instance when a composition of subpicture tracks leads to a mixture of network abstraction layer unit types; and means for inserting a new copy of the picture parameter set into the video bitstream with the variable flag set to zero at every instance when the composition of subpicture tracks does not lead to a mixture of network abstraction layer unit types.

An example method includes writing, in a container file, two or more subpicture tracks; writing, in the container file, a base track, which is intended to be resolved into a video bitstream; indicating, in the base track, two groups of subpictures; writing, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; and indicating, in the container file, samples of the base track for which the sample group description entry is intended to be used for reconstructing the video bitstream.

Other aspects of the method may include the following. Subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. A track reference index of the sample group description entry may be resolved to a versatile video coding track in response to the track reference index pointing to a track identifier of the versatile video coding track, otherwise the track reference index of the second sample group description entry may be resolved to a track of an alternate track group. Subpictures within an alternate track group may be comprised of a first set of subpictures having a first quality, and a second set of subpictures having a second quality. The reconstructed video bitstream may comprise subpictures from the first set and the second set. The method may further comprise signaling a bit mask in response to a subset of pictures having a mixing of network abstraction layer unit types. The reconstructing of the video bitstream may be performed such that: a new copy of a picture parameter set is inserted into the video bitstream with a variable flag set to one at every instance when a composition of subpicture tracks leads to a mixture of network abstraction layer unit types; and a new copy of the picture parameter set is inserted into the video bitstream with the variable flag set to zero at every instance when the composition of subpicture tracks does not lead to a mixture of network abstraction layer unit types.

An example method includes parsing, from a base track of a container file, two groups of subpictures; parsing, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; parsing, from the container file, which set of samples of the base track the sample group description entry is intended to be used for reconstructing the video bitstream; and reconstructing, from the container file, coded pictures of a video bitstream corresponding to the set of samples by including time-aligned samples of the subpicture tracks belonging to one of the groups or belonging to different groups.

Other aspects of the method may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. The method may further include resolving a track reference index of the sample group description entry to a versatile video coding track in response to the track reference index pointing to a track identifier of the versatile video coding track, otherwise resolving the track reference index of the sample group description entry to a track of an alternate track group. Subpictures within an alternate track group may be comprised of a first set of subpictures having a first quality, and a second set of subpictures having a second quality. The reconstructed video bitstream may comprise subpictures from the first set and the second set. A bit mask may be signaled in response to a subset of pictures having a mixing of network abstraction layer unit types. The method may further comprise, to reconstruct, from the container file, the coded pictures of the video bitstream: inserting a new copy of a picture parameter set into the video bitstream with a variable flag set to one at every instance when a composition of subpicture tracks leads to a mixture of network abstraction layer unit types; and inserting a new copy of the picture parameter set into the video bitstream with the variable flag set to zero at every instance when the composition of subpicture tracks does not lead to a mixture of network abstraction layer unit types.

An example non-transitory program storage device readable by a machine, tangibly embodying a program of instructions executable by the machine for performing operations may be provided, the operations comprising: writing, in a container file, two or more subpicture tracks; writing, in the container file, a base track, which is intended to be resolved into a video bitstream; indicating, in the base track, two groups of subpictures; writing, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; and indicating, in the container file, samples of the base track for which the sample group description entry is intended to be used for reconstructing the video bitstream.

Other aspects of the non-transitory program storage device may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. A track reference index of the sample group description entry may be resolved to a versatile video coding track in response to the track reference index pointing to a track identifier of the versatile video coding track, otherwise the track reference index of the second sample group description entry is resolved to a track of an alternate track group. Subpictures within an alternate track group may be comprised of a first set of subpictures having a first quality, and a second set of subpictures having a second quality. The reconstructed video bitstream may comprise subpictures from the first set and the second set. The operations of the non-transitory program storage device may further include signaling a bit mask in response to a subset of pictures having a mixing of network abstraction layer unit types. The reconstructing of the video bitstream may performed such that: a new copy of a picture parameter set is inserted into the video bitstream with a variable flag set to one at every instance when a composition of subpicture tracks leads to a mixture of network abstraction layer unit types; and a new copy of the picture parameter set is inserted into the video bitstream with the variable flag set to zero at every instance when the composition of subpicture tracks does not lead to a mixture of network abstraction layer unit types.

An example non-transitory program storage device readable by a machine, tangibly embodying a program of instructions executable by the machine for performing operations may be provided, the operations comprising: parsing, from a base track of a container file, two groups of subpictures; parsing, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; parsing, from the container file, which set of samples of the base track the sample group description entry is intended to be used for reconstructing the video bitstream; and reconstructing, from the container file, coded pictures of a video bitstream corresponding to the set of samples by including time-aligned samples of the subpicture tracks belonging to one of the groups or belonging to different groups.

Other aspects of the non-transitory program storage device may include the following. The subpicture tracks belonging to a specific group of subpictures may comprise slices of a same network abstraction layer unit type in alternate subpictures corresponding to a coding time. The subpicture tracks belonging to a specific group of subpictures may comprise slices of a different network abstraction layer unit type in alternate subpictures corresponding to a coding time. The sample group description entry may comprise two lists of indices to a track reference, wherein the two lists indicate whether the subpicture tracks have a similar or different network abstraction layer unit type of slices in corresponding coding times. The sample group description entry may be mapped to a picture where mixing of network abstraction layer types is permitted, and no change is indicated for pictures other than the mapped picture. The operations of the non-transitory program storage device may further include resolving a track reference index of the sample group description entry to a versatile video coding track in response to the track reference index pointing to a track identifier of the versatile video coding track, otherwise resolving the track reference index of the sample group description entry to a track of an alternate track group. Subpictures within an alternate track group are comprised of a first set of subpictures having a first quality, and a second set of subpictures having a second quality. The reconstructed video bitstream comprises subpictures from the first set and the second set. A bit mask may be signaled in response to a subset of pictures having a mixing of network abstraction layer unit types. The operations of the non-transitory program storage device may further include, to reconstruct, from the container file, the coded pictures of the video bitstream: inserting a new copy of a picture parameter set into the video bitstream with a variable flag set to one at every instance when a composition of subpicture tracks leads to a mixture of network abstraction layer unit types; and inserting a new copy of the picture parameter set into the video bitstream with the variable flag set to zero at every instance when the composition of subpicture tracks does not lead to a mixture of network abstraction layer unit types.

An example apparatus includes one or more circuitries configured to implement the method of any of the examples described herein, including writing, in a container file, two or more subpicture tracks; writing, in the container file, a base track, which is intended to be resolved into a video bitstream; indicating, in the base track, two groups of subpictures; writing, in the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; and indicating, in the container file, samples of the base track for which the sample group description entry is intended to be used for reconstructing the video bitstream.

An example apparatus includes one or more circuitries configured to implement the method of any of the examples described herein, including parsing, from a base track of a container file, two groups of subpictures; parsing, from the container file, a sample group description entry indicative of a list of subpicture tracks belonging to each group of subpictures, wherein the subpictures belonging to a specific group when combined there is no mixing of different network abstraction layer unit types, wherein the subpictures belonging to different groups when combined there is mixing of different network abstraction layer unit types; parsing, from the container file, which set of samples of the base track the sample group description entry is intended to be used for reconstructing the video bitstream; and reconstructing, from the container file, coded pictures of a video bitstream corresponding to the set of samples by including time-aligned samples of the subpicture tracks belonging to one of the groups or belonging to different groups.

The VVC standard allows mixed NAL unit types within the same picture. A patent application was filed by the Applicant/assignee of this instant disclosure as U.S. provisional patent application No. 63/088,676 ("the '676 application") based on the subject matter previously described herein. The subject matter described in the '676 application as well as herein proposes a solution for merging of VVC subpictures resulting in mixed NAL unit type picture(s) in an ISOBMFF-compliant file.

The current design for carriage of VVC in ISOBMFF supports two different ways for merging of VVC subpicture tracks. In the first way the VVC base track refers to the VVC subpicture tracks and/or VVC subpicture track groups using the 'subp' track reference. A file reader parses the VVC base track, the VVC subpicture tracks and/or VVC subpicture track groups and uses the information provided in the 'spor' sample group to merge the corresponding tracks to obtain a conforming VVC bitstream. In the second way the file reader parses the information in the VVC subpicture tracks and/or VVC subpicture track groups and uses the information in the SubpicCommonGroupBox and SubpicMultipleGroupsBox entity groups when present to merge the corresponding VVC subpicture tracks to obtain a conforming VVC bitstream.

Some embodiments provided in the '676 application and described herein lists track IDs or the track group ID values in the VVC mixed nal unit sample group. However, in some examples, listing track IDs and track group ID values is expensive in terms of bit count, since 32 bits are used for each ID and listing each pair of track IDs resulting into NAL unit type mixing could be needed. For example, in the example of FIG. 12A, FIG. 12B, FIG. 12C, and FIG. 12D, the following 24 track ID pairs need to be indicated:

(1G1,3G2), (1G1, 4G2), (1G1, 3G3), (1G1, 4G3), (1G1, 3G4), (1G1, 4G4),
(2G1,3G2), (2G1, 4G2), (2G1, 3G3), (2G1, 4G3), (2G1, 3G4), (2G1, 4G4),
(1G2, 3G3), (1G2, 4G3), (1G2, 3G4), (1G2, 4G4),
(2G2, 3G3), (2G2, 4G3), (2G2, 3G4), (2G2, 4G4),
(1G3, 3G4), (1G3, 4G4),
(2G3, 3G4), (2G3, 4G4).

When the number subpictures in a picture is greater than in this example, the number of combinations that need to be indicated could become very large. It may also be not suitable for file editing (for example adding or removal of new tracks, or renumbering track IDs or track group IDs), since the file editor would need to modify the sample group entries.

In the first way of merging VVC subpicture tracks the 'subp' track reference may list only the nested VVC subpicture track group (a VVC subpicture track group grouping other VVC subpicture track groups), or the track group indexed in the 'subp' track reference may contain VVC subpicture tracks with different IRAP period as shown in FIG. 12. In such cases a file reader with 'subp' track reference indexes does not conclude on merging of which VVC subpicture tracks leads to a mixed NAL unit type pictures. FIG. 12A, FIG. 12B, FIG. 12C, and FIG. 12D show a 2×2 VVC subpicture bitstream with VVC base track and nested track groups.

FIG. 12A shows a VVC bitstream 800 with four VVC subpictures in a 2×2 layout. As shown in FIG. 12A, the VVC bitstream 800 includes VVC subpicture 801, VVC subpicture 802, VVC subpicture 803, and VVC subpicture 804. Each VVC subpicture is defined by the corresponding VVC subpicture track in the file. Each VVC subpicture position is represented by a VVC subpicture track group (track groups G1 to G4) where the track group lists a set of VVC subpicture tracks which are alternate to each other.

FIG. 12B shows a VVC base track 805 which refers to the VVC subpicture tracks using the 'subp' track reference 808. The 'spor' sample group 809 in the VVC base track 805 provides the decoding order of the VVC subpicture tracks/track groups as indexed by the 'subp' track reference. Refer to the subp_track_ref_idx item 812. As shown, the 'subp' track reference 808 is contained within track reference 'tref' 806.

FIG. 12C shows a track group G2 812 (for VVC subpicture position 2) which lists only VVC subpicture tracks which are alternate for each other. In the example shown in FIG. 12C, there are four VVC subpicture tracks with four different quality levels, namely VVC subpicture tracks 814-1, 814-2, 814-3, and 814-4. As shown track group 'alte' G2 812 is contained within track group 810.

Whereas FIG. 12D shows a track group G3 826 (for VVC subpicture position 3) which lists other VVC subpicture track groups which are alternate for each other. In the example case the track group G3 826 lists track group 'a' 828 and track group 'b' 830 as alternate for each other. The track group 'a' 828 lists two VVC subpicture tracks with two different qualities and IRAP period X (namely VVC subpicture tracks 814-5 and 814-6) whereas the track group 'b' 830 lists two VVC subpicture tracks (namely VVC subpicture tracks 814-7 and 814-8) with two different qualities and IRAP period Y (where X is not equal to Y).

In the second way of merging VVC subpicture tracks since there is no 'minp' sample group information present in the file a file reader has to parse all the VVC subpicture tracks and/or VVC subpicture track groups to conclude on the mixed NAL unit type picture.

Therefore, an improved solution for merging of VVC subpictures resulting in mixed NAL unit type picture(s) in an ISOBMFF-compliant file, is desirable.

In an embodiment, each sample group description entry of the 'minp' sample group lists pairs of VVC subpicture track groups or VVC subpicture tracks. If a VVC bitstream is composed by the merging of VVC subpicture(s) in a manner that there is no listed pair whose both elements would resolve into the VVC subpicture tracks that have been merged, then there is no mixing of different NAL unit types.

In various embodiments, indicating a group of VVC subpicture tracks, a VVC subpicture track group, or a VVC subpicture track in a sample group description entry may be performed by including a track reference index in the sample group description entry. In an embodiment, the track reference index has a pre-defined four-character code, which may be specified e.g. in a file format specification. In an embodiment, the track reference index has a four-character code that is indicated in the sample group description entry.

Combinations Leading to Erroneous NAL Unit Type

Section 7.4.2.2 in the VVC specification indicates the following about the mixing of NAL unit types within a picture.

As mentioned herein (as well as the '676 application), for VCL NAL units of any particular picture, the following applies (i.-ii.): i.) if pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU; ii.) otherwise (pps_mixed_nalu_types_in_pic_flag is equal to 1), all of the following constraints apply (1-4): 1) the picture shall have at least two subpictures; 2) VCL NAL units of the picture shall have two or more different nal_unit_type values; 3) there shall be no VCL NAL unit of the picture that has nal_unit_type equal to GDR_NUT; 4) when a VCL NAL unit of the picture has nal_unit_type equal to nalUnitTypeA that is equal to IDR_W_RADL, IDR_N_LP, or CRA_NUT, other VCL NAL units of the picture shall all have nal_unit_type equal to nalUnitTypeA or TRAIL_NUT.

Based on the above information the following table/mapping has been formulated as shown in FIG. 13.

Subpicture Layout Signaling

The VVC subpicture layout signaling is present in the Sequence Parameter Set (SPS) of the VVC bitstream. One of the aims of VVC carriage in ISOBMFF is to avoid VVC-specific syntax parsing and re-writing.

With the current design of VVC in ISOBMFF, however, in the first way of merging VVC subpicture tracks a VVC player/reader must parse the Sequence Parameter Set (SPS) of the VVC base track to figure out the position of each VVC subpicture track within the layout of the decoded picture.

In the second way of merging VVC subpicture tracks a file reader has to parse/decode certain parts of the NAL units of the VVC subpicture tracks and compose a layout of its own as constrained by the encoding characteristics of VVC subpicture bitstreams together with the information in the SubpicCommonGroupBox and SubpicMultipleGroupsBox entity groups when present.

The examples described herein (as well as within the '676 application) provide solutions for signaling the layout of a rectangular region within a decoded picture. However, these solutions are for the case when an extractor like NAL units are present in the track, whereas the carriage of VVC in ISOBMFF does not support an extractor like NAL units to be present in a track.

Therefore, another solution for the signaling of rectangular region/subpicture layout within a decoded picture in an ISOBMFF-compliant file, is desirable.

In the described embodiments, the terms base track and VVC base track are used interchangeably. Likewise, in the described embodiments, the terms subpicture track and VVC subpicture track are used interchangeably. Even if an embodiment is described with reference to VVC base track and/or VVC subpicture track, the embodiment is not limited to VVC but applies to any video coding scheme with a concept equivalent or similar to VVC subpictures.

In various described embodiments, containing or listing a track or a track group in the mixed NAL unit type pictures ('minp') sample group or alike may be carried out through one or more indexes to a track reference of a particular type that identifies the track or the track group.

A track reference of a new type is specified as described in the subsequent paragraphs. In an embodiment, a file writer or a similar entity generates an instance of the track reference in a container file that contains two or more subpicture tracks (or alike). In an embodiment, a file reader or a similar entity parses an instance of the track reference from a container file that contains two or more subpicture tracks (or alike).

Hereafter the track reference of the new type has the four-character code 'mixn' (standing for "mixed NAL Unit Type"), but it needs to be understood that any other four-character code could likewise be used.

The 'mixn' track reference is intended to be used in a VVC base track, which a file reader or a similar entity resolves into a VVC destination bitstream. A VVC base track references VVC subpicture tracks from which the VVC destination bitstream can be derived, as described subsequently.

A 'mixn' track reference contains either a track_ID value of a VVC subpicture track or a track_group_id value of a track group of VVC subpicture tracks. In an embodiment, a new type of a track group (e.g. called sequence of NAL unit types 'snut') is provided, wherein tracks mapped to the same 'snut' track group have the same VCL NAL unit type in their time-aligned samples. A 'mixn' track reference may refer to a 'snut' track group ID. In another embodiment, a 'mixn' track reference may refer to a track group ID of an existing type of a track group, such as 'alte'. In an embodiment, the referenced track group is not a nested track group; that is the track group referred to by the 'mixn' track reference does not list any other track groups but only lists VVC subpicture tracks. In an embodiment, the track group referred by the 'mixn' track reference contains VVC subpicture tracks with the same IRAP periods.

Benefits and technical effects of the disclosed examples include that the usage of a track reference provides the possibility of merging only those VVC subpicture tracks that resolve into a conformant VVC bitstream. Also, the examples described herein reduce the complexity of providing track IDs of VVC subpicture tracks for merging.

Solutions for VVC Subpicture Track Merging with VVC Base Track

FIG. 14A, FIG. 14B, and FIG. 14C illustrate a track group of VVC subpicture tracks and a 'mixn' track reference 832. When a VVC base track 805 has a 'mixn' track reference to VVC subpicture tracks, the following applies (1.-3. below):

1. When a 'mixn' track reference refers to an 'alte' track group of VVC subpicture tracks, the 'alte' track group of VVC subpicture tracks referred by the VVC base track shall not group VVC subpicture tracks with different VCL NAL unit types in time-aligned samples. For example, in this case the 'alte' track group shall not group VVC subpicture tracks with different IRAP periods, but rather the VVC subpicture tracks in the 'alte' track group shall have the same IRAP period.

2. If the 'alte' track group of VVC subpicture tracks referred by the VVC base track groups VVC subpicture tracks with different IRAP periods (for example as shown in FIG. 14A), then either of the following could be done: 2a. The 'mixn' track reference lists the track IDs of all the VVC subpicture tracks with different IRAP periods in the said 'alte' track group. However, the 'mixn' track reference may or may not list the track group ID of the 'alte' track group of VVC subpicture tracks with different IRAP periods. 2b. VVC subpicture tracks are grouped into one or more 'snut' track groups, where each 'snut' track group contains the VVC subpicture tracks with the same VCL NAL unit type in time-aligned samples. The 'mixn' track reference lists the track group IDs of the 'snut' track groups.

In an embodiment, the VVC subpicture tracks in the same 'snut' track group are necessarily independent of any other VVC subpicture tracks referenced by the same VVC base track to avoid decoding mismatches and could therefore be constrained as follows:

All the VVC subpicture tracks contain VVC subpictures.
The subpicture boundaries are like picture boundaries.

3. If a nesting of track groups occurs for example as shown in FIG. 14B, then the 'mixn' track reference may or may not list the track group ID of the track group at the highest level. For example, the 'mixn' track reference may or may not list the track group ID G3 of the 'alte' track group at the highest level in FIG. 12D. The 'mixn' track reference shall list the track group IDs of all the track groups at the lower level in the nested track groups. For example in FIG. 12D the 'mixn' track reference lists the track group ID values of 'a' and 'b' of the 'alte' track groups 828 and 830 at the lower level. If any of the track groups in the lower level of the nested track groups contain VVC subpicture tracks with different IRAP periods (which is not the case in FIG. 12D) then the condition of point 2 immediately above is applicable.

Figures 15A, 15B:
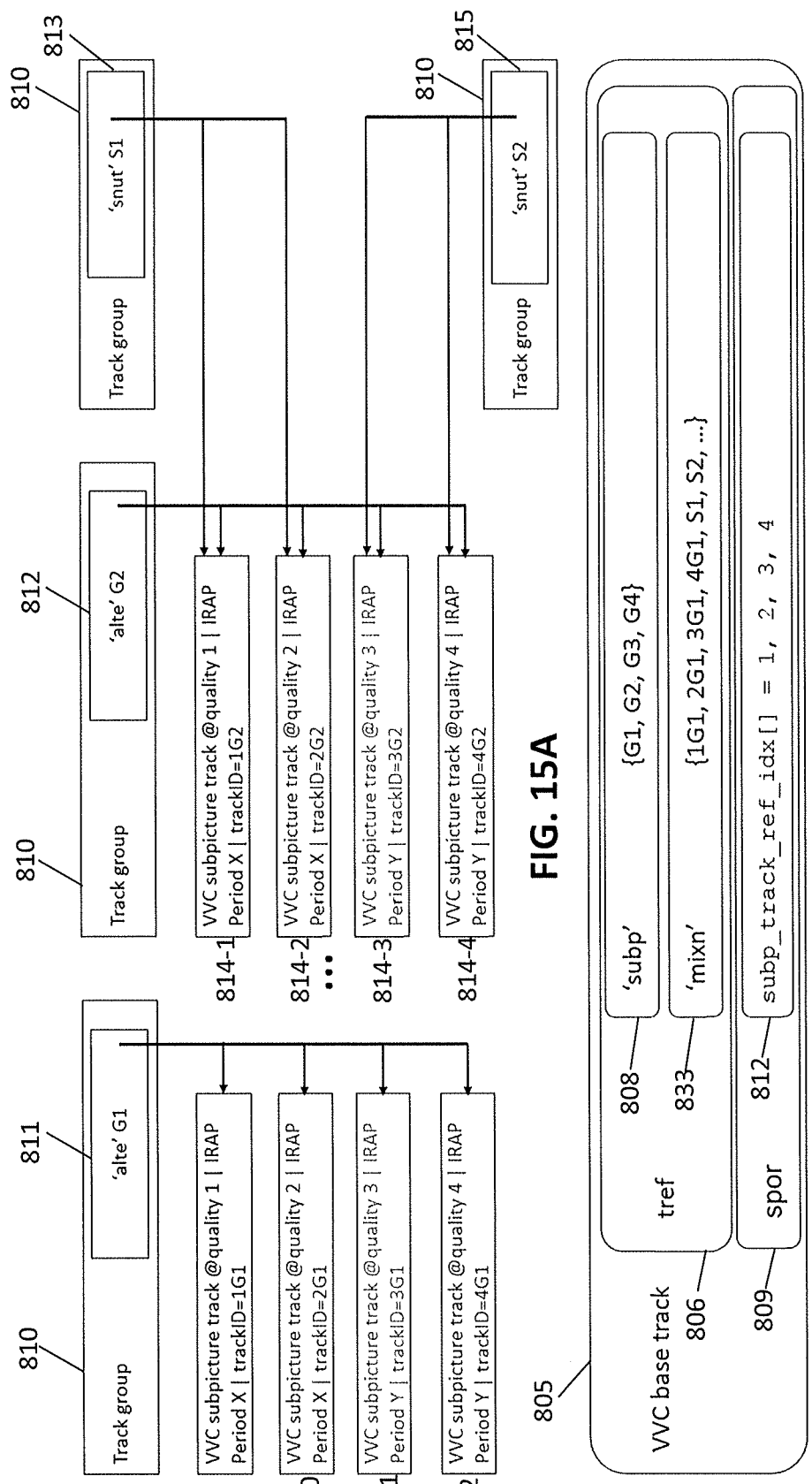
FIG. 15A shows two 'snut' track groups S1 and S2 referencing subpicture tracks of the track group 'alte' G2 track group.
FIG. 15B shows track reference of type 'mixn' in the VVC base track.

In an example embodiment, FIG. 15A shows two 'snut' track groups S1 813 and S2 815 referencing subpicture tracks of the track group 'alte' G2 track group 812, and FIG. 15B shows a track reference of type 'mixn' 833 in the VVC base track 805. The 'mixn' track reference 833 lists the track group IDs of 'snut' track group (813 or 815 having track group IDs S1 and S2, respectively) or lists the track IDs of all the VVC subpicture tracks in the 'alte' track group (e.g. 811) with different VCL NAL unit type in time-aligned samples, such as subpicture tracks 814-9, 814-10, 814-11, and 814-12 of the 'alte' G1 811 track group having VVC subpicture track IDs 1G1, 2G1, 3G1, and 4G1, respectively.

In the example of FIG. 15A and FIG. 15B, a 'minp' sample group entry needs to include the following pairs of track reference indices (3G1, S1) (4G1, S1) (1G1, S2) (2G1, S2) for mixed VCL NAL units in a picture. The number of pairs does not depend on the number of subpictures in a picture.

In an alternate solution, the 'subp' track reference 808 may be reused for the signaling of mixed NAL unit type pictures. In such a case the same conditions defined above for the 'mixn' track reference 832/833 apply for a VVC base track 805 referring to the VVC subpicture track with the 'subp' track reference 808.

1. In an embodiment, when a 'subp' track reference refers to an 'alte' track group of VVC subpicture tracks, the 'alte' track group of VVC subpicture tracks referred by the VVC base track shall not group VVC subpicture tracks with different VCL NAL unit types in time-aligned samples. For example, in this case the 'alte' track group shall not group VVC subpicture tracks with different IRAP periods, but rather the VVC subpicture tracks in the 'alte' track group shall have the same IRAP period.

2. In an embodiment, if the 'alte' track group of VVC subpicture tracks referred by the VVC base track groups VVC subpicture tracks with different IRAP periods (for example as shown in FIG. 14A), then either of the following could be done: 2a. The 'subp' track reference 808 lists the track IDs of all the VVC subpicture tracks with different IRAP periods in the said 'alte' track group. Additionally, the 'subp' track reference lists the track group ID of the 'alte' track group of VVC subpicture tracks with different IRAP periods (see for example 'subp' track reference 808 listing track IDs G1 and G2 of the 'alte' track groups 811 and 812, respectively, in FIG. 15B). 2b. VVC subpicture tracks are grouped into one or more 'snut' track groups, where each 'snut' track group contains the VVC subpicture tracks with the same VCL NAL unit type in time-aligned samples (as for example shown in FIG. 15A, where 'snut' track group S1 813 contains the VVC subpicture tracks 814-1 and 814-2 with the same VCL NAL unit type (IRAP Period X) in time-aligned samples, and where 'snut' track group S2 815 contains the VVC subpicture tracks 814-3 and 814-4 with the same VCL NAL unit type (IRAP Period Y) in time-aligned samples). The 'subp' track reference 808 lists the track group IDs of the 'snut' track groups.

3. In an embodiment, if a nesting of track groups occurs for example as shown in FIG. 14B, then the 'subp' track reference lists the track group ID of the track group at the highest level. For example, the 'subp' track reference lists the track group ID G3 of the 'alte' track group at the highest level in FIG. 12D (or in FIG. 14B). The 'subp' track reference shall list the track group IDs of all the track groups at the lower level in the nested track groups. For example in FIG. 12D (or FIG. 14B) the 'subp' track reference 808 lists the track group ID values of 'a' and 'b' of the 'alte' track groups 828 and 830 at the lower level. If any of the track groups in the lower level of the nested track groups contain VVC subpicture tracks with different IRAP periods (which is not the case in FIG. 12D and FIG. 14B) then the condition of point 2 immediately above is applicable.

In the example shown in FIG. 14C, the 'mixn' track reference 832 lists the track IDs of subpicture track 814-1 (with a track ID of 1G2), subpicture track 814-2 (with a track ID of 2G2), subpicture track 814-3 (with a track ID of 3G2), subpicture track 814-4 (with a track ID of 4G2), track group 'a' 828, and track group 'b' 830.

The Mixed NAL Unit Type Pictures Sample Group is Modified as Described Below.

This sample group is used in VVC base tracks, i.e., in VVC tracks with the 'subp' and 'mixn' track referencing to VVC subpicture tracks. Each sample group description entry indicates at least one of the following three groups of pairs of VVC subpicture track reference indices. The three groups of pairs of VVC subpicture track reference indices are the 1) mixed NAL unit type picture group, 2) the uniform NAL unit type picture group, and 3) non-conforming NAL unit type picture group.

When a VVC bitstream is resolved from the VVC base track containing the 'minp' sample group by merging the pairs of VVC subpicture tracks in the mixed NAL unit type group signaled in the 'minp' sample group entry then there is mixing of different NAL unit types.

When a VVC bitstream is resolved from the VVC base track containing the 'minp' sample group by merging only the pairs of VVC subpicture tracks in the uniform NAL unit type group signaled in the 'minp' sample group entry then there is no mixing of different NAL unit types.

When a VVC bitstream is resolved from the VVC base track containing the 'minp' sample group by merging the pairs of VVC subpicture tracks in the non-conforming NAL unit type group signaled in the 'minp' sample group entry then there is mixing of NAL unit with non-conformant types. The non-conformance is with respect to the VVC standard. Alternatively, the non-conformance can be established with respect to any other standard which provides a similar subpicture functionality as defined by the examples described herein.

In an embodiment (the syntax and semantics of which is provided immediately below), to ease PPS rewriting in response to subpicture selection, each sample group description entry may contain: the bit position of the pps_mixed_nalu_types_in_pic_flag syntax element in the containing RBSP; and the parameter set ID of the parameter set containing the pps_mixed_nalu_types_in_pic_flag syntax element.

Syntax

```
aligned(8) class VvcMixedNALUnitTypePicEntry( ) extends
VisualSampleGroupEntry('minp')
{
    unsigned int(16) num_mix_nalu_pic_idx;
    for (i = 0; i < num_mix_nalu_pic_idx; i++){
        unsigned int(16) mix_subp_track_idx1[i];
        unsigned int(16) mix_subp_track_idx2[i];
    }
    unsigned int(16) num_uni_nalu_pic_idx;
    for (i = 0; i < num_uni_nalu_pic_idx; i++){
        unsigned int(16) uni_subp_track_idx1[i];
        unsigned int(16) uni_subp_track_idx2[i];
    }
    unsigned int(16) num_nonc_nalu_pic_idx;
    for (i = 0; i < num_nonc_nalu_pic_idx; i++){
        unsigned int(16) nonc_subp_track_idx1[i];
        unsigned int(16) nonc_subp_track_idx2[i];
    }
    unsigned int(10) pps_mix_nalu_types_in_pic_bit_pos;
    unsigned int(6) pps_id;
}
```

Semantics num_mix_nalu_pic_idx specifies the number of pairs of reference indices of subpicture tracks or track groups of subpicture tracks referenced by the VVC base track leading to mixed NAL unit type pictures.

mix_subp_track_idx1[i] and mix_subp_track_idx2[i], for each value of i, specifies the index of the track_ID of a VVC subpicture track or the index of a track_group_id of an 'alte' track group of VVC subpicture tracks. The indices of track_ID or a track_group_id carried by mix_subp_track_idx1[i] and mix_subp_track_idx2[i] are mapped to the respective indices carried in the 'mixn' track reference of the containing VVC base track. The value of mix_subp_track_idx1[i] shall not be equal to mix_subp_track_idx2[i]. When a VVC bitstream is resolved from merging of VVC subpicture tracks in the mixed NAL unit type group then there is mixing of different NAL unit types.

num_uni_nalu_pic_idx specifies the number of pairs of reference indices of subpicture tracks or track groups of subpicture tracks referenced by the VVC base track leading to uniform NAL unit type pictures.

uni_subp_track_idx1[i] and uni_subp_track_idx2[i], for each value of i, specifies the index of the track_ID of a VVC subpicture track or the index of a track_group_id of an 'alte' track group of VVC subpicture tracks. The indices of track_ID or a track_group_id carried by uni_subp_track_idx1[i] and uni_subp_track_idx2[i] are mapped to the respective indices carried in the 'mixn' track reference of the containing VVC base track. The value of uni_subp_track_idx1[i] shall not be equal to uni_subp_track_idx2[i]. When a VVC bitstream is resolved from merging of only VVC subpicture tracks in the uniform NAL unit type group then there is no mixing of different NAL unit types.

num_nonc_nalu_pic_idx specifies the number of pairs of reference indices of subpicture tracks or track groups of subpicture tracks referenced by the VVC base track leading to non-conformant NAL unit type pictures.

nonc_subp_track_idx1[i] and nonc_subp_track_idx2[i], for each value of i, specifies the index of the track_ID of a VVC subpicture track or the index of a track_group_id of an 'alte' track group of VVC subpicture tracks. The indices of track_ID or a track_group_id carried by nonc_subp_track_idx1[i] and nonc_subp_track_idx2[i] are mapped to the respective indices carried in the 'mixn' track reference of the containing VVC base track. The value of nonc_subp_track_idx1[i] shall not be equal to nonc_subp_track_idx2[i]. When a VVC bitstream is resolved from merging of VVC subpicture tracks in the non-conformant NAL unit type group then there is mixing of NAL units with non-conformant type.

pps_mix_nalu_types_in_pic_bit_pos specifies the bit position starting from 0 of the pps_mixed_nalu_types_in_pic_flag syntax element in the referenced PPS RBSP.

pps_id specifies the PPS ID of the PPS applying to the samples mapped to this sample group description entry.

In an alternate solution if only the 'subp' track reference is used in the VVC base track then the semantics of mix_subp_track_idx1[i] and mix_subp_track_idx2[i] is as follows.

mix_subp_track_idx1[i] and mix_subp_track_idx2[i], for each value of i, specifies the index of the track_ID of a VVC subpicture track or the index of a track_group_id of an 'alte' track group of VVC subpicture tracks. The indices of track_ID or a track_group_id carried by mix_subp_track_idx1[i] and mix_subp_track_idx2[i] are mapped to the respective indices carried in the 'subp' track reference of the containing VVC base track. The value of mix_subp_track_idx1[i] shall not be equal to mix_subp_track_idx2[i]. When a VVC bitstream is resolved from merging of VVC subpicture tracks in the mixed NAL unit type group then there is mixing of different NAL unit types.

uni_subp_track_idx1[i] and uni_subp_track_idx2[i], for each value of i, specifies the index of the track_ID of a VVC subpicture track or the index of a track_group_id of an 'alte' track group of VVC subpicture tracks. The indices of track_ID or a track_group_id carried by uni_subp_track_idx1[i] and uni_subp_track_idx2[i] are mapped to the respective indices carried in the 'subp' track reference of the containing VVC base track. The value of uni_subp_track_idx1[i] shall not be equal to uni_subp_track_idx2[i]. When a VVC bitstream is resolved from merging of only VVC subpicture tracks in the uniform NAL unit type group then there is no mixing of different NAL unit types.

nonc_subp_track_idx1[i] and nonc_subp_track_idx2[i], for each value of i, specifies the index of the track_ID of a VVC subpicture track or the index of a track_group_id of an 'alte' track group of VVC subpicture tracks. The indices of track_ID or a track_group_id carried by nonc_subp_track_idx1[i] and nonc_subp_track_idx2[i] are mapped to the respective indices carried in the 'subp' track reference of the containing VVC base track. The value of nonc_subp_track_idx1[i] shall not be equal to nonc_subp_track_idx2[i]. When a VVC bitstream is resolved from merging of VVC subpicture tracks in the non-conformant NAL unit type group then there is mixing of NAL units with non-conformant type.

The Reconstructing of a Picture Unit from a Sample in a VVC Track Referencing VVC Subpicture Tracks with 'mixnä Track Reference.

In an embodiment, when there is a 'minp' sample group description entry mapped to a sample of the VVC base track, one or more the following operations i) and/or ii) may be applied as part of reconstructing a picture unit that corresponds to the sample:

i) The 'minp' sample group description entry is studied to conclude the value of pps_mixed_nalu_types_in_pic_flag as follows. If any pair of subpicture tracks selected to reconstruct a picture unit have track ID values that map to mix_subp_track_idx1[i] and mix_subp_track_idx2[i] with the same value of i, pps_mixed_nalu_types_in_pic_flag is concluded to be equal to 1. Otherwise, pps_mixed_nalu_types_in_pic_flag is concluded to be equal to 0. The following examination is performed for each pair of track ID values of subpicture tracks selected to reconstruct a picture unit to determine whether they map to the track reference mix_subp_track_idx1[i] or mix_subp_track_idx2[i] in the 'minp' sample group description entry mapped to this sample:

If the track reference points to the track ID directly, the track ID maps to mix_subp_track_idx1[i] or mix_subp_track_idx2[i].

Otherwise, if both of the following are true:
the track reference points to an 'alte' track group or a 'snut' track group, and
the 'alte' track group or the 'snut' track group, respectively, contains a track having the track ID value,
the track ID value maps to mix_subp_track_idx1[i] or mix_subp_track_idx2[i].

Otherwise, the track ID value does not map to mix_subp_track_idx1[i] or mix_subp_track_idx2[i].

ii) If the concluded pps_mixed_nalu_types_in_pic_flag value differs from that in the previous PPS NAL unit with the same PPS ID in the reconstructed bitstream, the following applies:

If no PPS with the same PPS ID is present or was included earlier in the picture unit, the reader includes a copy of the PPS with the updated pps_mixed_nalu_types_in_pic_flag value in the reconstructed picture unit.

Otherwise, the reader overwrites the pps_mixed_nalu_types_in_pic_flag in the PPS in the picture unit to set it equal to the concluded value. The reader may use the bit position in the 'minp' sample group entry to conclude which bit is overwritten to update the pps_mixed_nalu_types_in_pic_flag.

Solutions for VVC Subpicture Track Merging with Entity Groups

In cases where the VVC base track does not exist a file reader has to parse all the VVC subpicture tracks to conclude whether merging of VVC subpicture tracks lead to a uniform nal unit type picture or a mixed nal unit type picture or the merging led to a non-conforming bitstream. In order to avoid the parsing of VVC subpicture bitstreams a new entity to group box is defined, or alternatively an extension to the existing SubpicCommonGroupBox is defined.

A new entity to group box of type MixedNalUnitType-GroupBox is defined (the syntax and semantics of which are provide immediately below). The MixedNalUnitType-GroupBox indicates three groups of pairs of VVC subpicture track entity_id indices. The three groups of pairs of VVC subpicture track entity_id indices are i) the mixed NAL unit type picture group, ii) the uniform NAL unit type picture group, and iii) the non-conforming NAL unit type picture group.

All the entity_id values included in the subpicture entity groups shall identify VVC subpicture tracks. When present, MixedNalUnitTypeGroupBox shall be contained in the GroupsListBox in the file-level MetaBox and shall not be contained in MetaBoxes of other levels.

```
aligned(8) class MixedNalUnitTypeGroupBox extends
EntityToGroupBox('acgl',0,0)
{
    unsigned int (16) num_mix_nalu_pic_entityid_idx;
    for (i = 0; i < num_mix_nalu_pic_entityid_idx; i++){
        unsigned int(16) mix_subp_track_entityid_idx1[i];
        unsigned int(16) mix_subp_track_entityid_idx2[i];
    }
    unsigned int(16) num_uni_nalu_pic_entityid_idx;
    for (i = 0; i < num_uni_nalu_pic_entityid_idx; i++){
        unsigned int(16) uni_subp_track_entityid_idx1[i];
        unsigned int(16) uni_subp_track_entityid_idx2[i];
    }
    unsigned int(16) num_nonc_nalu_pic_entityid_idx;
    for (i = 0; i < num_nonc_nalu_pic_entityid_idx; i++){
        unsigned int(16) nonc_subp_track_entityid_idx1[i];
        unsigned int(16) nonc_subp_track_entityid_idx2[i];
    }
}
```

Semantics num_mix_nalu_pic_entityid_idx specifies the number of pairs in the mixed NAL unit type picture group, of reference indices of entity_IDs of subpicture tracks or track groups of subpicture tracks in the entity to group box.

mix_subp_track_entityid_idx1[i] and mix_subp_track_entityid_idx2[i], for each value of i, specifies the index of the entity_ID of a VVC subpicture track or the index of an entity_ID of an 'alte' track group of VVC subpicture tracks. The indices of entity_ID carried by mix_subp_track_entityid_idx1[i] and mix_subp_track_entityid_idx2[i] are mapped to the respective entity_ID carried in the entity to group box. The value of mix_subp_track_entityid_idx1[i] shall not be equal to mix_subp_track_entityid_idx2[i]. When a VVC bitstream is resolved from merging of VVC subpicture tracks in the mixed NAL unit type group, mixing of different VCL NAL unit types within the same coded picture may occur.

num_uni_nalu_pic_entityid_idx specifies the number of pairs in the uniform NAL unit type picture group, of reference indices of entity_IDs of subpicture tracks or track groups of subpicture tracks in the entity to group box.

uni_subp_track_entityid_idx1[i] and uni_subp_track_entityid_idx2[i], for each value of i, specifies the index of the entity_ID of a VVC subpicture track or the index of a entity_ID of an 'alte' track group of VVC subpicture tracks. The indices of entity_ID carried by uni_subp_track_entityid_idx1[i] and uni_subp_track_entityid_idx2[i] are mapped to the respective entity_ID carried in the entity to group box. The value of uni_subp_track_entityid_idx1[i] shall not be equal to uni_subp_track_entityid_idx2[i]. When a VVC bitstream is resolved from merging of only VVC subpicture tracks in the uniform NAL unit type group, mixing of different VCL NAL unit types within the same coded picture does not occur. num_nonc_nalu_pic_entityid_idx specifies the number of pairs in the non-conforming NAL unit type picture group, of reference indices of entity_IDs of subpicture tracks or track groups of subpicture tracks in the entity to group box.

nonc_subp_track_entityid_idx1[i] and nonc_subp_track_entityid_idx2[i], for each value of i, specifies the index of the entity_ID of a VVC subpicture track or the index of a entity_ID of an 'alte' track group of VVC subpicture tracks. The indices of entity_ID carried by nonc_subp_track_entityid_idx1[i] and nonc_subp_track_entityid_idx2[i] are mapped to the respective entity_ID carried in the entity to group box. The value of nonc_subp_track_entityid_idx1[i] shall not be equal to nonc_subp_track_entityid_idx2[i]. When a VVC bit stream is resolved from merging of VVC subpicture tracks in the non-conformant NAL unit type group, mixing of VCL NAL units with non-conformant types within the same coded picture may occur.

Solutions for VVC Subpicture Layout Signaling with VVC Base Track

Figure 16:
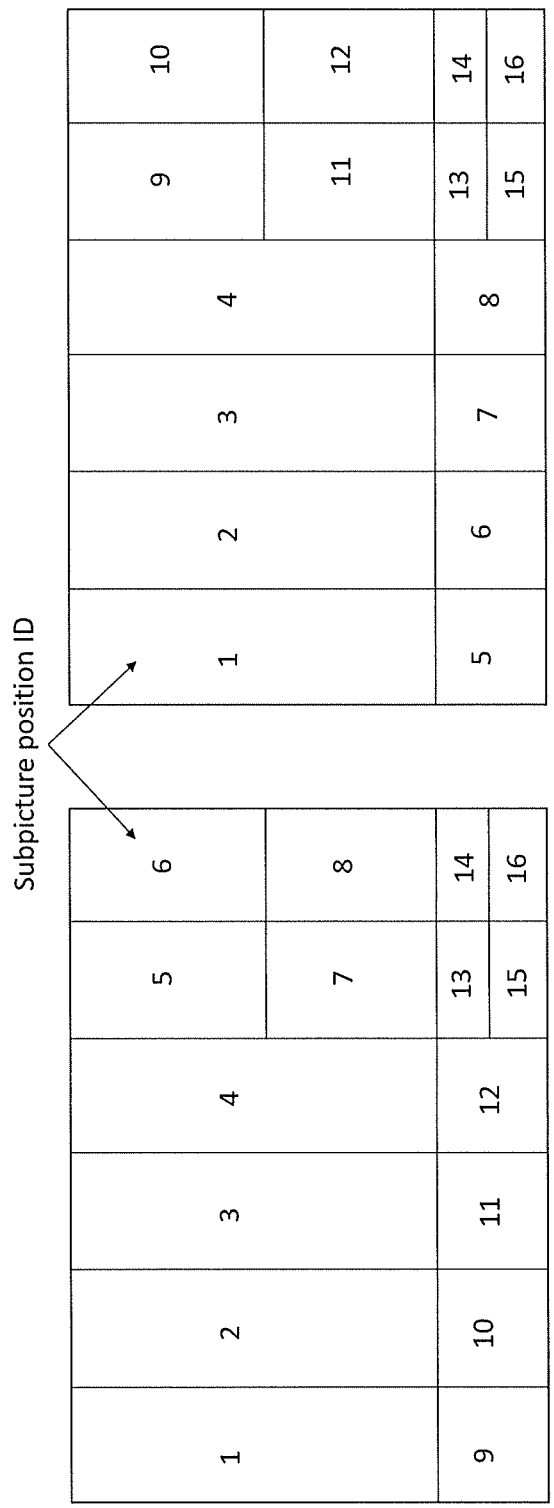
FIG. 16 shows a same VVC subpicture partition layout with different subpicture decoding order.

The problem addressed by the solutions disclosed herein is described with reference to the example shown in FIG. 16. FIG. 16 shows a same VVC subpicture partition layout with different subpicture decoding order.

A VVC base track can use a different subpicture decoding order for the same partition layout, thus resulting into different mappings of the VVC subpicture tracks to positions within the decoded picture. For example, in FIG. 16, there are sixteen VVC subpicture tracks which are mapped to two different positions for the same partition layout.

Presently, a VVC player should parse the SPS of the VVC base track to figure out the position of each VVC subpicture track within the decoded picture. One of the aims of VVC carriage in ISOBMFF is to avoid VVC-specific syntax parsing and re-writing. Thus, the requirement for the player-side SPS parsing is considered to be a gap in the design. The examples herein describe the signaling to avoid the VVC syntax parsing in the players.

Subpicture Layout Map Entry Mapped to 'spor' Sample Group

A new VvcSubpictureLayoutMapEntry sample group is proposed (the syntax and semantics of which is provided below). The VvcSubpictureLayoutMapEntry may be used to assign an identifier, called groupID, to each loop entry of the 'spor' sample group.

The VvcSubpictureLayoutMapEntry, when present, shall be linked to a sample group description providing the semantics of that groupID. This link shall be provided by setting the groupID_info_4cc to the four-character code of the associated sample grouping type. It is forbidden to indicate an associated grouping_type for which the sample group description definition does not provide semantics for groupID.

If num_subpic_ref_idx in VvcSubpicOrderEntry is greater than 0, the i-th loop entry in the VvcSubpictureLayoutMapEntry maps to the i-th subp_track_ref_idx value in VvcSubpicOrderEntry. Otherwise (num_subpic_ref_idx equal to 0), the i-th loop entry in the VvcSubpictureLayoutMapEntry maps to the i-th entry of the 'subp' track reference.

When the groupID_info_4cc is equal to 'trif' in a VVC base track, the same track shall include a SampleGroupDescriptionBox of type 'trif' with entries constrained as follows: rect_region_flag shall be equal to 1, full_picture shall be equal to 0.

Syntax

```
class VvcSubpictureLayoutMapEntry( ) extends
VisualSampleGroupEntry ('sulm') {
    unsigned int(32) groupID_info_4cc;
    unsigned int(16) entry_count_minus1;
    for(i=0; i <= entry_count_minus1; i++)
        unsigned int(16) groupID;
}
```

Semantics groupID_info_4cc specifies that further information of the groupID values specified in this entry are provided in a SampleGroupDescriptionBox with grouping_type equal to groupID_info_4cc.

entry_count_minus1 plus 1 specifies the number of entries in the map and shall be equal to the number of reference indices indicated in the 'spor' sample group. When the number of reference indices indicated in the 'spor' sample group is zero then the entry_count_minus1 plus 1 shall be equal to the number of entries in the 'subp' track reference. In an embodiment, if no 'spor' sample group is in use in a VVC base track, the entry_count_minus1 plus 1 is equal to the number of entries in the 'subp' track reference, and the groupID is associated with the respective entry in the 'subp' track reference.

groupID specifies the unique identifier of the group. More information about the group is provided by the sample group description entry with this groupID and grouping_type equal to the groupID_info_4cc.

(Alternate 1) Subpicture Layout Map Entry Mapped to 'subp' Track Reference

As an alternate solution. The VvcSubpictureLayoutMapEntry may be used to assign an identifier, called groupID, to each index of the 'subp' track reference.

In case of a track reference of type 'subp', the i-th index in the indicated track reference is mapped to the i-th loop entry in the VvcSubpictureLayoutMapEntry and the groupID_info_4cc may be equal to 'trif'.

When there is a VVC base track with 'subp' track referencing to VVC subpicture tracks and containing a 'spor' sample group, the VVC base track shall include a SampleGroupDescriptionBox of type 'trif' and a sample group of type 'sulm' with groupID_info_4cc equal to 'trif'.

The parameters of the SampleGroupDescriptionBox of type 'trif' in the VVC base track are set similar to the one above. The syntax of the VvcSubpictureLayoutMapEntry is same as above.

Semantics groupID_info_4cc and groupID is same as above.

entry_count_minus1 plus 1 specifies the number of entries in the map and shall be equal to the number of reference indices indicated in the 'subp' track reference (Alternate 2) Mapping NAL Unit Map Entry and Rectangular Region Group Entry The current design of NAL unit extensions of ISOBMFF does not allow a track to contain both a SampleToGroupBox of type 'nalm' associated with grouping_type_parameter equal to 'trif' and SampleToGroupBox of type 'trif'. Hence in order to provide a mapping of subpicture layout with output picture from the VVC base track the following is done.

Each VVC subpicture track contains the NAL unit map entry with a group_ID. The group_ID is unique in a file. The NAL unit map entry for VVC subpicture tracks which are alternate for each other carry the same group_ID.

A VVC base track contains multiple rectangular region group entries with each entry providing the position of the subpicture in the decoded output picture along with the group_ID. The group_ID in each rectangular region group entry is the group_ID carried by the VVC subpicture track associated to the VVC base track by the 'subp' track reference.

A file reader parses the NAL unit map entry in the VVC subpicture track and the rectangular region group entries in the VVC base track and maps the VVC subpicture(s) in the VVC subpicture track to the location in the decoded output picture based on the matching group_ID value carried in the two map entries.

Figure 17:
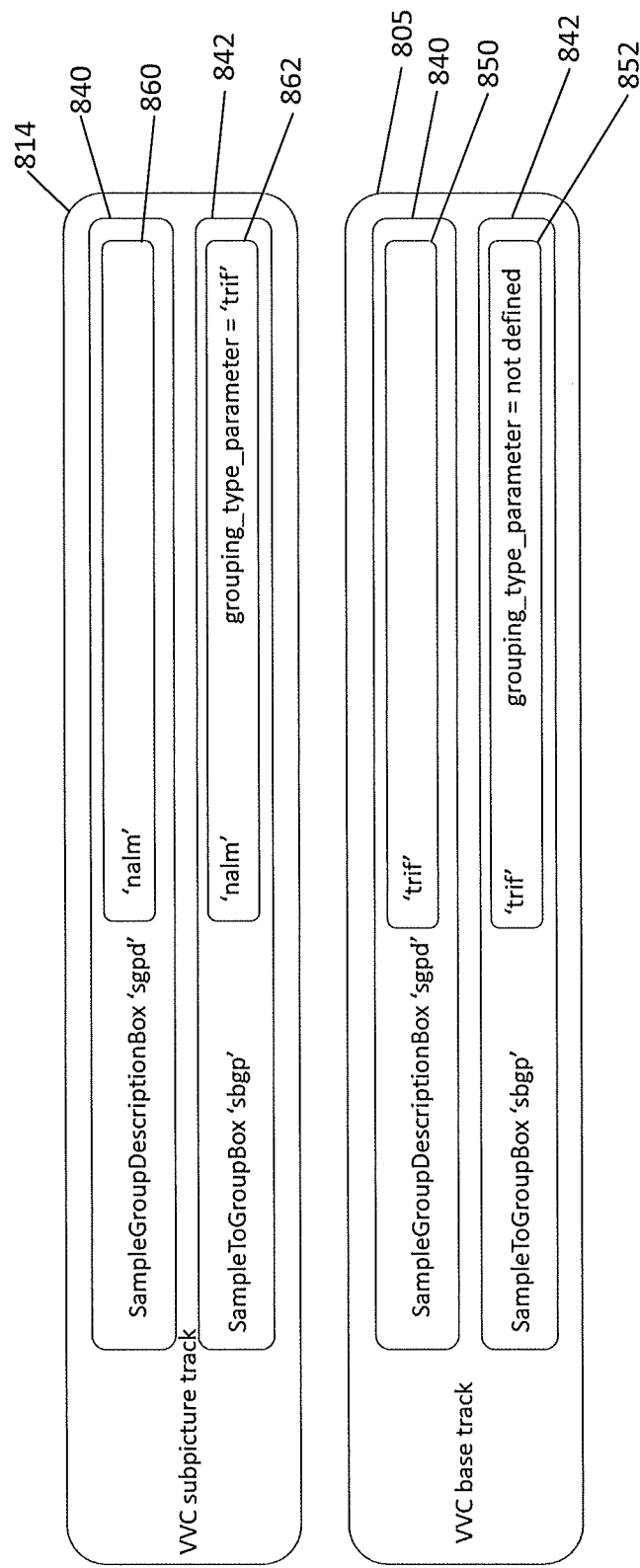
FIG. 17 shows a file with a VVC base track and a VVC subpicture track with rectangular region group entry and the NAL unit map entry, respectively.

FIG. 17 shows a file with a VVC base track 805 and a VVC subpicture track 814 with rectangular region group entry and the NAL unit map entry ('nalm'), respectively.

As further shown in FIG. 17, the VVC base track 805 and the VVC subpicture track 814 each comprise a sample group description box 'sgpd' 840 and a sample to group box 'sbgp' 842. The sample group description box 'sgpd' 840 of the VVC base track 805 is of type 'trif' 850, and the sample group description box 'sgpd' 840 of the VVC subpicture track 814 is of type 'nalm' 860. The sample to group box 'sbgp' 842 of the VVC base track 805 of type 'trif' 852 has a grouping_type_parameter that is not defined, and the sample to group box 'sbgp' 842 of the VVC subpicture track 814 of type 'nalm' 862 has a grouping_type_parameter equal to 'trif'.

Solutions for VVC Subpicture Layout Signaling with Entity Groups

The two subpicture entity groups namely SubpicCommonGroupBox and SubpicMultipleGroupsBox provide guidance to the file reader for implicit reconstruction of bitstreams and generation and rewriting of parameter sets. However, they do not provide any guidance for the subpicture layout within the decoded picture hence it is up to the reader to conclude on the subpicture layout which is a very complex process.

Below describes extensions to the subpicture entity groups namely SubpicCommonGroupBox to carry the information related to subpicture layout. The SubpicCommonGroupBox carries the subpicture position in the decoded output picture for each subpicture corresponding to the entity_ID in the entity to group box.

FIG. 18 and below, shows a structure, namely SubpicCommonGroupBox, that provides extensions (collectively item 902) to the subpicture entity groups to carry information related to subpicture layout:

```
aligned(8) class SubpicCommonGroupBox extends
EntityToGroupBox('acgl',0,0)
{
    unsigned int(8) level_idc;
    bit(8) reserved = 0;
    unsigned int(16) num_active_tracks;
    for (i = 0; i < num_entities_in_group; i++){
        unsigned int(16) image_segment_top[i];
        unsigned int(16) image_segment_left[i];
        unsigned int(16) image_segment_width[i];
        unsigned int(16) image_segment_height[i];
    }
}
``` image_segment_top[i] specifies the top offset of the image segment from the top boundary of the decoded picture in luma sample rows with value 0 being the top-most luma sample row of the decoded picture.

image_segment_left[i] specifies the left offset of the image segment from the left boundary of the decoded picture in luma sample columns with value 0 being the left-most luma sample column of the decoded picture.

image_segment_width[i] specifies the width of the image segment in luma samples.

image_segment_height[i] specifies the height of the image segment in luma samples.

(Alternate) A New Entity to Group Box for Signaling the Subpicture Layout

A new entity to group box called the SubpictureLayoutGroupBox is defined the entries of which indicate the subpicture layout. The syntax and semantics of SubpictureLayoutGroupBox is provided below.

All the entity_id values included in the SubpictureLayoutGroupBox shall identify VVC subpicture tracks. The SubpictureLayoutGroupBox shall be contained in the GroupsListBox in the file-level MetaBox and shall not be contained in MetaBoxes of other levels.

```
aligned(8) class SubpictureLayoutGroupBox( ) extends
EntityToGroupBox('sulg',0,0){
        for(i=0; i <= num_entities_in_group; i++) {
            unsigned int(16) image_segment_top[i];
            unsigned int(16) image_segment_left[i];
            unsigned int(16) image_segment_width[i];
            unsigned int(16) image_segment_height[i];
        }
}
```

Semantics image_segment_top[i] specifies the top offset of the image segment from the top boundary of the decoded picture in luma sample rows with value 0 being the top-most luma sample row of the decoded picture.

image_segment_left[i] specifies the left offset of the image segment from the left boundary of the decoded picture in luma sample columns with value 0 being the left-most luma sample column of the decoded picture.

image_segment_width[i] specifies the width of the image segment in luma samples.

image_segment_height[i] specifies the height of the image segment in luma samples.

Figure 19:
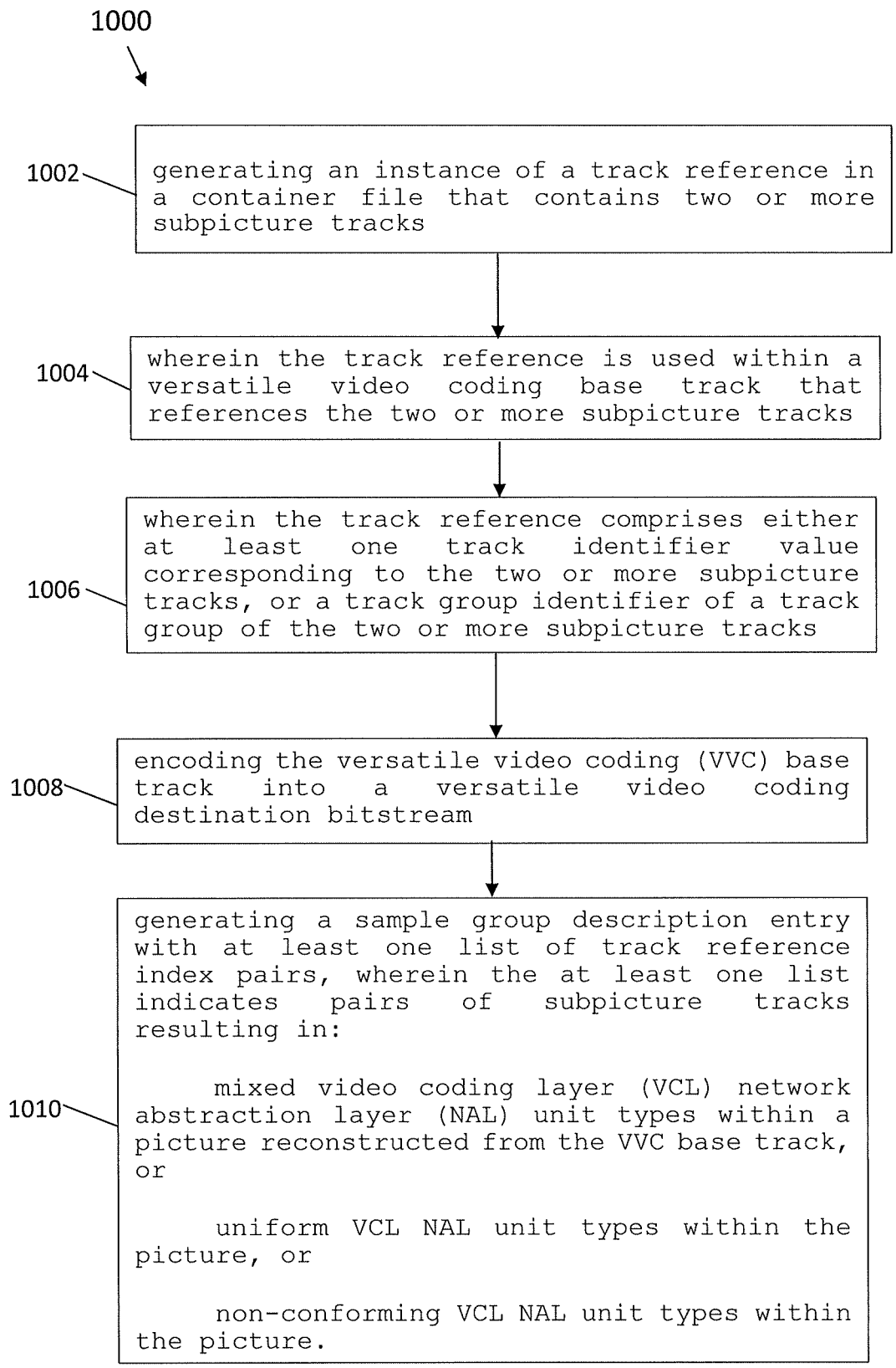
FIG. 19 is an example method to implement or support a coded picture with mixed VCL NAL unit type, based on the examples described herein.

FIG. 19 is an example method 1000 to implement or support a coded picture with mixed VCL NAL unit type, based on the examples described herein. At 1002, the method includes generating an instance of a track reference in a container file that contains two or more subpicture tracks. At 1004, the method includes wherein the track reference is used within a versatile video coding base track that references the two or more subpicture tracks. At 1006, the method includes wherein the track reference comprises either at least one track identifier value corresponding to the two or more subpicture tracks, or a track group identifier of a track group of the two or more subpicture tracks. At 1008, the method encoding the versatile video coding (VVC) base track into a versatile video coding destination bitstream. At 1010, the method includes generating a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture. Method 1000 may be implemented by an encoder, or by apparatus 500 of FIG. 9.

Figure 20:
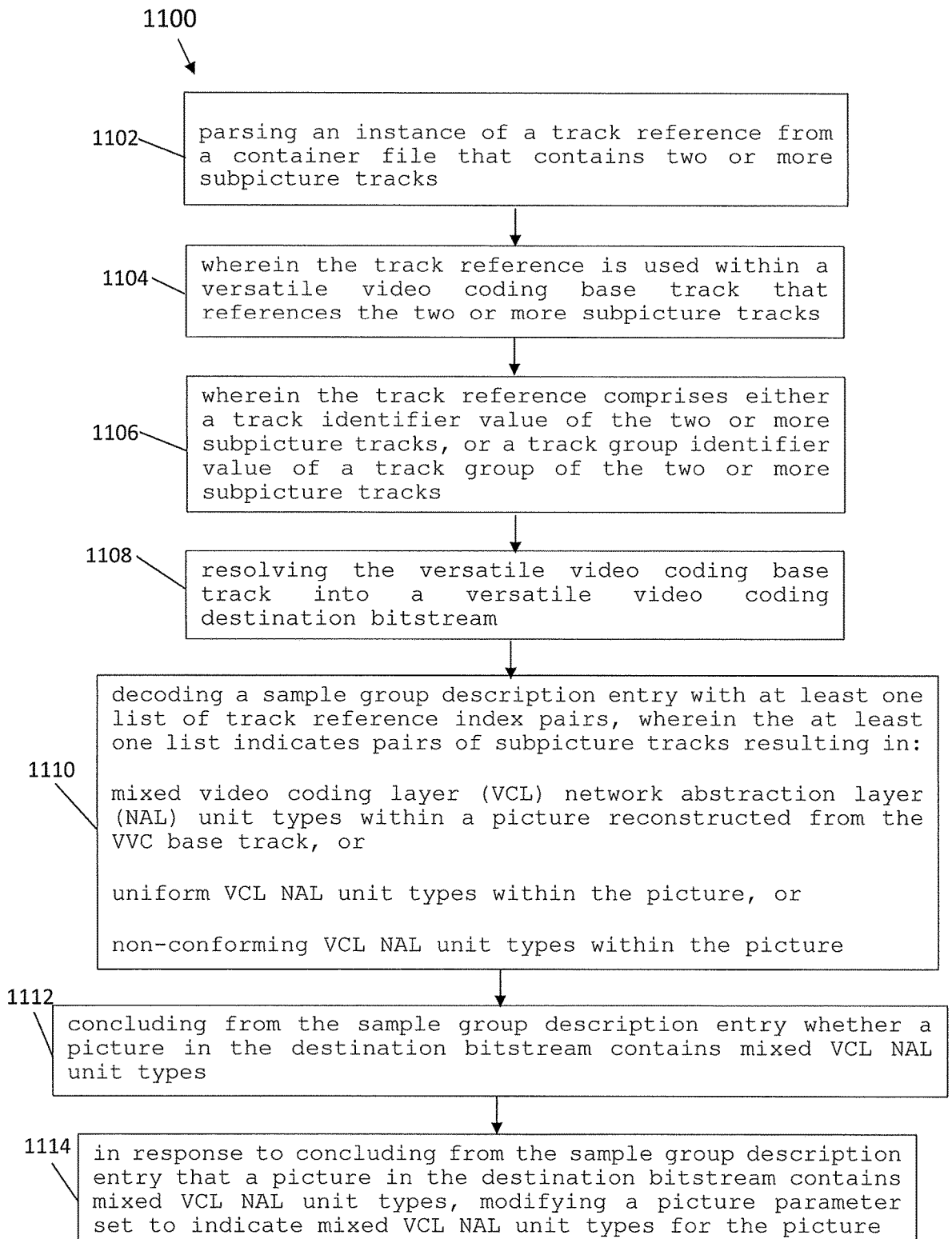
FIG. 20 is another example method to implement or support a coded picture with mixed VCL NAL unit type, based on the examples described herein.

FIG. 20 is another example method 1100 to implement or support a coded picture with mixed VCL NAL unit type, based on the examples described herein. At 1102, the method includes parse an instance of a track reference from a container file that contains two or more subpicture tracks. At 1104, the method includes wherein the track reference is used within a versatile video coding base track that references the two or more subpicture tracks. At 1106, the method includes wherein the track reference comprises either a track identifier value of the two or more subpicture tracks, or a track group identifier value of a track group of the two or more subpicture tracks. At 1108, the method includes resolving the versatile video coding base track into a versatile video coding destination bitstream. At 1110, the method includes decoding a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture. At 1112, the method includes concluding from the sample group description entry whether a picture in the destination bitstream contains mixed VCL NAL unit types. At 1114, the method includes in response to concluding from the sample group description entry that a picture in the destination bitstream contains mixed VCL NAL unit types, modifying a picture parameter set to indicate mixed VCL NAL unit types for the picture. Method 1100 may be implemented by a decoder, or by apparatus 500 of FIG. 9.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry may also be used to mean a function or a process, such as one implemented by an encoder or decoder, or a codec.

An example apparatus includes at least one processor; and at least one non-transitory memory including computer program code; wherein the at least one memory and the computer program code are configured to, with the at least one processor, cause the apparatus at least to perform: generate an instance of a track reference in a container file that contains two or more subpicture tracks; wherein the track reference is used within a versatile video coding base track that references the two or more subpicture tracks; wherein the track reference comprises either at least one track identifier value corresponding to the two or more subpicture tracks, or a track group identifier of a track group of the two or more subpicture tracks; encode the versatile video coding (VVC) base track into a versatile video coding destination bitstream; and generate a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture.

Other aspects of the apparatus may include the following. Tracks mapped to the track group may share a video coding layer network abstraction layer unit type within time-aligned samples of the tracks. The video coding layer network abstraction layer unit type may be an intra random access point period. The track group may be a sequence of network abstraction layer unit types, and have a four character code 'snut'. Tracks mapped to the track group may not have a different video coding layer network abstraction layer unit type within time-aligned samples of the tracks. The track group may be a four character code 'alte'. At least two of the subpicture tracks of the track group may have different intra random access point periods. The track reference may list the at least one track identifier value corresponding to the at least two subpicture tracks of the track group having different intra random access point periods. The track reference may list an identifier of the track group. The track reference may not list the identifier of the track group. The two or more subpicture tracks may be grouped into one or more sequences of network abstraction layer unit type track groups, where the one or more sequences of network abstraction layer unit type track groups comprise two or more subpicture tracks that share a video coding layer network abstraction layer unit type in time-aligned samples; and the track reference may list group identifiers of the one or more sequences of network abstraction layer unit type track groups. When a nesting of track groups occurs, the track reference may lists track group identifiers of track groups at a lower level within the nesting of the track groups. The track reference may further list track group identifiers of track groups at a higher level within the nesting of the track groups. The track reference may not list track group identifiers of track groups at a higher level within the nesting of the track groups. The track reference may refer to a track group identifier of an existing type of track group. The track group may not list track groups, and may list the two or more subpicture tracks. At least two of the two or more subpicture tracks of the track group may share an intra random access point period. The track reference may have a four character code 'mixn' corresponding to mixed NAL unit type. The track reference may have a four character code 'subp' to indicate that subpictures of the two or more subpicture tracks are contiguous in decoding order. The sample group description entry may comprise a bit position of picture parameter set mixed network abstraction layer unit types, and a parameter set identifier of a parameter set having the picture parameter set mixed network abstraction layer unit types. An entity to group box may indicate the at least one list of track reference index pairs. A subpicture layout map entry may be mapped to a 'spor' sample group. A subpicture layout map entry may be mapped to a 'subp' track reference. The at least one memory and the computer program code may be further configured to, with the at least one processor, cause the apparatus at least to perform: map a network abstraction layer unit entry and a rectangular region group entry. The at least one memory and the computer program code may be further configured to, with the at least one processor, cause the apparatus at least to perform: provide an extension to a subpicture entry group to carry information related to a layout of at least one subpicture corresponding to the two or more subpicture tracks; or provide a new entity to group box for signaling the at least one subpicture corresponding to the two or more subpicture tracks. The at least one memory and the computer program code may be further configured to, with the at least one processor, cause the apparatus at least to perform: merge the two or more subpicture tracks that resolve into a conformant versatile video coding bitstream. A group of VVC subpicture tracks, a VVC subpicture track group, or a VVC subpicture track in the sample group description entry may be indicated via including one or more of a track group ID, track ID or an entity group ID in the sample group description entry.

An example apparatus includes at least one processor; and at least one non-transitory memory including computer program code; wherein the at least one memory and the computer program code are configured to, with the at least one processor, cause the apparatus at least to perform: parse an instance of a track reference from a container file that contains two or more subpicture tracks; wherein the track reference is used within a versatile video coding base track that references the two or more subpicture tracks; wherein the track reference comprises either a track identifier value of the two or more subpicture tracks, or a track group identifier value of a track group of the two or more subpicture tracks; resolve the versatile video coding base track into a versatile video coding destination bitstream; decode a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture; conclude from the sample group description entry whether a picture in the destination bitstream contains mixed VCL NAL unit types; and in response to concluding from the sample group description entry that a picture in the destination bitstream contains mixed VCL NAL unit types, modify a picture parameter set to indicate mixed VCL NAL unit types for the picture.

Other aspects of the apparatus may include the following. Tracks mapped to the track group may share a video coding layer network abstraction layer unit type within time-aligned samples of the tracks. The video coding layer network abstraction layer unit type may be an intra random access point period. The track group may be a sequence of network abstraction layer unit types, and has a four character code 'snut'. Tracks mapped to the track group may not have a different video coding layer network abstraction layer unit type within time-aligned samples of the tracks. The track group may have a four character code 'alte'. At least two of the subpicture tracks of the track group may have different intra random access point periods. The track reference may list the at least one track identifier value corresponding to the at least two subpicture tracks of the track group having different intra random access point periods. The track reference may list an identifier of the track group. The track reference may not list the identifier of the track group. The two or more subpicture tracks may be grouped into one or more sequences of network abstraction layer unit type track groups, where the one or more sequences of network abstraction layer unit type track groups comprise two or more subpicture tracks that share a video coding layer network abstraction layer unit type in time-aligned samples; and the track reference may lists group identifiers of the one or more sequences of network abstraction layer unit type track groups. When a nesting of track groups occurs, the track reference may list track group identifiers of track groups at a lower level within the nesting of the track groups. The track reference may further list track group identifiers of track groups at a higher level within the nesting of the track groups. The track reference may not list track group identifiers of track groups at a higher level within the nesting of the track groups. The track reference may refers to a track group identifier of an existing type of track group. The track group may not list track groups, and lists the two or more subpicture tracks. At least two of the two or more subpicture tracks of the track group may share an intra random access point period. The track reference may have a four character code 'mixn' corresponding to mixed NAL unit type. The track reference may have a four character code 'subp' to indicate that subpictures of the two or more subpicture tracks are contiguous in decoding order. The sample group description entry may comprise a bit position of picture parameter set mixed network abstraction layer unit types, and a parameter set identifier of a parameter set having the picture parameter set mixed network abstraction layer unit types. An entity to group box may indicate the at least one list of track reference index pairs. A subpicture layout map entry may be mapped to a 'spor' sample group. A subpicture layout map entry may be mapped to a 'subp' track reference. The at least one memory and the computer program code may be further configured to, with the at least one processor, cause the apparatus at least to perform: parse a map of a network abstraction layer unit entry and a rectangular region group entry. The at least one memory and the computer program code may be further configured to, with the at least one processor, cause the apparatus at least to perform: parse an extension to a subpicture entry group to carry information related to a layout of at least one subpicture corresponding to the two or more subpicture tracks; or provide a new entity to group box for signaling the at least one subpicture corresponding to the two or more subpicture tracks. A group of VVC subpicture tracks, a VVC subpicture track group, or a VVC subpicture track in the sample group description entry may be indicated via including one or more of a track group ID, track ID or an entity group ID in the sample group description entry.

An example apparatus includes means for generating an instance of a track reference in a container file that contains two or more subpicture tracks; wherein the track reference is used within a versatile video coding base track that references the two or more subpicture tracks; wherein the track reference comprises either at least one track identifier value corresponding to the two or more subpicture tracks, or a track group identifier of a track group of the two or more subpicture tracks; means for encoding the versatile video coding (VVC) base track into a versatile video coding destination bitstream; and means for generating a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture.

An example apparatus includes means for parsing an instance of a track reference from a container file that contains two or more subpicture tracks; wherein the track reference is used within a versatile video coding base track that references the two or more subpicture tracks; wherein the track reference comprises either a track identifier value of the two or more subpicture tracks, or a track group identifier value of a track group of the two or more subpicture tracks; means for resolving the versatile video coding base track into a versatile video coding destination bitstream; means for decoding a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture; means for concluding from the sample group description entry whether a picture in the destination bitstream contains mixed VCL NAL unit types; and means for, in response to concluding from the sample group description entry that a picture in the destination bitstream contains mixed VCL NAL unit types, modifying a picture parameter set to indicate mixed VCL NAL unit types for the picture.

An example method includes generating an instance of a track reference in a container file that contains two or more subpicture tracks; wherein the track reference is used within a versatile video coding base track that references the two or more subpicture tracks; wherein the track reference comprises either at least one track identifier value corresponding to the two or more subpicture tracks, or a track group identifier of a track group of the two or more subpicture tracks; encoding the versatile video coding (VVC) base track into a versatile video coding destination bitstream; and generating a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture.

An example method includes parsing an instance of a track reference from a container file that contains two or more subpicture tracks; wherein the track reference is used within a versatile video coding base track that references the two or more subpicture tracks; wherein the track reference comprises either a track identifier value of the two or more subpicture tracks, or a track group identifier value of a track group of the two or more subpicture tracks; resolving the versatile video coding base track into a versatile video coding destination bitstream; decoding a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture; concluding from the sample group description entry whether a picture in the destination bitstream contains mixed VCL NAL unit types; and in response to concluding from the sample group description entry that a picture in the destination bitstream contains mixed VCL NAL unit types, modifying a picture parameter set to indicate mixed VCL NAL unit types for the picture.

An example non-transitory program storage device readable by a machine, tangibly embodying a program of instructions executable by the machine for performing operations is provided, the operations comprising: generating an instance of a track reference in a container file that contains two or more subpicture tracks; wherein the track reference is used within a versatile video coding base track that references the two or more subpicture tracks; wherein the track reference comprises either at least one track identifier value corresponding to the two or more subpicture tracks, or a track group identifier of a track group of the two or more subpicture tracks; encoding the versatile video coding (VVC) base track into a versatile video coding destination bitstream; and generating a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture.

An example non-transitory program storage device readable by a machine, tangibly embodying a program of instructions executable by the machine for performing operations is provided, the operations comprising: parsing an instance of a track reference from a container file that contains two or more subpicture tracks; wherein the track reference is used within a versatile video coding base track that references the two or more subpicture tracks; wherein the track reference comprises either a track identifier value of the two or more subpicture tracks, or a track group identifier value of a track group of the two or more subpicture tracks; resolving the versatile video coding base track into a versatile video coding destination bitstream; decoding a sample group description entry with at least one list of track reference index pairs, wherein the at least one list indicates pairs of subpicture tracks resulting in: mixed video coding layer (VCL) network abstraction layer (NAL) unit types within a picture reconstructed from the VVC base track, or uniform VCL NAL unit types within the picture, or non-conforming VCL NAL unit types within the picture; concluding from the sample group description entry whether a picture in the destination bitstream contains mixed VCL NAL unit types; and in response to concluding from the sample group description entry that a picture in the destination bitstream contains mixed VCL NAL unit types, modifying a picture parameter set to indicate mixed VCL NAL unit types for the picture.

An example apparatus includes means for indicating an extraction reference map entry used to assign a group identifier to at least one extraction reference, the extraction reference map entry indicating a subpicture layout; wherein the at least one extraction reference causes extraction of a network abstraction layer unit data by reference from another track; wherein the at least one extraction reference comprises an index of a track reference having a subpicture type within a subpicture order sample group description entry; and means for indicating, using the at least one extraction reference, subpictures or slices of a coded picture in decoding order.

The apparatus may further include wherein the extraction reference map entry is linked with a link to a sample group description providing semantics of the group identifier.

The apparatus may further include means for providing the link with setting a syntax element within the extraction reference map entry to a four character code of an associated sample grouping type.

The apparatus may further include means for mapping a loop entry in the subpicture order sample group description entry to a loop entry in the extraction reference map entry.

The apparatus may further include means for specifying a syntax of the extraction reference map entry using at least one syntax element, the at least one syntax element comprising: a group identifier information four character code specifying that further information of values of the group identifier specified in the extraction reference map entry are provided in a sample group description box with a grouping type equal to the group identifier information four character code; an entry count identifier equal to a number of extraction references that extract network abstraction layer unit data with reference to another track; or the group identifier which specifies a unique identifier for the at least one extraction reference.

An example apparatus includes means for indicating a mixed network abstraction layer unit type pictures sample group used to merge video base tracks having a subpicture track; means for indicating a sample group description entry of the mixed network abstraction layer unit type pictures sample group, the sample group description entry indicating a group of pairs of mixed network abstraction layer unit type track reference indices, which reference video subpicture tracks or track groups; and wherein when a video bitstream is resolved from a video base track containing a mixed network abstraction layer unit type sample group with merging pairs of video subpicture tracks signaled in a mixed network abstraction layer unit type pictures sample group entry, then there is mixing of different network abstraction layer unit types.

The apparatus may further include wherein the sample group description entry comprises at least one of: a bit position of a picture parameter set mixed network abstraction layer unit types in picture flag syntax element in a containing raw byte sequence payload; or a parameter set identifier of a parameter set containing the picture parameter set mixed network abstraction layer unit types in picture flag syntax element.

The apparatus may further include wherein a syntax of the mixed network abstraction layer unit type pictures sample group comprises: a syntax element specifying a number of pairs of mixed network abstraction layer unit type track reference indices of subpicture tracks or track groups of subpicture tracks referenced with the video base track in the sample group description entry of the mixed network abstraction layer unit type pictures sample group; and at least one index that specifies a mixed network abstraction layer unit type track reference index value referencing: a track identifier value of a video subpicture track, or a track group identifier value of a sequence of network abstraction layer unit type or alternative for extraction track group of video subpicture tracks.

An example apparatus includes means for parsing a sample group description entry of a mixed network abstraction layer unit type pictures sample group is mapped to a sample of a video base track; means for determining a value of a picture parameter set mixed network abstraction layer unit types in picture flag; means for determining whether a pair of track identifier values of subpicture tracks selected to reconstruct a picture unit map to at least one index that specifies a mixed network abstraction layer unit type track reference index value in the sample group description entry;

means for determining whether a track identifier value maps to the at least one index that specifies a mixed network abstraction layer unit type track reference index value; means for determining that the track identifier value maps to the at least one index that specifies a mixed network abstraction layer unit type track reference index value in response to a track reference pointing to a track identifier directly; means for determining that the track identifier value maps to the at least one index that specifies a mixed network abstraction layer unit type track reference index value in response to the track reference pointing to an alternative for extraction track group or a sequence of network abstraction layer unit types track group, and the alternative for extraction track group or the sequence of network abstraction layer unit types track group, respectively, contain a track having the track identifier value; and means for determining the value of a picture parameter set mixed network abstraction layer unit types in picture flag to be equal to one, in response to any pair of subpicture tracks selected to reconstruct a picture unit having track identifier values that map to the at least one index that specifies a mixed network abstraction layer unit type track reference index value in the sample group description entry with a shared dereferencing index value, otherwise determining the value of the picture parameter set mixed network abstraction layer unit types in picture flag to be equal to zero.

The apparatus may further include wherein when the sample group description entry of the mixed network abstraction layer unit type pictures sample group is mapped to a sample of the video base track, the apparatus further comprises: means for determining whether a value of a picture parameter set mixed network abstraction layer unit types in picture flag differs from a previous picture parameter set network abstraction layer unit with a shared picture parameter set identifier in a reconstructed bitstream; means for, in response to no picture parameter set being included in a picture unit, including a copy of the picture parameter set with an updated picture parameter set mixed network abstraction layer unit types in picture flag value in a reconstructed picture unit; and means for using a bit position in the sample group description entry to determine which bit is overwritten to update the picture parameter set mixed network abstraction layer unit types in picture flag.

An example apparatus includes means for generating an instance of a track reference in a container file that contains two or more subpicture tracks; wherein the track reference is used within a video base track that references the two or more subpicture tracks; wherein the track reference comprises either at least one track identifier value corresponding to the two or more subpicture tracks, or a track group identifier of a track group of the two or more subpicture tracks; means for encoding the video base track into a video destination bitstream; and means for generating a sample group description entry with at least one list of track reference index pairs, wherein the at least one list indicates pairs of subpicture tracks resulting in: mixed video coding layer network abstraction layer unit types within a picture reconstructed from the video base track, or uniform video coding layer network abstraction layer unit types within the picture, or non-conforming video coding layer network abstraction layer unit types within the picture.

The apparatus may further include wherein tracks mapped to the track group share a video coding layer network abstraction layer unit type within time-aligned samples of the tracks.

The apparatus may further include wherein the video coding layer network abstraction layer unit type is an intra random access point period.

The apparatus may further include wherein the track group is a sequence of network abstraction layer unit types, and has a four character code 'snut'.

The apparatus may further include wherein tracks mapped to the track group do not have a different video coding layer network abstraction layer unit type within time-aligned samples of the tracks.

The apparatus may further include wherein the track group has a four character code 'alte'.

The apparatus may further include wherein at least two of the subpicture tracks of the track group have different intra random access point periods.

The apparatus may further include wherein the track reference lists the at least one track identifier value corresponding to the at least two subpicture tracks of the track group having different intra random access point periods.

The apparatus may further include wherein the track reference lists an identifier of the track group.

The apparatus may further include wherein the track reference does not list the identifier of the track group.

The apparatus may further include wherein: the two or more subpicture tracks are grouped into one or more sequences of network abstraction layer unit type track groups, where the one or more sequences of network abstraction layer unit type track groups comprise two or more subpicture tracks that share a video coding layer network abstraction layer unit type in time-aligned samples; and the track reference lists group identifiers of the one or more sequences of network abstraction layer unit type track groups.

The apparatus may further include wherein when a nesting of track groups occurs, the track reference lists track group identifiers of track groups at a lower level within the nesting of the track groups.

The apparatus may further include wherein the track reference further lists track group identifiers of track groups at a higher level within the nesting of the track groups.

The apparatus may further include wherein the track reference does not list track group identifiers of track groups at a higher level within the nesting of the track groups.

The apparatus may further include wherein the track reference refers to a track group identifier of an existing type of track group.

The apparatus may further include wherein the track group does not list track groups, and lists the two or more subpicture tracks.

The apparatus may further include wherein at least two of the two or more subpicture tracks of the track group share an intra random access point period.

The apparatus may further include wherein the track reference has a four character code 'mixn' corresponding to mixed network abstraction layer unit type.

The apparatus may further include wherein the track reference has a four character code 'subp' to indicate that subpictures of the two or more subpicture tracks are contiguous in decoding order.

The apparatus may further include wherein the sample group description entry comprises a bit position of picture parameter set mixed network abstraction layer unit types, and a parameter set identifier of a parameter set having the picture parameter set mixed network abstraction layer unit types.

The apparatus may further include wherein an entity to group box indicates the at least one list of track reference index pairs.

The apparatus may further include wherein a subpicture layout map entry is mapped to a subpicture order sample group.

The apparatus may further include wherein a subpicture layout map entry is mapped to a subpicture track reference.

The apparatus may further include means for mapping a network abstraction layer unit entry and a rectangular region group entry.

The apparatus may further include means for providing an extension to a subpicture entry group to carry information related to a layout of at least one subpicture corresponding to the two or more subpicture tracks; or means for providing a new entity to group box for signaling the at least one subpicture corresponding to the two or more subpicture tracks.

The apparatus may further include means for merging the two or more subpicture tracks that resolve into a conformant video bitstream.

An example apparatus includes means for parsing an instance of a track reference from a container file that contains two or more subpicture tracks; wherein the track reference is used within a video base track that references the two or more subpicture tracks; wherein the track reference comprises either a track identifier value of the two or more subpicture tracks, or a track group identifier value of a track group of the two or more subpicture tracks; means for resolving the video base track into a video destination bitstream; means for decoding a sample group description entry with at least one list of track reference index pairs, wherein the at least one list indicates pairs of subpicture tracks resulting in: mixed video coding layer network abstraction layer unit types within a picture reconstructed from the video base track, or uniform video coding layer network abstraction layer unit types within the picture, or non-conforming video coding layer network abstraction layer unit types within the picture; means for concluding from the sample group description entry whether a picture in the destination bitstream contains mixed video coding layer network abstraction layer unit types; and in response to concluding from the sample group description entry that a picture in the destination bitstream contains mixed video coding layer network abstraction layer unit types, means for modifying a picture parameter set to indicate mixed video coding layer network abstraction layer unit types for the picture.

The apparatus may further include wherein tracks mapped to the track group share a video coding layer network abstraction layer unit type within time-aligned samples of the tracks.

The apparatus may further include wherein the video coding layer network abstraction layer unit type is an intra random access point period.

The apparatus may further include wherein the track group is a sequence of network abstraction layer unit types, and has a four character code 'snut'.

The apparatus may further include wherein tracks mapped to the track group do not have a different video coding layer network abstraction layer unit type within time-aligned samples of the tracks.

The apparatus may further include wherein the track group has a four character code 'alte'.

The apparatus may further include wherein at least two of the subpicture tracks of the track group have different intra random access point periods.

The apparatus may further include wherein the track reference lists the at least one track identifier value corresponding to the at least two subpicture tracks of the track group having different intra random access point periods.

The apparatus may further include wherein the track reference lists an identifier of the track group.

The apparatus may further include wherein the track reference does not list the identifier of the track group.

The apparatus may further include wherein: the two or more subpicture tracks are grouped into one or more sequences of network abstraction layer unit type track groups, where the one or more sequences of network abstraction layer unit type track groups comprise two or more subpicture tracks that share a video coding layer network abstraction layer unit type in time-aligned samples; and the track reference lists group identifiers of the one or more sequences of network abstraction layer unit type track groups.

The apparatus may further include wherein when a nesting of track groups occurs, the track reference lists track group identifiers of track groups at a lower level within the nesting of the track groups.

The apparatus may further include wherein the track reference further lists track group identifiers of track groups at a higher level within the nesting of the track groups.

The apparatus may further include wherein the track reference does not list track group identifiers of track groups at a higher level within the nesting of the track groups.

The apparatus may further include wherein the track reference refers to a track group identifier of an existing type of track group.

The apparatus may further include wherein the track group does not list track groups, and lists the two or more subpicture tracks.

The apparatus may further include wherein at least two of the two or more subpicture tracks of the track group share an intra random access point period.

The apparatus may further include wherein the track reference has a four character code 'mixn' corresponding to mixed NAL unit type.

The apparatus may further include wherein the track reference has a four character code 'subp' to indicate that subpictures of the two or more subpicture tracks are contiguous in decoding order.

The apparatus may further include wherein the sample group description entry comprises a bit position of picture parameter set mixed network abstraction layer unit types, and a parameter set identifier of a parameter set having the picture parameter set mixed network abstraction layer unit types.

The apparatus may further include wherein an entity to group box indicates the at least one list of track reference index pairs.

The apparatus may further include wherein a subpicture layout map entry is mapped to a subpicture order sample group.

The apparatus may further include wherein a subpicture layout map entry is mapped to a subpicture track reference.

The apparatus may further include means for parsing a map of a network abstraction layer unit entry and a rectangular region group entry.

The apparatus may further include means for parsing an extension to a subpicture entry group to carry information related to a layout of at least one subpicture corresponding to the two or more subpicture tracks; or means for providing a new entity to group box for signaling the at least one subpicture corresponding to the two or more subpicture tracks.

An example apparatus includes means for parsing an extraction reference map entry used to assign a group identifier to at least one extraction reference, the extraction reference map entry indicating a subpicture layout; wherein the at least one extraction reference extracts a network abstraction layer unit data by reference from another track; wherein the at least one extraction reference comprises an index of a track reference having a subpicture type within a subpicture order sample group description entry; and means for parsing, using the at least one extraction reference, subpictures or slices of a coded picture in decoding order.

The apparatus may further include wherein the extraction reference map entry is linked with a link to a sample group description providing semantics of the group identifier.

The apparatus may further include means for parsing the link with parsing a syntax element within the extraction reference map entry having a four character code of an associated sample grouping type.

The apparatus may further include means for parsing a map of a loop entry in the subpicture order sample group description entry to a loop entry in the extraction reference map entry.

The apparatus may further include means for parsing a syntax of the extraction reference map entry having at least one syntax element, the at least one syntax element comprising: a group identifier information four character code specifying that further information of values of the group identifier specified in the extraction reference map entry are provided in a sample group description box with a grouping type equal to the group identifier information four character code; an entry count identifier equal to a number of extraction references that extract network abstraction layer unit data with reference to another track; or the group identifier which specifies a unique identifier for the at least one extraction reference.

An example apparatus includes means for parsing a mixed network abstraction layer unit type pictures sample group used to merge video base tracks having a subpicture track; means for parsing a sample group description entry of the mixed network abstraction layer unit type pictures sample group, the sample group description entry indicating a group of pairs of mixed network abstraction layer unit type track reference indices, which reference video subpicture tracks or track groups; and wherein when a video bitstream is resolved from a video base track containing a mixed network abstraction layer unit type sample group with merging pairs of video subpicture tracks signaled in a mixed network abstraction layer unit type pictures sample group entry, then there is mixing of different network abstraction layer unit types.

The apparatus may further include wherein the sample group description entry comprises at least one of: a bit position of a picture parameter set mixed network abstraction layer unit types in picture flag syntax element in a containing raw byte sequence payload; or a parameter set identifier of a parameter set containing the picture parameter set mixed network abstraction layer unit types in picture flag syntax element.

The apparatus may further include wherein a syntax of the mixed network abstraction layer unit type pictures sample group comprises: a syntax element specifying a number of pairs of mixed network abstraction layer unit type track reference indices of subpicture tracks or track groups of subpicture tracks referenced with the video base track in the sample group description entry of the mixed network abstraction layer unit type pictures sample group; and at least one index that specifies a mixed network abstraction layer unit type track reference index value referencing: a track identifier value of a video subpicture track, or a track group identifier value of a sequence of network abstraction layer unit type or alternative for extraction track group of video subpicture tracks.

The apparatus may further include means for reconstructing the video bitstream with means comprising: means for inserting a new copy of a picture parameter set into a resolved video bitstream with a picture parameter set mixed network abstraction layer unit types in picture flag equal to one at every instance when a composition of subpicture tracks leads to a mixture of network abstraction layer unit types where the picture parameter set mixed network abstraction layer unit types in picture flag should be set to one; and means for inserting a new copy of the picture parameter set into the resolved video bitstream with the picture parameter set mixed network abstraction layer unit types in picture flag equal to zero, after a time instance when a mixed network abstraction layer unit type of slices is not applicable.

An example apparatus includes at least one processor; and at least one non-transitory memory including computer program code; wherein the at least one memory and the computer program code are configured to, with the at least one processor, cause the apparatus at least to: indicate an extraction reference map entry used to assign a group identifier to at least one extraction reference, the extraction reference map entry indicating a subpicture layout; wherein the at least one extraction reference causes extraction of a network abstraction layer unit data by reference from another track; wherein the at least one extraction reference comprises an index of a track reference having a subpicture type within a subpicture order sample group description entry; and indicate, using the at least one extraction reference, subpictures or slices of a coded picture in decoding order.

The apparatus may further include wherein the extraction reference map entry is linked with a link to a sample group description providing semantics of the group identifier.

The apparatus may further include wherein the at least one memory and the computer program code are further configured to, with the at least one processor, cause the apparatus at least to: provide the link with setting a syntax element within the extraction reference map entry to a four character code of an associated sample grouping type.

The apparatus may further include wherein the at least one memory and the computer program code are further configured to, with the at least one processor, cause the apparatus at least to: map a loop entry in the subpicture order sample group description entry to a loop entry in the extraction reference map entry.

The apparatus may further include wherein the at least one memory and the computer program code are further configured to, with the at least one processor, cause the apparatus at least to: specify a syntax of the extraction reference map entry using at least one syntax element, the at least one syntax element comprising: a group identifier information four character code specifying that further information of values of the group identifier specified in the extraction reference map entry are provided in a sample group description box with a grouping type equal to the group identifier information four character code; an entry count identifier equal to a number of extraction references that extract network abstraction layer unit data with reference to another track; or the group identifier which specifies a unique identifier for the at least one extraction reference.

An example apparatus includes at least one processor; and at least one non-transitory memory including computer program code; wherein the at least one memory and the computer program code are configured to, with the at least one processor, cause the apparatus at least to: indicate a mixed network abstraction layer unit type pictures sample group used to merge video base tracks having a subpicture track; indicate a sample group description entry of the mixed network abstraction layer unit type pictures sample group, the sample group description entry indicating a group of pairs of mixed network abstraction layer unit type track reference indices, which reference video subpicture tracks or track groups; and wherein when a video bitstream is resolved from a video base track containing a mixed network abstraction layer unit type sample group with merging pairs of video subpicture tracks signaled in a mixed network abstraction layer unit type pictures sample group entry, then there is mixing of different network abstraction layer unit types.

The apparatus may further include wherein the sample group description entry comprises at least one of: a bit position of a picture parameter set mixed network abstraction layer unit types in picture flag syntax element in a containing raw byte sequence payload; or a parameter set identifier of a parameter set containing the picture parameter set mixed network abstraction layer unit types in picture flag syntax element.

The apparatus may further include wherein a syntax of the mixed network abstraction layer unit type pictures sample group comprises: a syntax element specifying a number of pairs of mixed network abstraction layer unit type track reference indices of subpicture tracks or track groups of subpicture tracks referenced with the video base track in the sample group description entry of the mixed network abstraction layer unit type pictures sample group; and at least one index that specifies a mixed network abstraction layer unit type track reference index value referencing: a track identifier value of a video subpicture track, or a track group identifier value of a sequence of network abstraction layer unit type or alternative for extraction track group of video subpicture tracks.

An example apparatus includes at least one processor; and at least one non-transitory memory including computer program code; wherein the at least one memory and the computer program code are configured to, with the at least one processor, cause the apparatus at least to: parse a sample group description entry of a mixed network abstraction layer unit type pictures sample group is mapped to a sample of a video base track; determine a value of a picture parameter set mixed network abstraction layer unit types in picture flag; determine whether a pair of track identifier values of subpicture tracks selected to reconstruct a picture unit map to at least one index that specifies a mixed network abstraction layer unit type track reference index value in the sample group description entry; determine whether a track identifier value maps to the at least one index that specifies a mixed network abstraction layer unit type track reference index value; determine that the track identifier value maps to the at least one index that specifies a mixed network abstraction layer unit type track reference index value in response to a track reference pointing to a track identifier directly; determine that the track identifier value maps to the at least one index that specifies a mixed network abstraction layer unit type track reference index value in response to the track reference pointing to an alternative for extraction track group or a sequence of network abstraction layer unit types track group, and the alternative for extraction track group or the sequence of network abstraction layer unit types track group, respectively, contain a track having the track identifier value; and determine the value of a picture parameter set mixed network abstraction layer unit types in picture flag to be equal to one, in response to any pair of subpicture tracks selected to reconstruct a picture unit having track identifier values that map to the at least one index that specifies a mixed network abstraction layer unit type track reference index value in the sample group description entry with a shared dereferencing index value, otherwise determine the value of the picture parameter set mixed network abstraction layer unit types in picture flag to be equal to zero.

The apparatus may further include wherein when the sample group description entry of the mixed network abstraction layer unit type pictures sample group is mapped to a sample of the video base track, the at least one memory and the computer program code are configured to, with the at least one processor, cause the apparatus at least to: determine whether a value of a picture parameter set mixed network abstraction layer unit types in picture flag differs from a previous picture parameter set network abstraction layer unit with a shared picture parameter set identifier in a reconstructed bitstream; in response to no picture parameter set being included in a picture unit, include a copy of the picture parameter set with an updated picture parameter set mixed network abstraction layer unit types in picture flag value in a reconstructed picture unit; and use a bit position in the sample group description entry to determine which bit is overwritten to update the picture parameter set mixed network abstraction layer unit types in picture flag.

An example apparatus includes at least one processor; and at least one non-transitory memory including computer program code; wherein the at least one memory and the computer program code are configured to, with the at least one processor, cause the apparatus at least to: parse an extraction reference map entry used to assign a group identifier to at least one extraction reference, the extraction reference map entry indicating a subpicture layout; wherein the at least one extraction reference extracts a network abstraction layer unit data by reference from another track; wherein the at least one extraction reference comprises an index of a track reference having a subpicture type within a subpicture order sample group description entry; and parse, using the at least one extraction reference, subpictures or slices of a coded picture in decoding order.

The apparatus may further include wherein the extraction reference map entry is linked with a link to a sample group description providing semantics of the group identifier.

The apparatus may further include wherein the at least one memory and the computer program code are further configured to, with the at least one processor, cause the apparatus at least to: parse the link with parsing a syntax element within the extraction reference map entry having a four character code of an associated sample grouping type.

The apparatus may further include wherein the at least one memory and the computer program code are further configured to, with the at least one processor, cause the apparatus at least to: parse a map of a loop entry in the subpicture order sample group description entry to a loop entry in the extraction reference map entry.

The apparatus may further include wherein the at least one memory and the computer program code are further configured to, with the at least one processor, cause the apparatus at least to: parse a syntax of the extraction reference map entry having at least one syntax element, the at least one syntax element comprising: a group identifier information four character code specifying that further information of values of the group identifier specified in the extraction reference map entry are provided in a sample group description box with a grouping type equal to the group identifier information four character code; an entry count identifier equal to a number of extraction references that extract network abstraction layer unit data with reference to another track; or the group identifier which specifies a unique identifier for the at least one extraction reference.

An example apparatus includes at least one processor; and at least one non-transitory memory including computer program code; wherein the at least one memory and the computer program code are configured to, with the at least one processor, cause the apparatus at least to: parse a mixed network abstraction layer unit type pictures sample group used to merge video base tracks having a subpicture track; parse a sample group description entry of the mixed network abstraction layer unit type pictures sample group, the sample group description entry indicating a group of pairs of mixed network abstraction layer unit type track reference indices, which reference video subpicture tracks or track groups; and wherein when a video bitstream is resolved from a video base track containing a mixed network abstraction layer unit type sample group with merging pairs of video subpicture tracks signaled in a mixed network abstraction layer unit type pictures sample group entry, then there is mixing of different network abstraction layer unit types.

The apparatus may further include wherein the sample group description entry comprises at least one of: a bit position of a picture parameter set mixed network abstraction layer unit types in picture flag syntax element in a containing raw byte sequence payload; or a parameter set identifier of a parameter set containing the picture parameter set mixed network abstraction layer unit types in picture flag syntax element.

The apparatus may further include wherein a syntax of the mixed network abstraction layer unit type pictures sample group comprises: a syntax element specifying a number of pairs of mixed network abstraction layer unit type track reference indices of subpicture tracks or track groups of subpicture tracks referenced with the video base track in the sample group description entry of the mixed network abstraction layer unit type pictures sample group; and at least one index that specifies a mixed network abstraction layer unit type track reference index value referencing: a track identifier value of a video subpicture track, or a track group identifier value of a sequence of network abstraction layer unit type or alternative for extraction track group of video subpicture tracks.

The apparatus may further include wherein the at least one memory and the computer program code are further configured to, with the at least one processor, cause the apparatus at least to: reconstruct the video bitstream with a process comprising: inserting a new copy of a picture parameter set into a resolved video bitstream with a picture parameter set mixed network abstraction layer unit types in picture flag equal to one at every instance when a composition of subpicture tracks leads to a mixture of network abstraction layer unit types where the picture parameter set mixed network abstraction layer unit types in picture flag should be set to one; and inserting a new copy of the picture parameter set into the resolved video bitstream with the picture parameter set mixed network abstraction layer unit types in picture flag equal to zero, after a time instance when a mixed network abstraction layer unit type of slices is not applicable.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

3GP 3GPP TS 26.244
3GPP third generation partnership project
4CC or 4cc four character code
ALF adaptive loop filtering
AMVP adaptive motion vector prediction
APS adaptation parameter set
ASIC application-specific integrated circuit
AU access unit
AVC advanced video coding
BT broadcasting service (television)
CABAC context adaptive binary arithmetic coding
CAVLC context adaptive variable length coding
Cb blue-difference chroma component
Cg chrominance green
CLVS coded layer video sequence
CLVSS CLVS start
Co chrominance orange
CPB coded picture buffer
Cr red-difference chroma component
CRA clean random access
CTU coding tree unit
CU coding unit
CVS coded video sequence
DASH dynamic adaptive streaming over HTTP
DCT discrete cosine transform
DPB decoded picture buffer
EOB end of bitstream
ERP equirectangular projection
EVC essential video coding
FPGA field-programmable gate array
GBR green, blue, red
GDR gradual decoding refresh
GOP group of pictures
HEIF high efficiency image file format
HEVC high efficiency video coding
HMD head mounted display
HRD hypothetical reference decoder
HTTP hypertext transfer protocol
H.# H.# family of video coding standards
id or ID identifier
IBC intra block copy
IDR instantaneous decoding refresh
IEC International Electrotechnical Commission
I/F interface
I/O input/output
IRAP intra random access point
ISO International Organization for Standardization
ISOBMFF ISO base media file format
ITU-R International Telecommunication Union recommendation
ITU-T Telecommunications Standardization Sector of International Telecommunication Union
JCT-VC joint collaborative team-video coding
JTC joint technical committee JVET joint video experts team
JVT joint video team
L luma
LCU largest coding unit
LP leading picture
MCTS motion-constrained tile set
MDS multimedia description schemes
MP4 MPEG-4
MPEG moving picture experts group
MPEG-H MPEG high efficiency coding and media delivery in heterogeneous environments.
MPEG-I MPEG immersive
MV multiview
MVC multiview video coding
NAL or nal network abstraction layer
NUT NAL unit type
NW network
PH picture header
POC picture order count
PPS picture parameter set
PU picture unit
RADL random access decodable leading
RAM random access memory
RASL random access skipped leading
RBSP raw byte sequence payload
REXT fidelity range extension
RGB red, green, blue
ROI region-of-interest
RPL reference picture list syntax structure and/or one or more reference picture lists
RPS reference picture set
RSV reserved
SAO sample adaptive offset
SAP stream access point
SC subcommittee
SDL syntax description language
SHVC scalable high efficiency video coding
SNR signal-to-noise ratio
SOP structure of pictures
SPS sequence parameter set
STSA step-wise temporal sublayer access
SVC scalable video coding
TID or Tid temporal ID
TL temporal layer
TMVP temporal motion vector predictor
TS technical specification
TU transform unit
TRAIL trailing
UE user equipment
UHDTV ultra-high-definition television
VB VVC base track
VBV video buffering verifier
VCEG video coding experts group
VCL video coding layer
VPS video parameter set
VUI video usability information
VVC versatile video coding
WG working group
XML extensible markup language
Y luma

What is claimed is:

1. An apparatus comprising:
at least one processor; and
at least one non-transitory memory including computer program code;
wherein the at least one memory and the computer program code are configured to, with the at least one processor, cause the apparatus at least to:
indicate an extraction reference map entry used to assign a group identifier to at least one extraction reference, the extraction reference map entry indicating a subpicture layout;
wherein the at least one extraction reference causes extraction of a network abstraction layer unit data by reference from another track;
wherein the at least one extraction reference comprises an index of a track reference having a subpicture type within a subpicture order sample group description entry; and
indicate, using the at least one extraction reference, subpictures or slices of a coded picture in decoding order.

2. The apparatus of claim 1, wherein the extraction reference map entry is linked with a link to a sample group description providing semantics of the group identifier.

3. The apparatus of claim 2, wherein the at least one memory and the computer program code are further configured to, with the at least one processor, cause the apparatus at least to:
provide the link with setting a syntax element within the extraction reference map entry to a four character code of an associated sample grouping type.

4. The apparatus of claim 1, wherein the at least one memory and the computer program code are further configured to, with the at least one processor, cause the apparatus at least to:
map a loop entry in the subpicture order sample group description entry to a loop entry in the extraction reference map entry.

5. The apparatus of claim 1, wherein the at least one memory and the computer program code are further configured to, with the at least one processor, cause the apparatus at least to:
specify a syntax of the extraction reference map entry using at least one syntax element, the at least one syntax element comprising:
a group identifier information four character code specifying that further information of values of the group identifier specified in the extraction reference map entry are provided in a sample group description box with a grouping type equal to the group identifier information four character code;
an entry count identifier equal to a number of extraction references that extract network abstraction layer unit data with reference to another track; or
the group identifier which specifies a unique identifier for the at least one extraction reference.

6. An apparatus comprising:
at least one processor; and
at least one non-transitory memory including computer program code;
wherein the at least one memory and the computer program code are configured to, with the at least one processor, cause the apparatus at least to:
parse an extraction reference map entry used to assign a group identifier to at least one extraction reference, the extraction reference map entry indicating a subpicture layout;
wherein the at least one extraction reference extracts a network abstraction layer unit data by reference from another track;

wherein the at least one extraction reference comprises an index of a track reference having a subpicture type within a subpicture order sample group description entry; and parse, using the at least one extraction reference, subpictures or slices of a coded picture in decoding order.

7. The apparatus of claim 6, wherein the extraction reference map entry is linked with a link to a sample group description providing semantics of the group identifier.

8. The apparatus of claim 7, wherein the at least one memory and the computer program code are further configured to, with the at least one processor, cause the apparatus at least to:

parse the link with parsing a syntax element within the extraction reference map entry having a four character code of an associated sample grouping type.

9. The apparatus of claim 6, wherein the at least one memory and the computer program code are further configured to, with the at least one processor, cause the apparatus at least to:

parse a map of a loop entry in the subpicture order sample group description entry to a loop entry in the extraction reference map entry.

10. The apparatus of claim 6, wherein the at least one memory and the computer program code are further configured to, with the at least one processor, cause the apparatus at least to:

parse a syntax of the extraction reference map entry having at least one syntax element, the at least one syntax element comprising:

a group identifier information four character code specifying that further information of values of the group identifier specified in the extraction reference map entry are provided in a sample group description box with a grouping type equal to the group identifier information four character code;

an entry count identifier equal to a number of extraction references that extract network abstraction layer unit data with reference to another track; or the group identifier which specifies a unique identifier for the at least one extraction reference.

* * * * *